(12) United States Patent
Liu et al.

(10) Patent No.: US 11,937,191 B2
(45) Date of Patent: Mar. 19, 2024

(54) COMMUNICATIONS METHOD AND APPARATUS

(71) Applicant: Huawei Technologies Co., Ltd., Shenzhen (CN)

(72) Inventors: Xianda Liu, Beijing (CN); Kunpeng Liu, Beijing (CN); Leiming Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 357 days.

(21) Appl. No.: 17/372,172

(22) Filed: Jul. 9, 2021

(65) Prior Publication Data
US 2021/0352596 A1   Nov. 11, 2021

Related U.S. Application Data

(63) Continuation of application No. PCT/CN2020/071531, filed on Jan. 10, 2020.

(30) Foreign Application Priority Data

Jan. 11, 2019  (CN) .......................... 201910028848.8
Apr. 30, 2019  (CN) .......................... 201910365518.8

(51) Int. Cl.
*H04B 7/185*   (2006.01)
*H04W 8/24*    (2009.01)
(Continued)

(52) U.S. Cl.
CPC ........... *H04W 52/367* (2013.01); *H04W 8/24* (2013.01); *H04W 52/146* (2013.01)

(58) Field of Classification Search
CPC .... H04W 52/367; H04W 8/24; H04W 52/146
See application file for complete search history.

(56) References Cited

U.S. PATENT DOCUMENTS

2010/0220626 A1   9/2010   Das et al.
2015/0351054 A1   12/2015  Immonen et al.
(Continued)

FOREIGN PATENT DOCUMENTS

CN   101106403 A   1/2008
CN   105934980 A   9/2016
(Continued)

OTHER PUBLICATIONS

Khairuddin et al., "A Novel Method for ATC Computations in a Large-Scale Power System," IEEE Transactions on Power Systems, vol. 19, No. 2, pp. 1150-1158, Institute of Electrical and Electronics Engineers, New York, New York, May 4, 2004 (May 2004).

(Continued)

*Primary Examiner* — Erika A Washington
(74) *Attorney, Agent, or Firm* — Leydig, Voit & Mayer, Ltd.

(57) ABSTRACT

This application provides a communications method and apparatus, to improve uplink transmission performance. The method includes determining, by a terminal device, capability indication information and sending the capability indication information to a network device. The capability indication information is used to determine a power scaling factor, the power scaling factor is a ratio of a sum of actual transmit power of n non-zero antenna ports to channel transmit power, and a maximum value of the channel transmit power is a rated maximum transmit power of a system.

22 Claims, 9 Drawing Sheets

(51) Int. Cl.
*H04W 52/14* (2009.01)
*H04W 52/36* (2009.01)

(56) References Cited

U.S. PATENT DOCUMENTS

| | | | | |
|---|---|---|---|---|
| 2016/0006521 A1* | 1/2016 | Yoshimoto | ............ | H04B 7/0417 |
| | | | | 375/267 |
| 2016/0057760 A1* | 2/2016 | Yokomakura | ......... | H04W 48/12 |
| | | | | 370/329 |
| 2018/0368083 A1 | 12/2018 | Yang et al. | | |

FOREIGN PATENT DOCUMENTS

| CN | 107071882 A | 8/2017 |
|---|---|---|
| CN | 108632966 A | 10/2018 |
| CN | 108934190 A | 12/2018 |
| CN | 109089322 A | 12/2018 |
| CN | 110535499 A | 12/2019 |
| EP | 1972171 A2 | 9/2008 |
| WO | 2012093455 A1 | 7/2012 |
| WO | 2018117738 A1 | 6/2018 |
| WO | 2018228437 A1 | 12/2018 |

OTHER PUBLICATIONS

Yang Lihua et al., "Performance analysis of massive MIMO uplink with channel aging in high-speed mobile scenario," total 9 pages (Jul. 20, 2017). With English abstract.

"On beam indication, measurement, and reporting," 3GPP TSG-RAN WG1 #90bis, R1-1718433, Prague, Czech Republic, pp. 1-9, 3rd Generation Partnership Project, Valbonne, France (Oct. 9-13, 2017).

"Enhancements on UL MIMO with multiple PAs to allow full power transmission," 3GPP TSG RAN WG1 Meeting #96bis, R1-1903972, Xi'an, China, Total 7 pages, 3rd Generation Partnership Project, Valbonne, France (Apr. 8-12, 2019).

"3rd Generation Partnership Project; Technical Specification Group Radio Access Network; NR; Physical channels and modulation (Release 15)," 3GPP TS 38.211 V15.3.0, pp. 1-96, 3rd Generation Partnership Project, Valbonne, France (Sep. 2018).

"Discussion on codebook based UL transmission," 3GPP TSG RAN WG1 #91, R1-1719737, Reno, Nevada, USA, Total 7 pages, 3rd Generation Partnership Project, Valbonne, France (Nov. 27-Dec. 1, 2017).

"3rd Generation Partnership Project; Technical Specification Group Radio Access Network; NR; Multiplexing and channel coding (Release 15)," 3GPP TS 38.212 V15.3.0, pp. 1-99, 3rd Generation Partnership Project, Valbonne, France (Sep. 2018).

"Power control for UL MIMO," 3GPP TSG RAN WG1 Meeting #92bis, R1-1805205, Sanya, China, pp. 1-8, 3rd Generation Partnership Project, Valbonne, France (Apr. 16-20, 2018).

"3rd Generation Partnership Project; Technical Specification Group Radio Access Network; NR; Physical layer procedures for control (Release 15)," 3GPP TS 38.213 V15.3.0, pp. 1-101, 3rd Generation Partnership Project, Valbonne, France (Sep. 2018).

"Potential enhancement to allow full power transmission for UL MIMO with multiple PAs," 3GPP TSG RAN WG1 Meeting #94bis, R1-1810704, Chengdu, China, Total 3 pages, 3rd Generation Partnership Project, Valbonne, France (Oct. 8-12, 2018).

"3rd Generation Partnership Project; Technical Specification Group Radio Access Network; NR; Physical layer procedures for data (Release 15)," 3GPP TS 38.214 V15.3.0, pp. 1-96, 3rd Generation Partnership Project, Valbonne, France (Sep. 2018).

"Full Tx power for UL transmissions," 3GPP TSG RAN WG1 Meeting #95, R1-1813444, Spokane, USA, pp. 1-9, 3rd Generation Partnership Project, Valbonne, France (Nov. 12-16, 2018).

"3rd Generation Partnership Project; Technical Specification Group Radio Access Network; NR; User Equipment (UE) radio access capabilities (Release 15)," 3GPP TS 38.306 V15.3.0, pp. 1-31, 3rd Generation Partnership Project, Valbonne, France (Sep. 2018).

"Feature lead summary on Full TX Power UL transmission," 3GPP TSG RAN WG1#96, R1-1903410, Athens, Greece, Total 19 pages, 3rd Generation Partnership Project, Valbonne, France (Feb. 25-Mar. 1, 2019).

* cited by examiner

COMMUNICATIONS METHOD AND APPARATUS

CROSS-REFERENCE TO RELATED APPLICATIONS

This application is a continuation of International Application No. PCT/CN2020/071531, filed on Jan. 10, 2020, which claims priority to Chinese Patent Application No. 201910028848.8, filed on Jan. 11, 2019 and Chinese Patent Application No. 201910365518.8, filed on Apr. 30, 2019. All of the aforementioned patent applications are hereby incorporated by reference in their entireties.

FIELD

Embodiments of this application relate to the field of communications technologies, and in particular, to a communications method and apparatus.

BACKGROUND

In a wireless communications system, when sending an uplink signal, a terminal generates a baseband signal in a baseband, the baseband signal passes through a radio frequency transmit link to generate a radio frequency signal, and the radio frequency signal is sent through an antenna. The radio frequency link includes a radio frequency integrated circuit, a power amplifier (PA), and a duplexer/filter. Before performing uplink transmission, the terminal reports an antenna capability of the terminal. The antenna capability includes a parameter such as a quantity of antenna ports, a layer quantity, or a quantity of antennas. When the terminal supports a plurality of antenna ports, transmit antennas, antenna ports, and PAs are in a one-to-one correspondence, and different PAs may correspond to different maximum transmit power. Further, before performing uplink transmission, the terminal further reports a maximum coherent capability between transmit antennas. A coherent capability includes a fully-coherent capability, a partially-coherent capability, and a non-coherent capability in descending order between any two transmit antennas. The fully-coherent capability indicates that phase calibration is completed for all transmit antennas of the terminal and phase weighting can be performed, that is, all antennas of the terminal can send a same data layer. The non-coherent capability indicates that phase calibration is not completed between any two transmit antennas of the terminal, and phase weighting cannot be performed to send a same data layer. The partially-coherent capability is between the fully-coherent capability and the non-coherent capability. The layer quantity refers to a quantity of data layers, and may also be referred to as a quantity of streams, to be specific, a quantity of streams of uncorrelated signals included when data is sent for precoding. A network device indicates an uplink transmission mode to the terminal in a codebook manner based on the maximum coherent capability that is between the transmit antennas and that is reported by the terminal. Specifically, the network device and the terminal prestore codebooks that are of uplink transmission and that are indicated in a plurality of tables. A codeword in the codebook may be indicated by using a transmission precoding matrix indicator (TPMI) index value, and the codeword is used to determine a precoding matrix for sending uplink data. The network device indicates an uplink transmission rank indicator (TRI) and a TPMI to the terminal based on uplink channel information corresponding to each antenna port by using downlink control information (DCI) signaling, and the terminal sends the uplink data based on the TRI and the TPMI. The TPMI indicates that in the precoding matrix corresponding to the codeword, a row represents a transmit antenna port, and a column represents a transmission rank indicator. A non-zero row element represents an antenna port used for uplink transmission.

For a manner of determining transmit power for uplink data transmission, an implementation in the current technology is as follows: A terminal multiplies a ratio of a quantity of non-zero antenna ports (determined by the terminal based on a currently indicated TPMI) to a total quantity of antenna ports (a maximum quantity of antenna ports that can be supported by the terminal) by channel transmit power P, to obtain uplink transmit power $P_1$, and further evenly allocates the uplink transmit power $P_1$ to each non-zero transmit antenna port. The ratio is a value less than 1 under some TPMI indications. For example, a TPMI type is a non-coherent codeword (2Tx, 4Tx), or the TPMI type is a partially-coherent codeword (4Tx). Therefore, for a terminal having a partially-coherent capability or a non-coherent capability, a sum of actual transmit power of non-zero antenna ports used by the terminal for uplink transmission is less than the channel transmit power. Because a maximum value of the channel transmit power is rated maximum transmit power, in this power determining manner, the sum of actual transmit power of non-zero antenna ports used for uplink transmission cannot reach the maximum transmit power. Another power determining manner in the current technology is that, for the terminal having the partially-coherent capability or the non-coherent capability, the channel transmit power P is directly evenly allocated to each non-zero transmit antenna without performing power scaling, so that uplink transmission of terminals having different coherent capabilities can reach the rated maximum transmit power. For the implementation, because antenna forms (maximum transmit power of each PA) of different terminals are different, different PAs are selected by using the TPMI to perform uplink transmission, and different maximum transmit power may be reached. For example, when the TPMI indication is $$\frac{1}{\sqrt{2}}\begin{bmatrix}1\\0\end{bmatrix},$$

a terminal device configured with one high-power PA can directly support full power transmission, but a terminal device configured with two low-power PAs can support full power transmission only in an antenna virtualization manner. In the foregoing implementation, the terminal needs to notify a network device so that the network device determines an optimal TPMI for uplink data transmission, and an accurate modulation and coding scheme (MCS) for uplink transmission cannot be obtained, thereby causing an uplink transmission performance loss.

SUMMARY

Embodiments of this application provide a communications method and apparatus, to resolve a prior-art problem that a solution of maximum uplink transmit power of a terminal cannot be implemented.

Specific technical solutions provided in the embodiments of this application are as follows.

According to a first aspect, a communications method is provided. The method may be performed by a terminal, and the method may be implemented in the following manner: The terminal determines capability indication information. The capability indication information is used to determine a power scaling factor, the power scaling factor is a ratio of a sum of actual transmit power of n non-zero antenna ports to channel transmit power, a maximum value of the channel transmit power is rated maximum transmit power of a system, and n is a positive integer. The capability indication information is used to indicate one or more codewords; and/or the capability indication information is used to indicate a quantity of additionally configured sounding reference signal SRS ports when a value of a maximum transmission rank is x, where the quantity of additionally configured SRS ports is different from a maximum quantity of antenna ports; and/or the capability indication information is used to indicate whether a plurality of SRS resources with different quantities of ports can be configured when the value of the maximum transmission rank is x; and/or the capability indication information is used to indicate a value of the power scaling factor when the value of the transmission rank is x, where a value of x is one or more of $\{1, 2, 3\}$. The terminal sends the capability indication information. In this way, without disclosing an antenna architecture of the terminal, a network device can more accurately determine, based on the capability indication information about power control reported by the terminal device, a TPMI and an MCS for uplink data transmission, thereby ensuring uplink transmission performance.

In a possible design, the power scaling factor includes one or more of n/M, n/N, or 1, where n is a positive integer less than or equal to M, M is a quantity of reference signal ports and M is a positive integer less than or equal to N, and N is a maximum quantity of transmission ports that can be supported by the terminal and N is a positive integer. In a possible design, the one or more codewords indicated by the capability indication information are represented as an N*A matrix, where A is a current transmission rank indicator, a value of A is 1 when N=2, and a value of A is one or more of 1, 2, or 3 when N=4. A status bit of the capability indication information corresponds to one codeword or one group of codewords; alternatively, a bit of the capability indication information corresponds to one codeword or one group of codewords.

In a possible design, the one or more codewords indicated by the capability indication information include a codeword group 1, and the codeword group 1 includes at least one of the following codewords:

$$\frac{1}{a}\begin{bmatrix}1\\0\end{bmatrix} \text{ and } \frac{1}{a}\begin{bmatrix}0\\1\end{bmatrix},$$

where a value of a is 1 or $\sqrt{2}$; and/or the one or more codewords indicated by the capability indication information include a codeword group 2, and the codeword group 2 includes the following codeword:

$$\frac{1}{\sqrt{2}}\begin{bmatrix}1\\b\end{bmatrix},$$

where a value of a is 1 or $\sqrt{2}$, and a value of b is at least one of 1, −1, j, and −j.

In a possible design, the one or more codewords indicated by the capability indication information include one or more codewords in a first codeword group, and the first codeword group includes at least one of the following codewords:

$$\frac{1}{a}\begin{bmatrix}1\\0\\0\\0\end{bmatrix},$$

$$\frac{1}{a}\begin{bmatrix}0\\1\\0\\0\end{bmatrix},$$

$$\frac{1}{a}\begin{bmatrix}0\\0\\1\\0\end{bmatrix},$$

$$\text{and } \frac{1}{a}\begin{bmatrix}0\\0\\0\\1\end{bmatrix},$$

where a value of a is 1 or 0.5; and/or the one or more codewords indicated by the capability indication information include one or more codewords in a second codeword group, and the second codeword group includes at least one of the following codewords:

$$\frac{1}{b}\begin{bmatrix}1\\0\\1\\0\end{bmatrix},$$

$$\frac{1}{b}\begin{bmatrix}1\\0\\-1\\0\end{bmatrix},$$

$$\frac{1}{b}\begin{bmatrix}1\\0\\j\\0\end{bmatrix},$$

$$\text{and } \frac{1}{b}\begin{bmatrix}1\\0\\-j\\0\end{bmatrix},$$

where a value of b is $\sqrt{2}$ or 0.5; and/or the one or more codewords indicated by the capability indication information include one or more codewords in a third codeword group, and the third codeword group includes at least one of the following codewords:

$$\frac{1}{b}\begin{bmatrix} 0 \\ 1 \\ 0 \\ 1 \end{bmatrix},$$

$$\frac{1}{b}\begin{bmatrix} 0 \\ 1 \\ 0 \\ -1 \end{bmatrix},$$

$$\frac{1}{b}\begin{bmatrix} 0 \\ 1 \\ 0 \\ j \end{bmatrix},$$

$$\text{and } \frac{1}{b}\begin{bmatrix} 0 \\ 1 \\ 0 \\ -j \end{bmatrix},$$

where a value of b is $\sqrt{2}$ or 0.5; and/or the one or more codewords indicated by the capability indication information include one or more codewords in a fourth codeword group, and the fourth codeword group includes $$\frac{1}{2}\begin{bmatrix} 1 \\ e \\ f \\ g \end{bmatrix},$$

where values of e, f, and g each are one or more of 1, −1, j, and −j; and/or the one or more codewords indicated by the capability indication information include a fifth codeword group, and the fifth codeword group includes at least one of the following codewords:

$$\frac{1}{b}\begin{bmatrix} 1 & 0 \\ 0 & 1 \\ 0 & 0 \\ 0 & 0 \end{bmatrix},$$

$$\frac{1}{b}\begin{bmatrix} 1 & 0 \\ 0 & 0 \\ 0 & 1 \\ 0 & 0 \end{bmatrix},$$

$$\frac{1}{b}\begin{bmatrix} 1 & 0 \\ 0 & 0 \\ 0 & 0 \\ 0 & 1 \end{bmatrix},$$

$$\frac{1}{b}\begin{bmatrix} 0 & 0 \\ 1 & 0 \\ 0 & 1 \\ 0 & 0 \end{bmatrix},$$

$$\frac{1}{b}\begin{bmatrix} 0 & 0 \\ 1 & 0 \\ 0 & 0 \\ 0 & 1 \end{bmatrix},$$

$$\text{and } \frac{1}{b}\begin{bmatrix} 0 & 0 \\ 0 & 0 \\ 1 & 0 \\ 0 & 1 \end{bmatrix},$$

where a value of b is $\sqrt{2}$ or 2; and/or the one or more codewords indicated by the capability indication information include a sixth codeword group, and the sixth codeword group includes at least one of the following codewords:

$$\frac{1}{2}\begin{bmatrix} 1 & 0 \\ 0 & 1 \\ c1 & 0 \\ 0 & d1 \end{bmatrix},$$

where values of c1 and d1 each are one or more of 1, −1, j, and −j; and/or the one or more codewords indicated by the capability indication information include a seventh codeword group, and the seventh codeword group includes the following codeword:

$$\frac{1}{2}\begin{bmatrix} 1 & 0 \\ e1 & e2 \\ f1 & f2 \\ g1 & g2 \end{bmatrix},$$

where values of e1, f1, g1, e2, f2 and g2 are one or more of 1, −1, j, and −j; and/or the one or more codewords indicated by the capability indication information include an eighth codeword group, and the eighth codeword group includes the following codeword:

$$\frac{1}{2}\begin{bmatrix} 1 & 0 & 0 \\ 0 & 1 & 0 \\ 0 & 0 & 1 \\ 0 & 0 & 0 \end{bmatrix};$$

and/or the one or more codewords indicated by the capability indication information include a ninth codeword group, and the ninth codeword group includes one or more of the following codewords:

$$\frac{1}{2}\begin{bmatrix} 1 & 0 & 0 \\ 0 & 1 & 0 \\ 1 & 0 & 1 \\ 0 & 0 & 0 \end{bmatrix}, \text{and } \frac{1}{2}\begin{bmatrix} 1 & 0 & 0 \\ 0 & 1 & 0 \\ -1 & 0 & 1 \\ 0 & 0 & 0 \end{bmatrix};$$

and/or the one or more codewords indicated by the capability indication information include a tenth codeword group, and the tenth codeword group includes one or more of the following codewords:

$$\frac{1}{2}\begin{bmatrix} 1 & 1 & 1 \\ 1 & -1 & 1 \\ 1 & 1 & -1 \\ 1 & -1 & -1 \end{bmatrix}, \frac{1}{2}\begin{bmatrix} 1 & 1 & 1 \\ 1 & -1 & 1 \\ j & j & -j \\ j & -j & -j \end{bmatrix},$$

$$\frac{1}{2}\begin{bmatrix} 1 & 1 & 1 \\ -1 & 1 & -1 \\ 1 & 1 & -1 \\ -1 & 1 & 1 \end{bmatrix}, \text{ and } \frac{1}{2}\begin{bmatrix} 1 & 1 & 1 \\ -1 & 1 & -1 \\ j & j & -j \\ -j & j & j \end{bmatrix}.$$

In a possible design, five status bits of the capability indication information respectively correspond to zero codewords, one codeword, two codewords, three codewords, and four codewords in the first codeword group; four bits of the capability indication information respectively correspond to four codewords in the first codeword group; and/or one bit of the capability indication information corresponds to some or all codewords in the second codeword group; and/or one bit of the capability indication information corresponds to some or all codewords in the third codeword group; and/or one bit of the capability indication information corresponds to some or all codewords in the fourth codeword group; and/or one bit of the capability indication information corresponds to some or all codewords in the sixth codeword group; and/or one bit of the capability indication information corresponds to some or all codewords in the seventh codeword group; and/or one bit of the capability indication information corresponds to codewords in the eighth codeword group; and/or one bit of the capability indication information corresponds to some or all codewords in the ninth codeword group; and/or one bit of the capability indication information corresponds to some or all codewords in the tenth codeword group; and/or two bits of the capability indication information respectively correspond to two codewords in the codeword group 1; and/or one bit of the capability indication information corresponds to one or more codewords in the codeword group 2.

In a possible design, three codewords in the fifth codeword group respectively correspond to three bits in the capability indication information, and there are codewords in which non-zero elements are located in a first row, a second row, a third row, and a fourth row in the three codewords in the fifth codeword group; or the fifth codeword group includes one or more of the following codeword sets:

$$\left\{ \frac{1}{b}\begin{bmatrix} 1 & 0 \\ 0 & 1 \\ 0 & 0 \\ 0 & 0 \end{bmatrix} \right\}, \left\{ \frac{1}{b}\begin{bmatrix} 0 & 0 \\ 0 & 0 \\ 1 & 0 \\ 0 & 1 \end{bmatrix} \right\}, \left\{ \frac{1}{b}\begin{bmatrix} 1 & 0 \\ 1 & 0 \\ 0 & 1 \\ 0 & 0 \end{bmatrix} \right\},$$

$$\left\{ \frac{1}{b}\begin{bmatrix} 0 & 0 \\ 1 & 0 \\ 0 & 0 \\ 0 & 1 \end{bmatrix} \right\}, \left\{ \frac{1}{b}\begin{bmatrix} 1 & 0 \\ 0 & 0 \\ 0 & 0 \\ 0 & 1 \end{bmatrix} \right\}, \left\{ \frac{1}{b}\begin{bmatrix} 0 & 0 \\ 1 & 0 \\ 0 & 1 \\ 0 & 0 \end{bmatrix} \right\},$$

$$\left\{ \frac{1}{b}\begin{bmatrix} 1 & 0 \\ 0 & 1 \\ 0 & 0 \\ 0 & 0 \end{bmatrix}, \frac{1}{b}\begin{bmatrix} 1 & 0 \\ 0 & 0 \\ 0 & 1 \\ 0 & 0 \end{bmatrix}, \frac{1}{b}\begin{bmatrix} 0 & 0 \\ 1 & 0 \\ 0 & 1 \\ 0 & 0 \end{bmatrix} \right\},$$

$$\left\{ \frac{1}{b}\begin{bmatrix} 1 & 0 \\ 0 & 1 \\ 0 & 0 \\ 0 & 0 \end{bmatrix}, \frac{1}{b}\begin{bmatrix} 0 & 0 \\ 1 & 0 \\ 0 & 0 \\ 0 & 1 \end{bmatrix}, \frac{1}{b}\begin{bmatrix} 1 & 0 \\ 0 & 0 \\ 0 & 0 \\ 0 & 1 \end{bmatrix} \right\},$$

$$\left\{ \frac{1}{b}\begin{bmatrix} 1 & 0 \\ 0 & 0 \\ 0 & 1 \\ 0 & 0 \end{bmatrix}, \frac{1}{b}\begin{bmatrix} 1 & 0 \\ 0 & 0 \\ 0 & 0 \\ 0 & 1 \end{bmatrix}, \frac{1}{b}\begin{bmatrix} 0 & 0 \\ 0 & 0 \\ 1 & 0 \\ 0 & 1 \end{bmatrix} \right\}, \text{ and}$$

$$\left\{ \frac{1}{b}\begin{bmatrix} 0 & 0 \\ 1 & 0 \\ 0 & 0 \\ 0 & 1 \end{bmatrix}, \frac{1}{b}\begin{bmatrix} 0 & 0 \\ 1 & 0 \\ 0 & 1 \\ 0 & 0 \end{bmatrix}, \frac{1}{b}\begin{bmatrix} 0 & 0 \\ 0 & 0 \\ 1 & 0 \\ 0 & 1 \end{bmatrix} \right\};$$

and the codeword sets separately correspond to one status bit of the capability indication information.

In a possible design, information indicated by the capability indication information includes: The one or more codewords are used to support the value of the power scaling factor to be 1, or used to support the sum of actual transmit power of n non-zero antenna ports to reach the rated maximum transmit power of the system, or used to support direct allocation of the channel transmit power to the non-zero antenna ports, where the one or more codewords are a codeword in the first codeword group to the tenth codeword group or a codeword in the codeword group 1 or the codeword group 2; and/or the information indicated by the capability indication information further includes: Other codewords except the one or more codewords are used to support the value of the power scaling factor to be 1/N, or used to support the sum of actual transmit power of n non-zero antenna ports not to reach the rated maximum transmit power of the system, or used to support that the channel transmit power is first multiplied by the power scaling factor and then allocated to the non-zero antenna ports, where the other codewords except the one or more codewords are a codeword in the first codeword group to the tenth codeword group or a codeword in the codeword group 1 or the codeword group 2.

In a possible design, that the one or more codewords are used to support the value of the power scaling factor to be 1 indicates that SRS resources with different quantities of ports need to be configured. Further, the SRS resources with different quantities of ports are configured in one SRS resource set.

In a possible design, that the one or more codewords are used to support the value of the power scaling factor to be 1 indicates that SRS resources with different quantities of ports need to be configured, and indicates a port quantity of SRS resources that need to be additionally configured. Further, the SRS resources with different quantities of ports are configured in one SRS resource set.

In a possible design, when a value of a first bit in the capability indication information is 1 and a codeword in one codeword or one group of codewords corresponding to the first bit is indicated by DCI, the power scaling factor of first data is 1, where the first data is scheduled by the DCI.

In a possible design, when a value of a first bit in the capability indication information is 0 and a codeword in one codeword or one group of codewords corresponding to the first bit is indicated by DCI, the power scaling factor of first data is n/M or n/N, wherein the first data is scheduled by the DCI.

In a possible design, the capability indication information is used to indicate one or more codewords, and the quantity of reference signal SRS ports when the value of the maximum transmission rank is x, where when the capability indication information indicates the zero codewords in the first codeword group, or when each bit corresponding to the first codeword group in the capability indication information is set to 0, and when the value of the maximum transmission rank is 1, the quantity of reference signal SRS ports is an integer greater than or equal to 1; and/or when each bit corresponding to the fifth codeword group in the capability indication information is set to 0, and the rank value of the maximum transmission rank is 2, the quantity of SRS ports is an integer greater than or equal to 2.

In a possible design, when a bit corresponding to $$\frac{1}{a}\begin{bmatrix}1\\0\end{bmatrix}$$

in the capability indication information is set to 1, the quantity of SRS ports is 1; or when a bit corresponding to $$\frac{1}{a}\begin{bmatrix}0\\1\end{bmatrix}$$

in the capability indication information is set to 1, the quantity of SRS ports is 1.

In a possible design, the value of x is {1}, {2}, and/or {3}; or the value of x is {1, 2} and/or {3}; or the value of x is {1} and/or {2, 3}.

In a possible design, it is determined that a value of the power scaling factor of the first data is n/M or 1, a transmit port of the first data is determined based on a first SRS, and a port quantity of the first SRS is the quantity of reference signal SRS ports indicated by the capability indication information.

In a possible design, an SRS resource set includes a plurality of SRS resources, port quantities of SRS resources in the plurality of SRS resources are different, and a port quantity of at least one SRS resource in the SRS resource set is the same as the quantity of SRS ports indicated by the capability indication information, or a sum of port quantities of some SRS resources in the SRS resource set is the same as the quantity of SRS ports indicated by the capability indication information.

In a possible design, the quantity of SRS ports is less than N, or a type of the SRS is virtualization.

In a possible design, the value of x is {2} and/or {3} and/or {2, 3}, the capability indication information is further used to indicate one or more codewords, and A=1 in the one or more codewords; alternatively, the value of x is {1} and/or {1, 2} and/or {2}, the capability indication information is further used to indicate one or more codewords, and A=3 in the one or more codewords; alternatively, the value of x is {1}, the capability indication information is further used to indicate one or more codewords, and A=2 and/or 3 in the one or more codewords.

In a possible design, when the capability indication information indicates $$\frac{1}{a}\begin{bmatrix}1\\0\end{bmatrix}, \text{ or } \frac{1}{a}\begin{bmatrix}0\\1\end{bmatrix},$$

the terminal device requests to configure an SRS whose port quantity is one, or the terminal device requests an SRS whose type is virtualization; and/or when the capability indication information indicates $$\frac{1}{b}\begin{bmatrix}1\\1\end{bmatrix},$$

the value of b is 1 or $\sqrt{2}$, and the power scaling factor is 1.

In a possible design, when the capability indication information indicates $$\frac{1}{a}\begin{bmatrix}1\\0\\0\end{bmatrix}, \text{ or } \frac{1}{a}\begin{bmatrix}0\\1\\0\end{bmatrix}, \text{ or } \frac{1}{a}\begin{bmatrix}0\\0\\1\end{bmatrix}, \text{ or } \frac{1}{a}\begin{bmatrix}0\\0\\0\\1\end{bmatrix},$$

the terminal device requests to configure an SRS whose port quantity is one, or the terminal device requests an SRS whose type is virtualization; and/or when the capability indication information indicates $$\frac{1}{a}\begin{bmatrix}1\\0\\1\\0\end{bmatrix}, \text{ or } \frac{1}{a}\begin{bmatrix}1\\0\\-1\\0\end{bmatrix}, \text{ or } \frac{1}{a}\begin{bmatrix}1\\0\\j\\0\end{bmatrix}, \text{ or } \frac{1}{a}\begin{bmatrix}1\\0\\-j\\0\end{bmatrix},$$

$$\text{or } \frac{1}{a}\begin{bmatrix}0\\1\\0\\1\end{bmatrix}, \text{ or } \frac{1}{a}\begin{bmatrix}0\\1\\0\\-1\end{bmatrix}, \text{ or } \frac{1}{a}\begin{bmatrix}0\\1\\0\\j\end{bmatrix}, \text{ or } \frac{1}{a}\begin{bmatrix}0\\1\\0\\-j\end{bmatrix},$$

the terminal device requests to configure an SRS whose port quantity is two, or the terminal device requests an SRS whose type is virtualization; and/or when the capability indication information indicates $$\frac{1}{a}\begin{bmatrix}1&0\\0&1\\0&0\\0&0\end{bmatrix}, \text{ or } \frac{1}{a}\begin{bmatrix}1&0\\0&0\\0&1\\0&0\end{bmatrix}, \text{ or } \frac{1}{a}\begin{bmatrix}1&0\\0&0\\0&0\\0&1\end{bmatrix},$$

$$\text{or } \frac{1}{a}\begin{bmatrix}0&0\\1&0\\0&1\\0&0\end{bmatrix}, \text{ or } \frac{1}{a}\begin{bmatrix}0&0\\1&0\\0&0\\0&1\end{bmatrix}, \text{ or } \frac{1}{a}\begin{bmatrix}0&0\\0&0\\1&0\\0&1\end{bmatrix},$$

the terminal device requests to configure two SRSs whose port quantity is one, or the terminal device requests an SRS whose type is virtualization.

According to a second aspect, a communications method is provided. The method includes: A network device receives capability indication information from a terminal. The capability indication information is used to determine a power scaling factor, the power scaling factor is a ratio of a sum of actual transmit power of n non-zero antenna ports to channel transmit power, a maximum value of the channel transmit power is rated maximum transmit power of a system, and n is a positive integer. The capability indication information is used to indicate one or more codewords; and/or the capability indication information is used to indicate a quantity of additionally configured sounding reference signal SRS ports when a value of a maximum transmission rank is x, where the quantity of additionally configured SRS ports is different from a maximum quantity of antenna ports; and/or the capability indication information is used to indicate whether a plurality of SRS resources with different quantities of ports can be configured when the value of the maximum transmission rank is x; and/or the capability indication information is used to indicate a value of the power scaling factor when the value of the transmission rank is x, where a value of x is one or more of {1, 2, 3}. In this way, without disclosing an antenna architecture of the terminal, the network device can more accurately determine, based on the capability indication information about power control reported by a terminal device, a TPMI and an MCS for uplink data transmission, thereby ensuring uplink transmission performance.

In a possible design, the method further includes: The network device determines that a power scaling factor of first data is 1. The network device sends downlink control information DCI to the terminal, where the DCI is used to schedule the first data, and a codeword used by the first data is a codeword in one codeword or a group of codewords corresponding to a first bit when a value of the first bit in the capability indication information is 1.

In a possible design, the one or more codewords indicated by the capability indication information are represented as an N*A matrix, where A is a current transmission rank indicator, a value of A is 1 when N=2, and a value of A is one or more of 1, 2, or 3 when N=4. A status bit of the capability indication information corresponds to one codeword or one group of codewords; alternatively, a bit of the capability indication information corresponds to one codeword or one group of codewords.

In a possible design, the one or more codewords indicated by the capability indication information include a codeword group 1, and the codeword group 1 includes at least one of the following codewords:

$$\frac{1}{a}\begin{bmatrix}1\\0\end{bmatrix} \text{ and } \frac{1}{a}\begin{bmatrix}0\\1\end{bmatrix},$$

where a value of a is 1 or $\sqrt{2}$; and/or the one or more codewords indicated by the capability indication information include a codeword group 2, and the codeword group 2 includes the following codeword:

$$\frac{1}{\sqrt{2}}\begin{bmatrix}1\\b\end{bmatrix},$$

where a value of a is 1 or $\sqrt{2}$, and a value of b is at least one of 1, −1, j, and −j.

In a possible design, the one or more codewords indicated by the capability indication information include one or more codewords in a first codeword group, and the first codeword group includes at least one of the following codewords: ⌊0⌋, ⌊1⌋, ⌊0⌋, and ⌊1⌋, where a value of a is 1 or 0.5; and/or the one or more codewords indicated by the capability indication information include one or more codewords in a second codeword group, and the second codeword group includes at least one of the following codewords: ⌊0⌋, ⌊0⌋, ⌊0⌋, and ⌊0⌋, where a value of a is $\sqrt{2}$ or 0.5; and/or the one or more codewords indicated by the capability indication information include one or more codewords in a third codeword group, and the third codeword group includes at least one of the following codewords:

$$\frac{1}{b}\begin{bmatrix}0\\1\\0\\1\end{bmatrix}, \frac{1}{b}\begin{bmatrix}0\\1\\0\\-1\end{bmatrix}, \frac{1}{b}\begin{bmatrix}0\\1\\0\\j\end{bmatrix}, \text{ and } \frac{1}{b}\begin{bmatrix}0\\1\\0\\-j\end{bmatrix},$$

where a value of a is $\sqrt{2}$ or 0.5; and/or the one or more codewords indicated by the capability indication information include one or more codewords in a fourth codeword group, and the fourth codeword group includes $$\frac{1}{2}\begin{bmatrix}1\\e\\f\\g\end{bmatrix},$$

where values of e, f, and g each are one or more of 1, −1, j, and −j; and/or the one or more codewords indicated by the capability indication information include a fifth codeword group, and the fifth codeword group includes at least one of the following codewords:

$$\frac{1}{b}\begin{bmatrix}1&0\\0&1\\0&0\\0&0\end{bmatrix}, \frac{1}{b}\begin{bmatrix}1&0\\0&0\\0&1\\0&0\end{bmatrix}, \frac{1}{b}\begin{bmatrix}1&0\\0&0\\0&0\\0&1\end{bmatrix}, \frac{1}{b}\begin{bmatrix}0&0\\1&0\\0&1\\0&0\end{bmatrix}, \frac{1}{b}\begin{bmatrix}0&0\\1&0\\0&0\\0&1\end{bmatrix}, \text{ and } \frac{1}{b}\begin{bmatrix}0&0\\0&0\\1&0\\0&1\end{bmatrix},$$

where a value of b is $\sqrt{2}$ or 2; and/or the one or more codewords indicated by the capability indication information include a sixth codeword group, and the sixth codeword group includes at least one of the following codewords:

$$\frac{1}{2}\begin{bmatrix}1&0\\0&1\\c1&0\\0&d1\end{bmatrix},$$

where values of c1 and d1 each are one or more of 1, −1, j, and −j; and/or the one or more codewords indicated by the capability indication information include a seventh codeword group, and the seventh codeword group includes the following codeword:

$$\frac{1}{2}\begin{bmatrix} 1 & 0 \\ e1 & e2 \\ f1 & f2 \\ g1 & g2 \end{bmatrix},$$

where values of e1, f1, g1, e2, f2 and g2 are one or more of 1, −1, j, and −j; and/or the one or more codewords indicated by the capability indication information include an eighth codeword group, and the eighth codeword group includes the following codeword:

$$\frac{1}{2}\begin{bmatrix} 1 & 0 & 0 \\ 0 & 1 & 0 \\ 0 & 0 & 1 \\ 0 & 0 & 0 \end{bmatrix};$$

and/or the one or more codewords indicated by the capability indication information include a ninth codeword group, and the ninth codeword group includes one or more of the following codewords:

$$\frac{1}{2}\begin{bmatrix} 1 & 0 & 0 \\ 0 & 1 & 0 \\ 1 & 0 & 1 \\ 0 & 0 & 0 \end{bmatrix}, \text{ and } \frac{1}{2}\begin{bmatrix} 1 & 0 & 0 \\ 0 & 1 & 0 \\ -1 & 0 & 1 \\ 0 & 0 & 0 \end{bmatrix};$$

and/or the one or more codewords indicated by the capability indication information include a tenth codeword group, and the tenth codeword group includes one or more of the following codewords:

$$\frac{1}{2}\begin{bmatrix} 1 & 1 & 1 \\ 1 & -1 & 1 \\ 1 & 1 & -1 \\ 1 & -1 & -1 \end{bmatrix}, \frac{1}{2}\begin{bmatrix} 1 & 1 & 1 \\ 1 & -1 & 1 \\ j & j & -j \\ j & -j & -j \end{bmatrix}, \frac{1}{2}\begin{bmatrix} 1 & 1 & 1 \\ -1 & 1 & -1 \\ 1 & 1 & -1 \\ -1 & 1 & 1 \end{bmatrix}, \text{ and } \frac{1}{2}\begin{bmatrix} 1 & 1 & 1 \\ -1 & 1 & -1 \\ j & j & -j \\ -j & j & j \end{bmatrix}.$$

In a possible design, five status bits of the capability indication information respectively correspond to zero codewords, one codeword, two codewords, three codewords, and four codewords in the first codeword group; four bits of the capability indication information respectively correspond to four codewords in the first codeword group; and/or one bit of the capability indication information corresponds to some or all codewords in the second codeword group; and/or one bit of the capability indication information corresponds to some or all codewords in the third codeword group; and/or one bit of the capability indication information corresponds to some or all codewords in the fourth codeword group; and/or one bit of the capability indication information corresponds to some or all codewords in the sixth codeword group; and/or one bit of the capability indication information corresponds to some or all codewords in the seventh codeword group; and/or one bit of the capability indication information corresponds to codewords in the eighth codeword group; and/or one bit of the capability indication information corresponds to some or all codewords in the ninth codeword group; and/or one bit of the capability indication information corresponds to some or all codewords in the tenth codeword group; and/or two bits of the capability indication information respectively correspond to two codewords in the codeword group 1; and/or one bit of the capability indication information corresponds to one or more codewords in the codeword group 2.

In a possible design, three codewords in the fifth codeword group respectively correspond to three bits in the capability indication information, and there are codewords in which non-zero elements are located in a first row, a second row, a third row, and a fourth row in the three codewords in the fifth codeword group; or the fifth codeword group includes one or more of the following codeword sets:

$$\left\{\frac{1}{b}\begin{bmatrix} 1 & 0 \\ 0 & 1 \\ 0 & 0 \\ 0 & 0 \end{bmatrix}\right\}, \left\{\frac{1}{b}\begin{bmatrix} 0 & 0 \\ 0 & 0 \\ 1 & 0 \\ 0 & 1 \end{bmatrix}\right\}, \left\{\frac{1}{b}\begin{bmatrix} 1 & 0 \\ 0 & 0 \\ 0 & 1 \\ 0 & 0 \end{bmatrix}\right\}, \left\{\frac{1}{b}\begin{bmatrix} 0 & 0 \\ 1 & 0 \\ 0 & 0 \\ 0 & 1 \end{bmatrix}\right\},$$

$$\left\{\frac{1}{b}\begin{bmatrix} 1 & 0 \\ 0 & 0 \\ 0 & 0 \\ 0 & 1 \end{bmatrix}\right\}, \left\{\frac{1}{b}\begin{bmatrix} 0 & 0 \\ 1 & 0 \\ 0 & 1 \\ 0 & 0 \end{bmatrix}\right\}, \left\{\frac{1}{b}\begin{bmatrix} 1 & 0 \\ 0 & 1 \\ 0 & 0 \\ 0 & 0 \end{bmatrix}, \frac{1}{b}\begin{bmatrix} 1 & 0 \\ 0 & 0 \\ 0 & 1 \\ 0 & 0 \end{bmatrix}, \frac{1}{b}\begin{bmatrix} 0 & 0 \\ 1 & 0 \\ 0 & 1 \\ 0 & 0 \end{bmatrix}\right\},$$

$$\left\{\frac{1}{b}\begin{bmatrix} 1 & 0 \\ 0 & 1 \\ 0 & 0 \\ 0 & 0 \end{bmatrix}, \frac{1}{b}\begin{bmatrix} 0 & 0 \\ 1 & 0 \\ 0 & 0 \\ 0 & 1 \end{bmatrix}, \frac{1}{b}\begin{bmatrix} 1 & 0 \\ 0 & 0 \\ 0 & 0 \\ 0 & 1 \end{bmatrix}\right\}, \left\{\frac{1}{b}\begin{bmatrix} 1 & 0 \\ 0 & 0 \\ 0 & 1 \\ 0 & 0 \end{bmatrix}, \frac{1}{b}\begin{bmatrix} 1 & 0 \\ 0 & 0 \\ 0 & 0 \\ 0 & 1 \end{bmatrix}, \frac{1}{b}\begin{bmatrix} 0 & 0 \\ 0 & 0 \\ 1 & 0 \\ 0 & 1 \end{bmatrix}\right\},$$

$$\text{and } \left\{\frac{1}{b}\begin{bmatrix} 0 & 0 \\ 1 & 0 \\ 0 & 0 \\ 0 & 1 \end{bmatrix}, \frac{1}{b}\begin{bmatrix} 0 & 0 \\ 1 & 0 \\ 0 & 1 \\ 0 & 0 \end{bmatrix}, \frac{1}{b}\begin{bmatrix} 0 & 0 \\ 0 & 0 \\ 1 & 0 \\ 0 & 1 \end{bmatrix}\right\};$$

and the codeword sets separately correspond to one status bit of the capability indication information.

In a possible design, when the value of the first bit in the capability indication information is 1 and the DCI indicates the codeword in one codeword or a group of codewords corresponding to the first bit, the power scaling factor of the first data is 1, where the first data is scheduled by the DCI.

In a possible design, when the value of the first bit in the capability indication information is 0 and the DCI indicates the codeword in one codeword or a group of codewords corresponding to the first bit, the power scaling factor of the first data is n/M or n/N, where the first data is scheduled by the DCI.

In a possible design, the capability indication information is used to indicate one or more codewords, and the quantity of reference signal SRS ports when the value of the maximum transmission rank is x, where when the capability indication information indicates the zero codewords in the first codeword group, or when each bit corresponding to the first codeword group in the capability indication information is set to 0, and when the value of the maximum transmission rank is 1, the quantity of reference signal SRS ports is an integer greater than or equal to 1; and/or when each bit corresponding to the fifth codeword group in the capability indication information is set to 0, and the rank value of the maximum transmission rank is 2, the quantity of SRS ports is an integer greater than or equal to 2.

In a possible design, when a bit corresponding to $$\frac{1}{a}\begin{bmatrix} 1 \\ 0 \end{bmatrix}$$

in the capability indication information is set to 1, the quantity of SRS ports is 1; or when a bit corresponding to $$\frac{1}{a}\begin{bmatrix} 0 \\ 1 \end{bmatrix}$$

in the capability indication information is set to 1, the quantity of SRS ports is 1.

In a possible design, the value of x is {1}, {2}, and/or {3}; or the value of x is {1, 2} and/or {3}; or the value of x is {1} and/or {2, 3}.

In a possible design, it is determined that a value of the power scaling factor of the first data is n/M or 1, a transmit port of the first data is determined based on a first SRS, and a port quantity of the first SRS is the quantity of reference signal SRS ports indicated by the capability indication information.

In a possible design, an SRS resource set includes a plurality of SRS resources, port quantities of SRS resources in the plurality of SRS resources are different, and a port quantity of at least one SRS resource in the SRS resource set is the same as the quantity of SRS ports indicated by the capability indication information, or a sum of port quantities of some SRS resources in the SRS resource set is the same as the quantity of SRS ports indicated by the capability indication information.

In a possible design, the quantity of SRS ports is less than N, or a type of the SRS is virtualization.

In a possible design, the value of x is {2} and/or {3} and/or {2, 3}, the capability indication information is further used to indicate one or more codewords, and A=1 in the one or more codewords; alternatively, the value of x is {1} and/or {1, 2} and/or {2}, the capability indication information is further used to indicate one or more codewords, and A=3 in the one or more codewords; alternatively, the value of x is {1}, the capability indication information is further used to indicate one or more codewords, and A=2 and/or 3 in the one or more codewords.

In a possible design, when the capability indication information indicates $$\frac{1}{a}\begin{bmatrix} 1 \\ 0 \end{bmatrix}, \text{ or } \frac{1}{a}\begin{bmatrix} 0 \\ 1 \end{bmatrix},$$

the terminal device requests to configure an SRS whose port quantity is one, or the terminal device requests an SRS whose type is virtualization; and/or when the capability indication information indicates $$\frac{1}{b}\begin{bmatrix} 1 \\ 1 \end{bmatrix},$$

the value of b is 1 or √2, and the power scaling factor is 1.

In a possible design, when the capability indication information indicates $$\frac{1}{a}\begin{bmatrix} 1 \\ 0 \\ 0 \\ 0 \end{bmatrix}, \text{ or } \frac{1}{a}\begin{bmatrix} 0 \\ 1 \\ 0 \\ 0 \end{bmatrix}, \text{ or } \frac{1}{a}\begin{bmatrix} 0 \\ 0 \\ 1 \\ 0 \end{bmatrix}, \text{ or } \frac{1}{a}\begin{bmatrix} 0 \\ 0 \\ 0 \\ 1 \end{bmatrix},$$

the terminal device requests to configure an SRS whose port quantity is one, or the terminal device requests an SRS whose type is virtualization; and/or when the capability indication information indicates $$\frac{1}{a}\begin{bmatrix} 1 \\ 0 \\ 1 \\ 0 \end{bmatrix}, \text{ or } \frac{1}{a}\begin{bmatrix} 1 \\ 0 \\ -1 \\ 0 \end{bmatrix}, \text{ or } \frac{1}{a}\begin{bmatrix} 1 \\ 0 \\ j \\ 0 \end{bmatrix}, \text{ or } \frac{1}{a}\begin{bmatrix} 1 \\ 0 \\ -j \\ 0 \end{bmatrix},$$

$$\text{or } \frac{1}{a}\begin{bmatrix} 0 \\ 1 \\ 0 \\ 1 \end{bmatrix}, \text{ or } \frac{1}{a}\begin{bmatrix} 0 \\ 1 \\ 0 \\ -1 \end{bmatrix}, \text{ or } \frac{1}{a}\begin{bmatrix} 0 \\ 1 \\ 0 \\ j \end{bmatrix}, \text{ or } \frac{1}{a}\begin{bmatrix} 0 \\ 1 \\ 0 \\ -j \end{bmatrix},$$

the terminal device requests to configure an SRS whose port quantity is two, or the terminal device requests an SRS whose type is virtualization; and/or when the capability indication information indicates $$\frac{1}{a}\begin{bmatrix} 1 & 0 \\ 0 & 1 \\ 0 & 0 \\ 0 & 0 \end{bmatrix}, \text{ or } \frac{1}{a}\begin{bmatrix} 1 & 0 \\ 0 & 0 \\ 0 & 1 \\ 0 & 0 \end{bmatrix}, \text{ or } \frac{1}{a}\begin{bmatrix} 1 & 0 \\ 0 & 0 \\ 0 & 0 \\ 0 & 1 \end{bmatrix},$$

$$\text{or } \frac{1}{a}\begin{bmatrix} 0 & 0 \\ 1 & 0 \\ 0 & 1 \\ 0 & 0 \end{bmatrix}, \text{ or } \frac{1}{a}\begin{bmatrix} 0 & 0 \\ 1 & 0 \\ 0 & 0 \\ 0 & 1 \end{bmatrix}, \text{ or } \frac{1}{a}\begin{bmatrix} 0 & 0 \\ 0 & 0 \\ 1 & 0 \\ 0 & 1 \end{bmatrix},$$

the terminal device requests to configure two SRSs whose port quantity is one, or the terminal device requests an SRS whose type is virtualization.

According to a third aspect, a communications apparatus is provided. The apparatus is applied to a terminal or the apparatus is a terminal. The apparatus has a function of implementing the method according to any one of the first aspect or the possible designs of the first aspect, and includes corresponding means for performing the steps or functions described in the foregoing aspect. The steps or functions may be implemented by using software, hardware (for example, a circuit), or a combination of hardware and software.

In a possible design, the communications apparatus includes one or more processors and a communications unit. The one or more processors are configured to support the signal transmission apparatus in executing functions in the foregoing method. The communications unit is configured to support the communications apparatus in communicating with another device, to implement a receiving function and/or a sending function, for example, sending capability indication information.

Optionally, the communications apparatus may further include one or more memories. The memory is configured to be coupled to the processor, and the memory stores program instructions and/or data for the apparatus. The one or more memories may be integrated with the processor, or may be disposed independent of the processor. This is not limited in this application.

The communications unit may be a transceiver or a transceiver circuit. Optionally, the transceiver may alternatively be an input/output circuit or an interface.

The apparatus may alternatively be a communications chip. The communications unit may be an input/output circuit or an interface of the communications chip.

In another possible design, the communications apparatus includes a transceiver, a processor, and a memory. The processor is configured to control the transceiver or the input/output circuit to receive and send a signal, and the memory is configured to store a computer program. The processor is configured to run the computer program in the memory, to enable the apparatus to perform the method according to any one of the first aspect or the possible designs of the first aspect.

According to a fourth aspect, a communications apparatus is provided. The apparatus is applied to a network device or the apparatus is a network device. The apparatus has a function of implementing the method according to any one of the second aspect or the possible designs of the second aspect, and includes corresponding means for performing the steps or functions described in the foregoing aspect. The steps or functions may be implemented by using software, hardware (for example, a circuit), or a combination of hardware and software.

In a possible design, the communications apparatus includes one or more processors and a communications unit. The one or more processors are configured to support the signal transmission apparatus in executing functions in the foregoing method, for example, invoking the communications unit to receive and/or send a signal. The communications unit is configured to support the communications apparatus in communicating with another device, to implement a receiving function and/or a sending function, for example, receiving capability indication information, and sending downlink control information based on the first codeword.

Optionally, the communications apparatus may further include one or more memories. The memory is configured to be coupled to the processor, and the memory stores program instructions and/or data for the apparatus. The one or more memories may be integrated with the processor, or may be disposed independent of the processor. This is not limited in this application.

The communications unit may be a transceiver or a transceiver circuit. Optionally, the transceiver may alternatively be an input/output circuit or an interface.

The apparatus may alternatively be a communications chip. The communications unit may be an input/output circuit or an interface of the communications chip.

In another possible design, the communications apparatus includes a transceiver, a processor, and a memory. The processor is configured to control the transceiver or the input/output circuit to receive and send a signal, and the memory is configured to store a computer program. The processor is configured to run the computer program in the memory, to enable the apparatus to perform the method according to any one of the second aspect or the possible designs of the second aspect.

According to a fifth aspect, a system is provided, and the system includes a terminal and a network device. The terminal is configured to perform the method according to any one of the first aspect or the possible designs of the first aspect; alternatively, the network device is configured to perform the method according to any one of the second aspect or the possible designs of the second aspect.

According to a sixth aspect, a computer-readable storage medium is provided, and is configured to store a computer program. The computer program includes instructions used to perform the method according to the foregoing aspects.

According to a seventh aspect, a computer program product is provided. The computer program product includes computer program code. When the computer program code is run on a computer, the computer is enabled to perform the method according to the foregoing aspects.

DETAILED DESCRIPTION

Embodiments of this application provide a communications method and apparatus. A terminal implicitly reports an antenna architecture of the terminal in a codeword reporting manner based on a codeword predefined by the terminal and a network device. On the basis that the antenna architecture of the terminal is not leaked, the network device can more accurately determine, based on the codeword, a TPMI and an MCS that are used for uplink transmission, thereby ensuring uplink transmission performance.

The method and the apparatus are based on a same concept. Because principles for resolving problems by using the method and the apparatus are similar, mutual reference may be made between implementations of the apparatus and the method. No repeated description is provided.

In descriptions of the embodiments of this application, the term "and/or" describes an association relationship between associated objects and represents that three relationships may exist. For example, A and/or B may represent the following three cases: A exists, both A and B exist, and B exists. The character "/" generally indicates an "or" relationship between the associated objects. In this application, "at least one" means one or more, and "a plurality of" means two or more. In addition, it should be understood that in the description of this application, terms such as "first" and "second" are merely used for distinguishing and description, but should not be understood as indicating or implying relative importance, or should not be understood as indicating or implying a sequence.

A signal processing method provided in the embodiments of this application may be applied to various communications systems, for example, a long term evolution (LTE) system, a worldwide interoperability for microwave access (WiMAX) communications system, a future 5th generation (5G) system such as a new radio access technology (NR), and a future communications system such as a 6G system.

A network architecture and a service scenario that are described in the embodiments of this application are intended to describe the technical solutions in the embodiments of this application more clearly, and do not constitute a limitation on the technical solutions provided in the embodiments of this application. Persons of ordinary skill in the art may know that, with evolution of the network architecture and emergence of a new service scenario, the technical solutions provided in the embodiments of this application are also applicable to similar technical problems.

Figure 1:
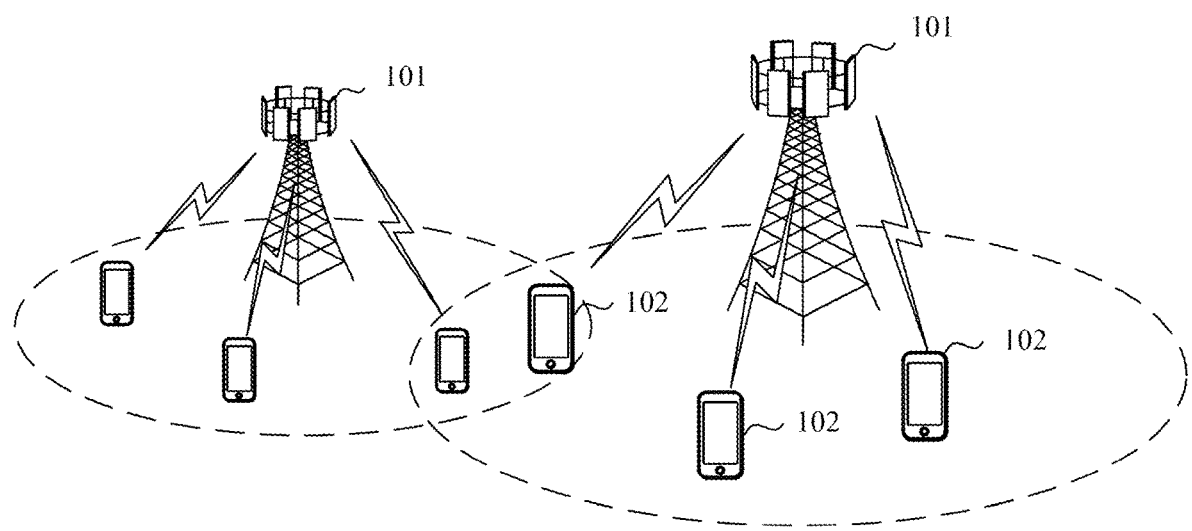
FIG. 1 is a schematic diagram of a communications system architecture according to an embodiment of this application.

FIG. 1 shows an architecture of a possible communications system to which a communications method according to the embodiments of this application is applicable. Referring to FIG. 1, a communications system 100 includes a network device 101 and a terminal 102.

The network device 101 is a device that has a wireless transceiver function or a chip that may be disposed in the device. The device includes but is not limited to: an evolved NodeB (evolved Node B, eNB), a radio network controller (RNC), a NodeB (Node B, NB), a base station controller (BSC), a base transceiver station (BTS), a home base station (for example, a home evolved NodeB or a home Node B, HNB), a baseband unit (BBU), an access point (AP) in a wireless fidelity (Wi-Fi) system, a wireless relay node, a wireless backhaul node, a transmission point (transmission and reception point, TRP or TP), or the like. The device may alternatively be a gNB or a transmission point (TRP or TP) in a 5G system, for example, an NR system, or one antenna panel or one group (including a plurality of antenna panels) of antenna panels of a base station in a 5G system. The device may alternatively be a network node, for example, a baseband unit (BBU) or a distributed unit (DU), that constitutes a gNB or a transmission point.

In some deployments, the gNB may include a centralized unit (CU) and a DU. The gNB may further include a radio unit (RU). The CU implements some functions of the gNB, and the DU implements some functions of the gNB. For example, the CU implements functions of a radio resource control (RRC) layer and a packet data convergence protocol (PDCP) layer, and the DU implements functions of a radio link control (RLC) layer, a media access control (MAC) layer, and a physical (PHY) layer. Information at the RRC layer eventually becomes information at the PHY layer, or is converted from information at the PHY layer. Therefore, in such an architecture, higher layer signaling, such as RRC layer signaling or PHCP layer signaling, may also be considered as being sent by the DU or sent by the DU and the RU. It may be understood that the network device may be a CU node, a DU node, or a device including a CU node and a DU node. In addition, the CU may be classified as a network device in an access network RAN, or the CU may be classified as a network device in a core network CN. This is not limited herein.

The terminal device may also be referred to as user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The terminal device in the embodiments of this application may be a mobile phone, a tablet computer (Pad), a computer that has a wireless transceiver function, a virtual reality (VR) terminal device, an augmented reality (AR) terminal device, a wireless terminal in industrial control, a wireless terminal in self-driving, a wireless terminal in telemedicine (remote medical), a wireless terminal in a smart grid, a wireless terminal in transportation safety, a wireless terminal in a smart city, a wireless terminal in a smart home, or the like. An application scenario is not limited in the embodiments of this application. In this application, a terminal device that has the wireless transceiver function and a chip that may be disposed in the terminal device are collectively referred to as terminal devices.

To facilitate understanding of the embodiments of this application, the following first describes concepts and basic knowledge related to the embodiments of this application.

First, a concept of an antenna port is described.

The antenna port includes an antenna port for an uplink data channel, for example, an antenna port for a physical uplink shared channel (PUSCH); an antenna port for a demodulation reference signal (DMRS); or an antenna port used for a channel sounding reference signal, for example, an antenna port for a sounding reference signal (SRS). The antenna port is an antenna port used to carry a specific physical channel and/or a physical signal. For signals sent over a same antenna port, regardless of whether the signals are sent through a same physical antenna or different physical antennas, channels corresponding to paths through which the signals pass during spatial transmission may be considered to be the same or related. In other words, when demodulating the signals sent over the same antenna port, a receive end may consider that the channels corresponding to the signals are the same or related. The antenna port is a logical concept. Generally, a signal receive end identifies, through antenna ports, signals having different transmission channels. In this application, the antenna port may be considered as a transmit antenna port, and the antenna may be considered as a transmit antenna. Specifically, the antenna ports for the PUSCH or the DMRS are usually logical ports. To be specific, each antenna port for the PUSCH or the DMRS may be a logical port formed on a plurality of physical ports through virtualization by using a physical port of a terminal device or through weighting by using a specific precoding matrix. Each antenna port for the PUSCH or the DMRS may correspond to one transport layer. The antenna port for the SRS may be a physical antenna port, to be specific, a transmission link of each terminal corresponds to one antenna port for the SRS, and the transmission link includes a sending link including a radio frequency RF, a power amplifier PA, and a physical antenna. The antenna port for the SRS may alternatively be a logical port, to be specific, each antenna port for the SRS is formed by virtualization of a plurality of physical antennas or transmission links.

The following describes an uplink transmission mechanism based on a codebook.

Before performing uplink transmission, the terminal reports an antenna capability of the terminal. The antenna capability may be reported by using a radio frequency parameter. The antenna capability may include any one or more of a quantity of antennas, a maximum transmission rank indicator corresponding to a PUSCH and a DMRS that can be supported, a quantity of radio frequency links, a quantity of antennas, a quantity of PAs, a quantity of SRS antenna ports that can be supported, a maximum quantity of radio frequency links, or a maximum quantity of antennas. For example, the quantity of antennas may be 1, 2, or 4, and may be directly reported, or may be implicitly reported by using a maximum quantity of SRS antenna ports. The transmission rank indicator refers to a quantity of spatially formed quadrature signal streams of a transport block (TB) or a codeword, and the transport layer may be mapped to each antenna port for sending based on a precoding manner. For example, the terminal sends data through four antenna ports. Data of a same layer is sent through the four antenna ports in a same precoding manner, and data of another layer is sent through the four antenna ports in another precoding manner. For another example, the four antenna ports include a port 0, a port 1, a port 2, and a port 3, and the terminal sends data of layer 1 through the port 0 and the port 1, and sends data of layer 2 through the port 2 and the port 3. There is a correlation between the foregoing different antenna capabilities: The maximum transmission rank indicator corresponding to the PUSCH and the DMRS that can be supported is equal to the quantity of SRS antenna ports (in one SRS resource) that can be supported. The maximum transmission rank indicator and the quantity of SRS antenna ports are usually the same as a quantity of transmission links or antennas of the terminal. For example, a four-antenna terminal device may usually support PUSCH transmission of a maximum of four layers, and may also support SRS resource configuration of a maximum of four ports. One or more of the foregoing antenna capabilities correspond to N in the present application, that is, a maximum quantity of antenna ports.

Further, the terminal reports a maximum coherent capability between transmit antennas. For a terminal that supports a maximum of two antenna ports, a coherent capability includes a fully-coherent capability and a non-coherent capability. The fully-coherent capability indicates that phase calibration is completed between two transmit antenna ports of the terminal, and phase weighting can be performed, that is, two transmit antennas may be used to send data of a same layer. The non-coherent capability indicates that phase calibration is not completed between two transmit antennas of the terminal, and phase weighting cannot be performed to send data of a same layer, that is, one antenna can be used to send the data of the same layer.

For a four-antenna (port) terminal, a coherent capability includes a fully-coherent capability, a partially-coherent capability, and a non-coherent capability. The fully-coherent capability indicates that phase calibration is completed for all transmit antennas of the UE and phase weighting can be performed, that is, all antennas of the UE can send a same data layer. The partially-coherent capability indicates that phase calibration is completed in pairwise transmit antenna groups of the UE, and phase weighting can be performed. However, phase calibration is not completed between the pairwise transmit antenna groups of the UE, and phase weighting cannot be performed. That is, two transmit antennas in the antenna group can send data of a same layer. The non-coherent capability indicates that phase calibration is not completed between four transmit antennas of the UE, and phase weighting cannot be performed to send a same data layer, that is, one antenna can be used to send data of a same layer.

Before scheduling uplink data, the network device needs to obtain channel information. In this case, the terminal needs to send a sounding reference signal (SRS). The network device determines uplink channel quality by receiving and measuring the SRS, to perform uplink frequency selective scheduling. Because the terminal may have a plurality of transmit antenna ports, an SRS resource of the terminal usually has a plurality of ports that are respectively corresponding to the plurality of transmit antenna ports of the terminal. The base station may obtain channel information of each transmit antenna by measuring the plurality of ports of the SRS, to indicate a precoding manner of each transmit port used for sending uplink data such as the PUSCH. Usually, the base station configures a quantity of antenna ports in the SRS resource to be equal to a maximum quantity of SRS antenna ports reported by the terminal, so that a proper antenna port of the terminal can be selected for data transmission.

The network device may indicate, to the terminal based on the codebook, the precoding manner of each transmit port and select the proper antenna port for data transmission. Both the network device and the terminal prestore a plurality of codebooks for different quantities of antenna ports, different layer quantities, or different waveforms. The codebook may also be considered as a codeword set, for example, the codebook used for uplink transmission shown in Table 1 to Table 7. Codewords in the codebook are arranged from left to right in ascending order of TPMI index values in the table. In actual application, the terminal sends an SRS on the SRS resource configured by the network device. If there are a plurality of ports, the terminal may send an SRS on each of the plurality of ports. The network device receives and measures the SRS on a corresponding SRS resource, to obtain uplink channel information. Based on the channel information, the network device indicates a transmission rank indicator (TRI) of uplink transmission and a TPMI to the terminal by using downlink control information (DCI). The terminal sends uplink data based on the TRI and the TPMI that are indicated in the DCI. Further, if a plurality of SRS resources are configured, an SRS resource indication (SRI) is further indicated in the DCI, and the terminal device sends the PUSCH by using an antenna port used to send the SRS on the SRS resource indicated by the SRI. When indicating the codeword or the TPMI, the network device selects, based on a maximum coherent capability of the terminal, a codeword that matches a coherent capability of the terminal. For example, if the maximum coherent capability reported by the terminal is fully-coherent, the network device may indicate to use a fully-coherent codeword, a partially-coherent codeword, and a non-coherent codeword, or use a partially-coherent codeword and a non-coherent codeword, or use a non-coherent codeword. For another example, if the maximum coherent capability reported by the terminal is partially-coherent, the network device indicates to use a partially-coherent codeword and a non-coherent codeword, or use a non-coherent codeword.

In Table 1 to Table 7, W represents a precoding matrix, and one TPMI index corresponds to one precoding matrix, or corresponds to one codeword. A row in the codeword corresponds to a plurality of transmit antenna ports of the terminal device, and each column corresponds to an antenna port used at the transport layer. For a column, if an element in a row is set to a non-zero value, it indicates that an antenna port corresponding to the row is used to send a transport layer corresponding to the column. In addition, different rows in a same column may indicate different values, and correspond to phase weighting of different antenna ports at the transport layer.

TABLE 1

| TPMI index | W |
|---|---|
| 0-5 | $\frac{1}{\sqrt{2}}\begin{bmatrix}1\\0\end{bmatrix}$ $\frac{1}{\sqrt{2}}\begin{bmatrix}0\\1\end{bmatrix}$ $\frac{1}{\sqrt{2}}\begin{bmatrix}1\\1\end{bmatrix}$ $\frac{1}{\sqrt{2}}\begin{bmatrix}1\\-1\end{bmatrix}$ $\frac{1}{\sqrt{2}}\begin{bmatrix}1\\j\end{bmatrix}$ $\frac{1}{\sqrt{2}}\begin{bmatrix}1\\-j\end{bmatrix}$ — — |

Table 1 is a codebook for single-layer transmission using two antenna ports, and there are six TPMI index values in total, including 0 to 5. Codewords corresponding to the index values 0 and 1 are non-coherent codewords. Codewords corresponding to the index values 2 to 5 are fully-coherent codewords. For example, a codeword corresponding to the TPMI 0 indicates that current data transmission uses one layer, and a port 0 is used for transmission at the layer.

TABLE 2

| TPMI index | W |
|---|---|
| 0-2 | $\frac{1}{\sqrt{2}}\begin{bmatrix}1 & 0\\0 & 1\end{bmatrix}$ $\frac{1}{2}\begin{bmatrix}1 & 1\\1 & -1\end{bmatrix}$ $\frac{1}{2}\begin{bmatrix}1 & 1\\j & -j\end{bmatrix}$ — |

Table 2 is a codebook for two-layer transmission using two antenna ports, and there are three TPMI index values in total, including 0 to 2. A codeword corresponding to the index value 0 is a non-coherent codeword. Codewords corresponding to the index values 1 and 2 are fully-coherent codewords. For example, a codeword corresponding to the TPMI 0 indicates that current data transmission uses two layers, layer 1 transmission uses a port 0, and layer 2 transmission uses a port 1.

TABLE 3

| TPMI index | W |
|---|---|
| 0-7 | $\frac{1}{2}\begin{bmatrix}1\\0\\0\\0\end{bmatrix}$ $\frac{1}{2}\begin{bmatrix}0\\1\\0\\0\end{bmatrix}$ $\frac{1}{2}\begin{bmatrix}0\\0\\1\\0\end{bmatrix}$ $\frac{1}{2}\begin{bmatrix}0\\0\\0\\1\end{bmatrix}$ $\frac{1}{2}\begin{bmatrix}1\\0\\1\\0\end{bmatrix}$ $\frac{1}{2}\begin{bmatrix}1\\0\\-1\\0\end{bmatrix}$ $\frac{1}{2}\begin{bmatrix}1\\0\\j\\0\end{bmatrix}$ $\frac{1}{2}\begin{bmatrix}1\\0\\-j\\0\end{bmatrix}$ |
| 8-15 | $\frac{1}{2}\begin{bmatrix}0\\1\\0\\1\end{bmatrix}$ $\frac{1}{2}\begin{bmatrix}0\\1\\0\\-1\end{bmatrix}$ $\frac{1}{2}\begin{bmatrix}0\\1\\0\\j\end{bmatrix}$ $\frac{1}{2}\begin{bmatrix}0\\1\\0\\-j\end{bmatrix}$ $\frac{1}{2}\begin{bmatrix}1\\1\\1\\-1\end{bmatrix}$ $\frac{1}{2}\begin{bmatrix}1\\1\\j\\j\end{bmatrix}$ $\frac{1}{2}\begin{bmatrix}1\\1\\-1\\1\end{bmatrix}$ $\frac{1}{2}\begin{bmatrix}1\\1\\-j\\-j\end{bmatrix}$ |
| 16-23 | $\frac{1}{2}\begin{bmatrix}1\\j\\1\\j\end{bmatrix}$ $\frac{1}{2}\begin{bmatrix}1\\j\\j\\1\end{bmatrix}$ $\frac{1}{2}\begin{bmatrix}1\\j\\-1\\-j\end{bmatrix}$ $\frac{1}{2}\begin{bmatrix}1\\j\\-j\\-1\end{bmatrix}$ $\frac{1}{2}\begin{bmatrix}1\\-1\\1\\1\end{bmatrix}$ $\frac{1}{2}\begin{bmatrix}1\\-1\\j\\-j\end{bmatrix}$ $\frac{1}{2}\begin{bmatrix}1\\-1\\-1\\-1\end{bmatrix}$ $\frac{1}{2}\begin{bmatrix}1\\-1\\-j\\j\end{bmatrix}$ |
| 24-27 | $\frac{1}{2}\begin{bmatrix}1\\-j\\1\\-j\end{bmatrix}$ $\frac{1}{2}\begin{bmatrix}1\\-j\\j\\-1\end{bmatrix}$ $\frac{1}{2}\begin{bmatrix}1\\-j\\-1\\j\end{bmatrix}$ $\frac{1}{2}\begin{bmatrix}1\\-j\\-j\\1\end{bmatrix}$ — — — — |

Table 3 is a codebook of discrete Fourier transformation-spread-orthogonal frequency division multiplexing (DFT spread OFDM, DFT-s-OFDM) waveforms for single-layer transmission using four antenna ports, and there are 28 TPMI index values in total, including 0 to 27. Codewords corresponding to the index values 0 to 3 are non-coherent codewords. Codewords corresponding to the index values 4 to 11 are partially-coherent codewords. Codewords corresponding to the index values 12 to 27 are fully-coherent codewords.

TABLE 4

| TPMI index | W |
|---|---|
| 0-7 | $\frac{1}{2}\begin{bmatrix}1\\0\\0\\0\end{bmatrix}$, $\frac{1}{2}\begin{bmatrix}0\\1\\0\\0\end{bmatrix}$, $\frac{1}{2}\begin{bmatrix}0\\0\\1\\0\end{bmatrix}$, $\frac{1}{2}\begin{bmatrix}0\\0\\0\\1\end{bmatrix}$, $\frac{1}{2}\begin{bmatrix}1\\0\\1\\0\end{bmatrix}$, $\frac{1}{2}\begin{bmatrix}1\\0\\-1\\0\end{bmatrix}$, $\frac{1}{2}\begin{bmatrix}1\\0\\j\\0\end{bmatrix}$, $\frac{1}{2}\begin{bmatrix}1\\0\\-j\\0\end{bmatrix}$ |
| 8-15 | $\frac{1}{2}\begin{bmatrix}0\\1\\0\\1\end{bmatrix}$, $\frac{1}{2}\begin{bmatrix}0\\1\\0\\-1\end{bmatrix}$, $\frac{1}{2}\begin{bmatrix}0\\1\\0\\j\end{bmatrix}$, $\frac{1}{2}\begin{bmatrix}0\\1\\0\\-j\end{bmatrix}$, $\frac{1}{2}\begin{bmatrix}1\\1\\1\\1\end{bmatrix}$, $\frac{1}{2}\begin{bmatrix}1\\1\\j\\j\end{bmatrix}$, $\frac{1}{2}\begin{bmatrix}1\\1\\-1\\-1\end{bmatrix}$, $\frac{1}{2}\begin{bmatrix}1\\1\\-j\\-j\end{bmatrix}$ |
| 16-23 | $\frac{1}{2}\begin{bmatrix}1\\j\\1\\j\end{bmatrix}$, $\frac{1}{2}\begin{bmatrix}1\\j\\j\\-1\end{bmatrix}$, $\frac{1}{2}\begin{bmatrix}1\\j\\-1\\-j\end{bmatrix}$, $\frac{1}{2}\begin{bmatrix}1\\j\\-j\\1\end{bmatrix}$, $\frac{1}{2}\begin{bmatrix}1\\-1\\1\\-1\end{bmatrix}$, $\frac{1}{2}\begin{bmatrix}1\\-1\\j\\-j\end{bmatrix}$, $\frac{1}{2}\begin{bmatrix}1\\-1\\-1\\1\end{bmatrix}$, $\frac{1}{2}\begin{bmatrix}1\\-1\\-j\\j\end{bmatrix}$ |
| 24-27 | $\frac{1}{2}\begin{bmatrix}1\\-j\\1\\-j\end{bmatrix}$, $\frac{1}{2}\begin{bmatrix}1\\-j\\j\\1\end{bmatrix}$, $\frac{1}{2}\begin{bmatrix}1\\-j\\-1\\j\end{bmatrix}$, $\frac{1}{2}\begin{bmatrix}1\\-j\\-j\\-1\end{bmatrix}$ |

Table 4 is a codebook of cyclic prefix (CP)-OFDM waveforms for single-layer transmission using four antenna ports, and there are 28 TPMI index values in total, including 0 to 27. Codewords corresponding to the index values 0 to 3 are non-coherent codewords. Codewords corresponding to the index values 4 to 11 are partially-coherent codewords. Codewords corresponding to the index values 12 to 27 are fully-coherent codewords.

TABLE 5

| TPMI index | W |
|---|---|
| 0-3 | $\frac{1}{2}\begin{bmatrix}1&0\\0&1\\0&0\\0&0\end{bmatrix}$, $\frac{1}{2}\begin{bmatrix}1&0\\0&0\\0&1\\0&0\end{bmatrix}$, $\frac{1}{2}\begin{bmatrix}1&0\\0&0\\0&0\\0&1\end{bmatrix}$, $\frac{1}{2}\begin{bmatrix}0&0\\1&0\\0&1\\0&0\end{bmatrix}$ |
| 4-7 | $\frac{1}{2}\begin{bmatrix}0&0\\1&0\\0&0\\0&1\end{bmatrix}$, $\frac{1}{2}\begin{bmatrix}0&0\\0&0\\1&0\\0&1\end{bmatrix}$, $\frac{1}{2}\begin{bmatrix}1&0\\0&1\\1&0\\0&-j\end{bmatrix}$, $\frac{1}{2}\begin{bmatrix}1&0\\0&1\\1&0\\0&j\end{bmatrix}$ |
| 8-11 | $\frac{1}{2}\begin{bmatrix}1&0\\0&1\\-j&0\\0&1\end{bmatrix}$, $\frac{1}{2}\begin{bmatrix}1&0\\0&1\\-j&0\\0&-1\end{bmatrix}$, $\frac{1}{2}\begin{bmatrix}1&0\\0&1\\-1&0\\0&-j\end{bmatrix}$, $\frac{1}{2}\begin{bmatrix}1&0\\0&1\\-1&0\\0&j\end{bmatrix}$ |
| 12-15 | $\frac{1}{2}\begin{bmatrix}1&0\\0&1\\j&0\\0&1\end{bmatrix}$, $\frac{1}{2}\begin{bmatrix}1&0\\0&1\\j&0\\0&-1\end{bmatrix}$, $\frac{1}{2\sqrt{2}}\begin{bmatrix}1&1\\1&1\\1&-1\\1&-1\end{bmatrix}$, $\frac{1}{2\sqrt{2}}\begin{bmatrix}1&1\\1&1\\j&-j\\j&-j\end{bmatrix}$ |

TABLE 5-continued

| TPMI index | W |
|---|---|
| 16-19 | $\frac{1}{2\sqrt{2}}\begin{bmatrix} 1 & 1 \\ j & j \\ 1 & -1 \\ j & -j \end{bmatrix}$   $\frac{1}{2\sqrt{2}}\begin{bmatrix} 1 & 1 \\ j & j \\ j & -j \\ -1 & 1 \end{bmatrix}$   $\frac{1}{2\sqrt{2}}\begin{bmatrix} 1 & 1 \\ -1 & -1 \\ 1 & -1 \\ -1 & 1 \end{bmatrix}$   $\frac{1}{2\sqrt{2}}\begin{bmatrix} 1 & 1 \\ -1 & -1 \\ j & -j \\ -j & j \end{bmatrix}$ |
| 20-21 | $\frac{1}{2\sqrt{2}}\begin{bmatrix} 1 & 1 \\ -j & -j \\ 1 & -1 \\ -j & j \end{bmatrix}$   $\frac{1}{2\sqrt{2}}\begin{bmatrix} 1 & 1 \\ -j & -j \\ j & -j \\ 1 & -1 \end{bmatrix}$   —   — |

Table 5 is a codebook of CP-OFDM waveforms for two-layer transmission using four antenna ports, and there are 22 TPMI index values in total, including 0 to 21. Codewords corresponding to the index values 0 to 5 are non-coherent codewords. Codewords corresponding to the index values 6 to 13 are partially-coherent codewords. Codewords corresponding to the index values 14 to 21 are fully-coherent codewords.

codeword corresponding to the index value 0 is a non-coherent codeword. Codewords corresponding to the index values 1 and 2 are partially-coherent codewords. Codewords corresponding to the index values 3 to 4 are fully-coherent codewords.

If the terminal supports more ports, a quantity of predefined codebooks is greater. In addition to a form of a table, the codebook may also be represented in another form.

TABLE 6

| TPMI index | W |
|---|---|
| 0-3 | $\frac{1}{2}\begin{bmatrix} 1 & 0 & 0 \\ 0 & 1 & 0 \\ 0 & 0 & 1 \\ 0 & 0 & 0 \end{bmatrix}$   $\frac{1}{2}\begin{bmatrix} 1 & 0 & 0 \\ 0 & 1 & 0 \\ 1 & 0 & 0 \\ 0 & 0 & 1 \end{bmatrix}$   $\frac{1}{2}\begin{bmatrix} 1 & 0 & 0 \\ 0 & 1 & 0 \\ -1 & 0 & 0 \\ 0 & 0 & 1 \end{bmatrix}$   $\frac{1}{2\sqrt{3}}\begin{bmatrix} 1 & 1 & 1 \\ 1 & -1 & 1 \\ 1 & 1 & -1 \\ 1 & -1 & -1 \end{bmatrix}$ |
| 4-6 | $\frac{1}{2\sqrt{3}}\begin{bmatrix} 1 & 1 & 1 \\ 1 & -1 & 1 \\ j & j & -j \\ j & -j & -j \end{bmatrix}$   $\frac{1}{2\sqrt{3}}\begin{bmatrix} 1 & 1 & 1 \\ -1 & 1 & -1 \\ 1 & 1 & -1 \\ -1 & 1 & 1 \end{bmatrix}$   $\frac{1}{2\sqrt{3}}\begin{bmatrix} 1 & 1 & 1 \\ -1 & 1 & -1 \\ j & j & -j \\ -j & j & j \end{bmatrix}$   — |

Table 6 is a codebook of CP-OFDM waveforms for three-layer transmission using four antenna ports, and there are seven TPMI index values in total, including 0 to 6. A codeword corresponding to the index value 0 is a non-coherent codeword. Codewords corresponding to the index values 1 and 2 are partially-coherent codewords. Codewords corresponding to the index values 3 to 6 are fully-coherent codewords.

The following describes a mechanism for determining transmit power of the terminal.

Before performing uplink transmission, the terminal needs to determine transmit power of a channel for uplink transmission. PUSCH transmission is used as an example. In a possible implementation of the current technology (referred to as the current technology 1 in the following), actual transmit power for uplink transmission of a terminal is

TABLE 7

| TPMI index | W |
|---|---|
| 0-3 | $\frac{1}{2}\begin{bmatrix} 1 & 0 & 0 & 0 \\ 0 & 1 & 0 & 0 \\ 0 & 0 & 1 & 0 \\ 0 & 0 & 0 & 1 \end{bmatrix}$   $\frac{1}{2\sqrt{2}}\begin{bmatrix} 1 & 1 & 0 & 0 \\ 0 & 0 & 1 & 1 \\ 1 & -1 & 0 & 0 \\ 0 & 0 & 1 & -1 \end{bmatrix}$   $\frac{1}{2\sqrt{2}}\begin{bmatrix} 1 & 1 & 0 & 0 \\ 0 & 0 & 1 & 1 \\ j & -j & 0 & 0 \\ 0 & 0 & j & -j \end{bmatrix}$   $\frac{1}{4}\begin{bmatrix} 1 & 1 & 1 & 1 \\ 1 & -1 & 1 & -1 \\ 1 & 1 & -1 & -1 \\ 1 & -1 & -1 & 1 \end{bmatrix}$ |
| 4 | $\frac{1}{4}\begin{bmatrix} 1 & 1 & 1 & 1 \\ 1 & -1 & 1 & -1 \\ j & j & -j & -j \\ j & -j & -j & j \end{bmatrix}$   —   —   — |

Table 7 is a codebook of CP-OFDM waveforms for four-layer transmission using four antenna ports, and there are five TPMI index values in total, including 0 to 4. A determined by multiplying channel transmit power $P_{PUSCH,b,f,c}(i,j,q_d,l)$ by a ratio of a quantity of non-zero antenna ports to a maximum quantity of antenna ports that can be supported by the terminal. The ratio of the quantity n of non-zero antenna ports to the maximum quantity of antenna ports that can be supported by the terminal is a power scaling factor, and the power scaling factor is equal to a ratio of actual transmit power to channel transmit power. The actual transmit power for uplink transmission is a sum of actual transmit power of n non-zero antenna ports. The n non-zero antenna ports are determined based on a TPMI indicated by a base station. Specifically, n is a quantity of rows in which at least one non-zero element is included in a codeword corresponding to the TPMI. Further, the obtained scaled channel transmit power is evenly allocated to each non-zero antenna port, and the non-zero antenna port is determined based on the TPMI in Table 1-7. Table 4 is used as an example. If the network device indicates the TPMI 0, a quantity of non-zero antenna ports is 1, and a quantity of configured antenna ports is 4, actual transmit power of the PUSCH is ¼ $P_{PUSCH,b,f,c}(i,j,q_d,l)$, and the transmit power is allocated to the port 0. Table 5 is used as an example. If the network device indicates the TPMI 0, a quantity of non-zero PUSCH transmission antenna ports is 2, a quantity of configured antenna ports is 4, actual transmit power of the PUSCH is ½ $P_{PUSCH,b,f,c}(i,j,q_d,l)$, and the transmit power is allocated to the port 0 and the port 2. In this case, power on each antenna port is ¼$P_{PUSCH,b,f,c}(i,j,q_d,l)$. If the network device indicates the TPMI 7, the quantity of non-zero PUSCH transmission antenna ports is 4, the total quantity of configured antenna ports is 4, the actual transmit power of the PUSCH is $P_{PUSCH,b,f,c}(i,j,q_d,l)$, and the power on each antenna port is ¼$P_{PUSCH,b,f,c}(i,j,q_d,l)$.

The terminal determines the channel transmit power $P_{PUSCH,b,f,c}(i,j,q_d,l)$ according to the following formula:

of the plurality of parameter values based on a corresponding indication field in downlink control information (DCI) to determine, or selects one of the plurality of parameter values based on a predefined rule to determine.

$\alpha_{a,b,c}(j)$ is a parameter value configured by the network device by using higher layer signaling. When the network device configures a plurality of parameter values by using a higher layer, the terminal device further selects one of the plurality of parameter values based on a corresponding indication field in downlink control information (DCI) to determine, or selects one of the plurality of parameter values based on a predefined rule to determine.

$M_{RB,b,f,c}^{PUSCH}(i)$ is a quantity of resource blocks (RB) occupied by the PUSCH.

$PL_{b,f,c}(q_d)$ is obtained through estimation based on a reference signal (RS) configured by the network device.

A value of $\Delta_{TF,b,f,c}(i)$ is related to a transmission rank indicator, and may be related to a quantity of code blocks, a code block size, a quantity of REs occupied by the PUSCH, and a type of data carried on the PUSCH. A calculation method of $\Delta_{TF,b,f,c}(i)$ is $\Delta_{TF,b,f,c}(i)=10 \log_{10}((2^{BPRE \cdot K_S}-1) \times \beta_{offset}^{PUSCH})$. $K_S$ is indicated by using higher layer signaling, a value of BPRE is related to the quantity of code blocks, the code block size, the quantity of REs occupied by the PUSCH, and $\beta_{offset}^{PUSCH}$ related to the type of data carried on the PUSCH.

$f_{b,f,c}(i,l)$ is determined based on a transmit power control (TPC) indication carried in the DCI, in a scenario in which the TPC indicates an accumulated amount, $f_{b,f,c}(i,l)=f_{b,f,c}(i_{last},l)+\delta_{PUSCH,b,f,c}(i_{last},i,K_{PUSCH},l)$, and in a scenario in which the TPC indicates an absolute amount, $f_{b,f,c}(i,l)=\delta_{PUSCH,b,f,c}(i_{last},i,K_{PUSCH},l)$.

$$P_{PUSCH,b,f,c}(i, j, q_d, l) = \min\left\{\begin{array}{l} P_{CMAX,f,c}(i), \\ P_{O\_PUSCH,b,f,c}(j) + 10\log_{10}(2^\mu \cdot M_{RB,b,f,c}^{PUSCH}(i)) + \alpha_{b,f,c}(j) \cdot PL_{b,f,c}(q_d) + \Delta_{TF,b,f,c}(i) + f_{b,f,c}(i, l) \end{array}\right\} [dBm].$$

b is a bandwidth part (BWP) occupied by the physical uplink shared channel (PUSCH) transmission, f is a carrier occupied by the PUSCH transmission, c is a serving cell in which the carrier is located, l is a power control parameter set configured by the network device by using higher layer signaling, and parameter values configured by using the following higher layer signaling are all configured in the power control parameter set.

$p_{CMAX,f,c}(i)$ is maximum transmit power allowed by a communications system, that is, rated maximum transmit power of the system. A value of the maximum transmit power may fluctuate according to a protocol specification and an actual transmission channel condition. The rated maximum transmit power of the system may represent a capability of maximum power supported by the terminal device for sending uplink data, in other words, maximum transmit power that can be supported by the terminal device. Optionally, the maximum transmit power may be transmit power configured by the network device for the terminal device, and indicates maximum transmit power that the network device allows the terminal device to use. Optionally, the maximum transmit power may alternatively be maximum transmit power that can be used by the terminal device and that is agreed on by the network device.

$P_{O\_PUSCH,b,f,c}(j)$ is a parameter value configured by the network device by using higher layer signaling. When the network device configures a plurality of parameter values by using a higher layer, the terminal device further selects one In the current technology 1, the terminal determines, based on the channel transmit power and the quantity M of configured antenna ports, transmit power used on each antenna port. For example, the transmit power on each antenna port is a ratio of the channel transmit power to M. In actual uplink transmission, an actual quantity of antenna ports used to send uplink data may be less than or equal to M, and the actual transmit power indicates a sum of transmit power of the antenna ports actually used by the terminal to send the uplink data. The actual transmit power is less than or equal to the channel transmit power. A determining manner in the current technology 1 may be understood as that power scaling (scale) is performed on the channel transmit power.

In a power control mechanism in the current technology 1, total PUSCH transmit power is a ratio of a quantity of non-zero antenna ports to a quantity of configured antenna ports multiplied by the channel transmit power $P_{PUSCH,b,f,c}(i,j,q_d,l)$. In the current technology 2, the total PUSCH transmit power is changed to: $\beta P_{PUSCH,b,f,c}(i,j,q_d,l)$. When the DCI indicates a fully-coherent codeword, a value of β is: an antenna corresponding to a non-zero PUSCH/a configured antenna; when the DCI indicates a partially-coherent/non-coherent codeword, a value of β is: an antenna corresponding to a non-zero PUSCH/a configured antenna multiplied by 2; and when the DCI indicates a non-coherent codeword, a value of β is: an antenna corresponding to a non-zero PUSCH. An effect of the current technology 2 is as follows: When the TPMI indicates the partially-coherent/non-coherent codeword, a weight coefficient between transmit antennas is improved in uplink PUSCH power control to adjust actual transmit power of the PUSCH, so as to ensure that maximum transmit power of the PUSCH of terminals with different coherent capabilities does not change.

The channel transmit power mentioned in this embodiment of this application may be considered as $\beta P_{PUSCH,b,f,c}(i,j,q_d,l)$ in the current technology 2, that is, transmit power that is not scaled.

When transmitting the uplink data, the terminal needs to first determine the channel transmit power of uplink transmission. In this application, the terminal can send the uplink data by using the channel transmit power that is not scaled. A maximum value of the channel transmit power is maximum output power of the frequency band occupied by uplink transmission of the terminal. In actual implementation, if a power class (power classes) of the terminal is defined, the channel transmit power is not greater than the power class of the terminal. The power class of the terminal may be adjusted based on a tolerance. For example, as shown in Table 8, power classes and tolerances of the terminal on different frequency bands are defined.

TABLE 8

| Frequency band | Class 2 (dBm) | Tolerance (dB) | Class 3 (dBm) | Tolerance (dB) |
|---|---|---|---|---|
| n1 | | | 23 | ±2 |
| n2 | | | 23 | ±2[3] |
| n8 | | | 23 | ±2[3] |
| n12 | | | 23 | ±2[3] |
| n25 | | | 23 | ±2 |
| n34 | | | 23 | ±2 |
| n39 | | | 23 | ±2 |
| n40 | | | 23 | ±2 |
| n41 | 26 | +2/−3[3] | 23 | ±2[3] |
| n66 | | | 23 | ±2 |
| n70 | | | 23 | ±2 |
| n71 | | | 23 | +2/−2.5 |
| n77 | 26 | +2/−3 | 23 | +2/−3 |
| n78 | 26 | +2/−3 | 23 | +2/−3 |
| n79 | 26 | +2/−3 | 23 | +2/−3 |
| n80 | | | 23 | ±2 |
| n81 | | | 23 | ±2 |
| n82 | | | 23 | ±2 |
| n83 | | | 23 | ±2/−2.5 |
| n84 | | | 23 | ±2 |
| n86 | | | 23 | ±2 |

After the tolerance of the terminal is adjusted, a maximum value of the channel transmit power of the terminal does not exceed an adjusted power class.

That the power class of the terminal in Table 8 is the class 3 is used as an example. If the tolerance is not considered, the power class of the terminal is 23 dBm. The maximum value of the channel transmit power of the terminal may be determined as 23 dBm or a value less than or greater than 23 dBm.

An antenna port of the terminal has maximum transmit power based on a capability of a PA. Not all maximum transmit power of antenna ports of the terminal can support the maximum value of the channel transmit power. When the maximum transmit power of the antenna port of the terminal is not greater than the maximum value of the channel transmit power, the terminal may achieve the maximum value of the channel transmit power in a manner of virtualizing a plurality of antenna ports.

To support the method in which the terminal performs uplink transmission by using the channel transmit power obtained by using a mechanism in which power is not scaled, the network device can indicate correct downlink control information to the terminal. In this embodiment of this application, a communications method is designed. That the terminal uses a mechanism in which power is not scaled may also be referred to as that the terminal uses a full power transmission mechanism. The full power transmission mechanism means that the terminal allocates, to an antenna port of the terminal, channel transmit power obtained without using a power scaling mechanism, and sends uplink data to the network device.

Figure 2:
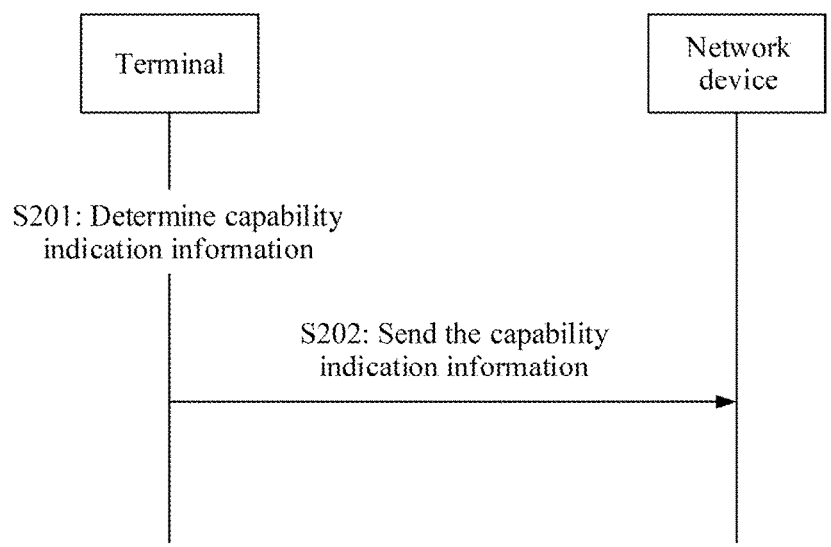
FIG. 2 is a schematic flowchart of a communications method according to an embodiment of this application.

Based on the foregoing description and the system architecture shown in FIG. 1, as shown in FIG. 2, a specific process of the communications method provided in this embodiment of this application is described as follows. Any two or more consecutive steps may constitute a solution that needs to be protected in this application, and remaining steps are optional steps. For example, a solution including S201 and S202 is a protection scope of this application.

At S201, the terminal determines capability indication information.

At S202, the terminal sends the capability indication information to the network device, and the network device receives the capability indication information from the terminal.

The capability indication information may be a capability that represents whether transmit power of the terminal can reach the rated maximum transmit power of the system, and the capability indication information may further represent that the terminal device supports the full power transmission mechanism or the power control mechanism. Whether the transmit power of the terminal reaches the rated maximum transmit power of the system and how the transmit power reaches the rated maximum transmit power of the system depend on an antenna architecture in which the terminal performs uplink transmission, for example, maximum transmit power of each PA, if there is a PA whose transmit power reaches rated transmit power of the system, when a port corresponding to the PA is used for uplink transmission, the rated maximum transmit power of the system may be reached, that is, the channel transmit power may be allocated to the port; and a manner of implementing uplink transmission by the terminal, for example, whether an antenna can be virtualized into an antenna port, so as to combine transmit power of a plurality of PAs that cannot reach the rated maximum transmit power of the system, to form an antenna port that can reach the rated maximum transmit power of the system. In this case, the capability indication information may also implicitly represent an antenna form of uplink transmission of the terminal, or a transmission manner of implementing full power transmission, so that the base station can select a proper TPMI and MCS.

Specifically, the capability indication information is used to determine a value of the power scaling factor. It may be understood that an actual value of the power scaling factor may be further indicated by the base station. The capability indication information herein is used to determine a maximum value of the power scaling factor, or in other words, a calculation method. The power scaling factor is used to determine the sum of actual transmit power of n non-zero antenna ports: the channel transmit power multiplied by the power scaling factor. Determining the power scaling factor based on the capability indication information is determining uplink transmit power based on a power control mechanism that can be supported by the terminal to implement full power uplink transmission. The determining the power scaling factor may be specifically determining the value of the power scaling factor, or may be determining the calculation method of the power scaling factor, or may be determining a value range of the power scaling factor. Details are described below.

A value 1 (a calculation method 1 or a value range 1): The power scaling factor is directly determined as 1, or a power scaling operation is removed from a step in which the terminal device determines actual transmit power of each port, that is, the channel transmit power may be directly evenly allocated to each non-zero antenna port. In this case, that the value of the power scaling factor is set to 1 may enable the actual transmit power of uplink transmission to reach the rated maximum transmit power of the system, or implement the full power transmission. It should be understood that the actual transmit power of uplink transmission or total actual transmit power is a sum of actual transmit power on all non-zero antenna ports. When the full power transmission is implemented, the sum of actual transmit power or the actual transmit power of uplink transmission is the channel transmit power. In this case, it means that all PAs configured for the terminal device can reach the rated maximum transmit power of the system. In other words, for all codewords (in Table 1-7), the value of the power scaling factor may be set to 1, or all codewords can support the full power transmission mechanism. In the present application, the value 1 corresponds to the full power transmission. For example, when the quantity of non-zero antenna ports is 1, and the value of the power scaling factor is the value 1, the actual transmit power on the non-zero antenna port is the channel transmit power.

It should be further understood that, due to accuracy of components, there may be a slight difference between the actual transmit power determined by the terminal device and the channel transmit power. That is, the actual transmit power may be slightly greater than the rated maximum transmit power of the system. The rated maximum transmit power of the system herein is a reference for determining the maximum value of the transmit power by the terminal device.

A value 2 (a calculation method 2 or a value range 2): The power scaling factor is equal to n/M, where n is a quantity of current non-zero antenna ports, and M is a quantity of SRS ports in a current SRS resource. n is determined based on the TPMI indicated in the DCI for scheduling the uplink data, and n is a quantity of rows of a matrix in which there is a non-zero element in a precoding matrix corresponding to the TPMI. A non-zero antenna port indicates that the antenna port is used to send the uplink data, or indicates that the antenna port is non-zero power. When the network device configures one SRS resource, a value of M is determined based on a quantity of SRS ports included in the SRS resource, that is, M is equal to the quantity of ports in the SRS resource. When the network device configures a plurality of SRS resources, the value of M is determined based on the quantity of ports in the SRS resource indicated by the SRI in the DCI, that is, M is equal to the quantity of ports in the SRS resource. For example, for a terminal device that supports a maximum of four antenna ports, the base station may configure one SRS resource with four ports (numbered 0). In this case, if the DCI indicates the non-coherent codeword or the partially-coherent codeword, the power scaling factor is equal to ¼ or ½, and the maximum transmit power of the uplink data is ¼ or ½ of the rated maximum transmit power of the system. If the base station is configured with one SRS resource with one port (numbered 1) and one SRS resource with two ports (numbered 2) at the same time, and if the TPMI in the DCI indicates the non-coherent codeword or the partially-coherent codeword and the SRI in the DCI indicates the SRS resource number 0, the power scaling factor is equal to ¼ or ½, and the maximum transmit power of the uplink data is ¼ or ½ of the rated maximum transmit power of the system. If the TPMI in the DCI indicates the non-coherent codeword or the partially-coherent codeword and the SRI in the DCI indicates the SRS resource number 0, the power scaling factor is equal to ¼ or ½, and the maximum transmit power of the uplink data is ¼ or ½ of the rated maximum transmit power of the system. If the SRI in the DCI indicates the SRS resource number 1, and the power scaling factor is equal to 1, the transmit power of the uplink data is equal to the channel transmit power, and the maximum transmit power is the rated maximum transmit power of the system. If the SRI in the DCI indicates the SRS resource number 2 and indicates a TPMI 0 or a TPMI 1 (two-port codebook), the power scaling factor is equal to ½, the transmit power of the uplink data is equal to ½ of the channel transmit power, and the maximum transmit power is ½ of the rated maximum transmit power of the system. When a TPMI 2 is indicated, the power scaling factor is equal to 1, the transmit power of the uplink data is equal to the channel transmit power, and the maximum transmit power is the rated maximum transmit power of the system. In this case, it means that the terminal device has a PA that cannot reach the rated maximum transmit power of the system. In other words, for some codewords (in Table 1-7), the power scaling factor cannot be set to 1, or the full power transmission mechanism cannot be supported.

A value 3 (a calculation method 3 or a value range 3): The power scaling factor is equal to n/N, where n is a quantity of current non-zero antenna ports, and N is a maximum quantity of SRS ports that can be supported by the terminal. The quantity of SRS ports is usually a quantity of SRS ports in one SRS resource, or may be a quantity of all SRS ports in one SRS resource set. In this case, regardless of a configured quantity or an indicated quantity of SRS ports in the SRS resource, for a terminal device with four antenna ports, when the DCI indicates the non-coherent codeword, the power scaling factor is ¼; when the DCI indicates the partially-coherent codeword, the power scaling factor is ½; and for a terminal device with two antenna ports, when the DCI indicates the non-coherent codeword, the power scaling factor is ½. In this case, it means that the terminal device does not support the full power transmission mechanism.

Optionally, the capability indication information is used to indicate a codeword. For ease of description, it is referred to as a first codeword herein. The first codeword is represented as an N*A matrix. N*A indicates that a dimension of the matrix is N rows and A columns, where N and A are positive integers. It should be understood that the first codeword may be represented and stored in a form of an array. Each specific position in the array has a specific element. In this application, a row/column of the matrix may be transformed only for ease of description, and during actual implementation, the terminal may directly schedule several elements in the array to form a specific set, and the specific set corresponds to a function of the first codeword. It should be understood that N may be other capability indication information that is different from the capability indication information and that is reported by the terminal to the base station.

Optionally, the one or more codewords indicated by the capability indication information are represented as an N*A matrix, where A is a current transmission rank indicator, a value of A is 1 when N=2, and a value of A is one or more of 1, 2, or 3 when N=4.

A status bit of the capability indication information corresponds to one codeword or one group of codewords; alternatively, a bit of the capability indication information corresponds to one codeword or one group of codewords.

Optionally, the one or more codewords indicated by the capability indication information include a codeword group 1, and the codeword group 1 includes at least one of the following codewords:

$$\frac{1}{a}\begin{bmatrix}1\\0\end{bmatrix}, \frac{1}{a}\begin{bmatrix}0\\1\end{bmatrix},$$

where a value of a is 1 or $\sqrt{2}$; and/or
the one or more codewords indicated by the capability indication information include a codeword group 2, and the codeword group 2 includes the following codeword:

$$\frac{1}{\sqrt{2}}\begin{bmatrix}1\\b\end{bmatrix},$$

where a value of a is 1 or $\sqrt{2}$, and a value of b is at least one of 1, −1, j, and −j.

Optionally, the one or more codewords indicated by the capability indication information include one or more codewords in a first codeword group, and the first codeword group includes at least one of the following codewords:

$$\frac{1}{a}\begin{bmatrix}1\\0\\0\\0\end{bmatrix}, \frac{1}{a}\begin{bmatrix}0\\1\\0\\0\end{bmatrix}, \frac{1}{a}\begin{bmatrix}0\\0\\1\\0\end{bmatrix}, \text{and } \frac{1}{a}\begin{bmatrix}0\\0\\0\\1\end{bmatrix},$$

where a value of a is 1 or 0.5; and/or
the one or more codewords indicated by the capability indication information include one or more codewords in a second codeword group, and the second codeword group includes at least one of the following codewords:

$$\frac{1}{b}\begin{bmatrix}1\\0\\1\\0\end{bmatrix}, \frac{1}{b}\begin{bmatrix}1\\0\\-1\\0\end{bmatrix}, \frac{1}{b}\begin{bmatrix}1\\0\\j\\0\end{bmatrix}, \text{and } \frac{1}{b}\begin{bmatrix}1\\0\\-j\\0\end{bmatrix},$$

where a value of b is $\sqrt{2}$ or 0.5; and/or
the one or more codewords indicated by the capability indication information include one or more codewords in a third codeword group, and the third codeword group includes at least one of the following codewords:

$$\frac{1}{b}\begin{bmatrix}0\\1\\0\\1\end{bmatrix}, \frac{1}{b}\begin{bmatrix}0\\1\\0\\-1\end{bmatrix}, \frac{1}{b}\begin{bmatrix}0\\1\\0\\j\end{bmatrix}, \text{and } \frac{1}{b}\begin{bmatrix}0\\1\\0\\-j\end{bmatrix},$$

where a value of b is $\sqrt{2}$ or 0.5; and/or
the one or more codewords indicated by the capability indication information include one or more codewords in a fourth codeword group, and the fourth codeword group includes $$\frac{1}{2}\begin{bmatrix}1\\e\\f\\g\end{bmatrix},$$

where values of e, f, and g each are one or more of 1, −1, j, and −j; and/or
the one or more codewords indicated by the capability indication information include a fifth codeword group, and the fifth codeword group includes at least one of the following codewords:

$$\frac{1}{b}\begin{bmatrix}1&0\\0&1\\0&0\\0&0\end{bmatrix}, \frac{1}{b}\begin{bmatrix}1&0\\0&0\\0&1\\0&0\end{bmatrix}, \frac{1}{b}\begin{bmatrix}1&0\\0&0\\0&0\\0&1\end{bmatrix}, \frac{1}{b}\begin{bmatrix}0&0\\1&0\\0&1\\0&0\end{bmatrix}, \frac{1}{b}\begin{bmatrix}0&0\\1&0\\0&0\\0&1\end{bmatrix}, \text{and } \frac{1}{b}\begin{bmatrix}0&0\\0&0\\1&0\\0&1\end{bmatrix},$$

where a value of b is $\sqrt{2}$ or 2; and/or
the one or more codewords indicated by the capability indication information include a sixth codeword group, and the sixth codeword group includes at least one of the following codewords:

$$\frac{1}{2}\begin{bmatrix}1&0\\0&1\\c1&0\\0&d1\end{bmatrix},$$

where values of c1 and d1 each are one or more of 1, −1, j, and −j; and/or
the one or more codewords indicated by the capability indication information include a seventh codeword group, and the seventh codeword group includes the following codeword:

$$\frac{1}{2}\begin{bmatrix}1&0\\e1&e2\\f1&f2\\g1&g2\end{bmatrix},$$

where values of e1, f1, g1, e2, f2 and g2 are one or more of 1, −1, j, and −j; and/or
the one or more codewords indicated by the capability indication information include an eighth codeword group, and the eighth codeword group includes the following codeword:

$$\frac{1}{2}\begin{bmatrix}1&0&0\\0&1&0\\0&0&1\\0&0&0\end{bmatrix};$$

and/or
the one or more codewords indicated by the capability indication information include a ninth codeword group, and the ninth codeword group includes one or more of the following codewords:

$$\frac{1}{2}\begin{bmatrix} 1 & 0 & 0 \\ 0 & 1 & 0 \\ 1 & 0 & 1 \\ 0 & 0 & 0 \end{bmatrix}, \text{ and } \frac{1}{2}\begin{bmatrix} 1 & 0 & 0 \\ 0 & 1 & 0 \\ -1 & 0 & 1 \\ 0 & 0 & 0 \end{bmatrix};$$

and/or the one or more codewords indicated by the capability indication information include a tenth codeword group, and the tenth codeword group includes one or more of the following codewords:

$$\frac{1}{2}\begin{bmatrix} 1 & 1 & 1 \\ 1 & -1 & 1 \\ 1 & 1 & -1 \\ 1 & -1 & -1 \end{bmatrix}, \frac{1}{2}\begin{bmatrix} 1 & 1 & 1 \\ 1 & -1 & 1 \\ j & j & -j \\ j & -j & -j \end{bmatrix},$$

$$\frac{1}{2}\begin{bmatrix} 1 & 1 & 1 \\ -1 & 1 & -1 \\ 1 & 1 & -1 \\ -1 & 1 & 1 \end{bmatrix}, \text{ and } \frac{1}{2}\begin{bmatrix} 1 & 1 & 1 \\ -1 & 1 & -1 \\ j & j & -j \\ -j & j & j \end{bmatrix}.$$

Optionally, five status bits of the capability indication information respectively correspond to zero codewords, one codeword, two codewords, three codewords, and four codewords in the first codeword group; or four bits of the capability indication information respectively correspond to four codewords in the first codeword group; and/or one bit of the capability indication information corresponds to some or all codewords in the second codeword group; and/or one bit of the capability indication information corresponds to some or all codewords in the third codeword group; and/or one bit of the capability indication information corresponds to some or all codewords in the fourth codeword group; and/or one bit of the capability indication information corresponds to some or all codewords in the sixth codeword group; and/or one bit of the capability indication information corresponds to some or all codewords in the seventh codeword group; and/or one bit of the capability indication information corresponds to codewords in the eighth codeword group; and/or one bit of the capability indication information corresponds to some or all codewords in the ninth codeword group; and/or one bit of the capability indication information corresponds to some or all codewords in the tenth codeword group; and/or two bits of the capability indication information respectively correspond to two codewords in the codeword group 1; and/or one bit of the capability indication information corresponds to one or more codewords in the codeword group 2.

Optionally, three codewords in the fifth codeword group respectively correspond to three bits in the capability indication information, and there are codewords in which non-zero elements are located in a first row, a second row, a third row, and a fourth row in the three codewords in the fifth codeword group; or the fifth codeword group includes one or more of the following codeword sets:

$$\left\{\frac{1}{b}\begin{bmatrix} 1 & 0 \\ 0 & 1 \\ 0 & 0 \\ 0 & 0 \end{bmatrix}\right\}, \left\{\frac{1}{b}\begin{bmatrix} 0 & 0 \\ 0 & 0 \\ 1 & 0 \\ 0 & 1 \end{bmatrix}\right\}, \left\{\frac{1}{b}\begin{bmatrix} 1 & 0 \\ 0 & 0 \\ 0 & 1 \\ 0 & 0 \end{bmatrix}\right\}, \left\{\frac{1}{b}\begin{bmatrix} 0 & 0 \\ 1 & 0 \\ 0 & 0 \\ 0 & 1 \end{bmatrix}\right\},$$

$$\left\{\frac{1}{b}\begin{bmatrix} 1 & 0 \\ 0 & 0 \\ 0 & 0 \\ 0 & 1 \end{bmatrix}\right\}, \left\{\frac{1}{b}\begin{bmatrix} 0 & 0 \\ 1 & 0 \\ 0 & 1 \\ 0 & 0 \end{bmatrix}\right\}, \left\{\frac{1}{b}\begin{bmatrix} 1 & 0 \\ 0 & 1 \\ 0 & 0 \\ 0 & 0 \end{bmatrix}, \frac{1}{b}\begin{bmatrix} 1 & 0 \\ 0 & 0 \\ 0 & 1 \\ 0 & 0 \end{bmatrix}, \frac{1}{b}\begin{bmatrix} 0 & 0 \\ 1 & 0 \\ 0 & 1 \\ 0 & 0 \end{bmatrix}\right\},$$

$$\left\{\frac{1}{b}\begin{bmatrix} 1 & 0 \\ 0 & 1 \\ 0 & 0 \\ 0 & 0 \end{bmatrix}, \frac{1}{b}\begin{bmatrix} 0 & 0 \\ 1 & 0 \\ 0 & 0 \\ 0 & 1 \end{bmatrix}, \frac{1}{b}\begin{bmatrix} 1 & 0 \\ 0 & 0 \\ 0 & 0 \\ 0 & 1 \end{bmatrix}\right\},$$

$$\left\{\frac{1}{b}\begin{bmatrix} 1 & 0 \\ 0 & 0 \\ 0 & 1 \\ 0 & 0 \end{bmatrix}, \frac{1}{b}\begin{bmatrix} 1 & 0 \\ 0 & 0 \\ 0 & 0 \\ 0 & 1 \end{bmatrix}, \frac{1}{b}\begin{bmatrix} 0 & 0 \\ 0 & 0 \\ 1 & 0 \\ 0 & 1 \end{bmatrix}\right\}, \text{ and}$$

$$\left\{\frac{1}{b}\begin{bmatrix} 0 & 0 \\ 1 & 0 \\ 0 & 0 \\ 0 & 1 \end{bmatrix}, \frac{1}{b}\begin{bmatrix} 0 & 0 \\ 1 & 0 \\ 0 & 1 \\ 0 & 0 \end{bmatrix}, \frac{1}{b}\begin{bmatrix} 0 & 0 \\ 0 & 0 \\ 1 & 0 \\ 0 & 1 \end{bmatrix}\right\};$$

and the codeword sets separately correspond to one status bit of the capability indication information.

Optionally, when N=2, the maximum quantity of SRS ports is 2, and A=1.

Optionally, when N=4, the maximum quantity of SRS ports is 4, and a value of A is at least one of 1, 2, or 3.

It should be noted that a quantity of first codewords is not necessarily one, and there may be a plurality of first codewords.

Each row in the matrix sequentially corresponds to each antenna port of the terminal, or may sequentially correspond to an antenna port in a configured SRS resource, or an antenna port in an SRS resource indicated in the DCI. Each column in the matrix sequentially corresponds to each transport layer. In this embodiment of this application, the non-zero antenna port may also be referred to as a non-zero power antenna port, and there is a non-zero element in a row corresponding to the non-zero antenna port. Row elements corresponding to zero antenna ports in the matrix are all zero elements. The codeword indicated by the capability indication information may be selected from Table 1-7.

Optionally, the capability indication information may be in a bitmap manner. To be specific, a bit of each piece of capability indication information corresponds to a specific codeword or a group of specific codewords. When the terminal reports the capability indication information, if a bit is set to 1, it means that the terminal device supports one codeword or a group of codewords corresponding to the bit for full power transmission. When a bit is set to 0, it means that the terminal device does not support one codeword or a group of codewords corresponding to the bit for full power transmission.

Optionally, the capability indication information may not be in a bitmap manner. To be specific, a status bit of each piece of capability indication information corresponds to one specific codeword or a group of specific codewords. The terminal device can select one from a plurality of status bits, to be specific, select one specific codeword or a group of specific codewords corresponding to the status bit.

Optionally, the capability indication information may partially be in a bitmap manner. To be specific, a plurality of codewords are grouped in advance, and inter-group indication is performed in the bitmap manner, that is, each bit or each group of bits corresponds to one codeword group. When the bit or the group of bits is set to 0, a corresponding codeword group is not indicated; otherwise, the corresponding codeword group is indicated. The bitmap manner may not be used for indication in a group, to be specific, different binary values of the bit or the group of bits indicate that some or all codewords are selected from a corresponding codeword group.

Optionally, the capability indication information further includes a quantity of SRS ports. For example, the capability indication information includes whether an additional SRS resource needs to be configured when a maximum rank value corresponding to n bits is n, and the quantity of SRS ports in the additional SRS resource is less than a maximum quantity of SRS ports that can be supported by the terminal device. For another example, the capability indication information further separately indicates a quantity of SRS resources that need to be additionally configured when the maximum rank value is n. Each SRS resource may be one port, or a quantity of SRS ports that need to be additionally configured. The additionally configured SRS resource may enable the terminal to perform port virtualization, to be specific, one SRS port is a virtual port formed by performing virtualization on transmission links or PAs of a plurality of terminals.

For another example, if a bit indication corresponding to the first codeword group in the capability indication information is 0, or if the capability indication information indicates the zero codewords in the first codeword group, it indicates that all codewords in the first codeword group cannot support full power transmission. The first codeword group is a codeword used to indicate antenna port selection when a maximum of four uplink transmission antenna ports are used for rank=1. In this case, at least one additional SRS resource needs to be configured when the capability indication information indicates rank=1, a quantity of SRS ports in the SRS resource is less than a maximum quantity of SRS ports that can be supported by the terminal device. In a specific case, one SRS resource with one port needs to be additionally configured. For another example, if a bit indication corresponding to the fifth codeword group in the capability indication information is 0, or if the capability indication information indicates zero codewords in the fifth codeword group, it indicates that all codewords in the fifth codeword group cannot support full power transmission. The fifth codeword group is a codeword used to indicate antenna port selection when a maximum of four uplink transmission antenna ports are used for rank=2. In this case, at least one additional SRS resource needs to be configured when the capability indication information indicates rank=2, a quantity of SRS ports in the SRS resource is less than a maximum quantity of SRS ports that can be supported by the terminal device. In a specific case, one SRS resource with two ports or two SRS resources with one port need to be additionally configured. For another example, when the capability indication information indicates that $$\frac{1}{a}\begin{bmatrix}1\\0\end{bmatrix}$$

can support full power transmission, one SRS resource with one port needs to be additionally configured. When the capability indication information indicates that $$\frac{1}{a}\begin{bmatrix}0\\1\end{bmatrix}$$

can support full power transmission, one SRS resource with one port does not need to be additionally configured. Alternatively, when the capability indication information indicates that $$\frac{1}{a}\begin{bmatrix}1\\0\end{bmatrix}$$

can support full power transmission, one SRS resource with one port does not need to be additionally configured, in other words, a plurality of SRS resources with different ports do not need to be configured for the terminal. When the capability indication information indicates that $$\frac{1}{a}\begin{bmatrix}0\\1\end{bmatrix}$$

can support full power transmission, one SRS resource with one port needs to be additionally configured, in other words, a plurality of SRS resources with different ports need to be configured for the terminal. Optionally, the plurality of SRS resources with different ports are in a same SRS resource set. Alternatively, when the capability indication information indicates that neither $$\frac{1}{a}\begin{bmatrix}1\\0\end{bmatrix} \text{ nor } \frac{1}{a}\begin{bmatrix}0\\1\end{bmatrix}$$

can support full power transmission, one SRS resource with one port needs to be additionally configured. Otherwise, one SRS resource with one port does not need to be additionally configured, in other words, a plurality of SRS resources with different ports do not need to be configured for the terminal.

The following describes a corresponding power control mechanism with reference to Solution 1. The terminal determines, based on capability indication information reported by the terminal, actual transmit power of an antenna port used to transmit a PUSCH, that is, actual transmit power of a non-zero antenna port. In this case, a base station may also determine the actual transmit power based on the capability indication information reported by the terminal, to determine an MCS and a TPMI of the PUSCH. Specifically, in an implementation, when the terminal reports that a codeword supporting full power transmission is indicated by DCI, a PUSCH scheduled by using the DCI is transmitted at full power, that is, transmit power of the PUSCH is channel transmit power.

Optionally, the base station configures a codebook set, and specifies that when some codewords in the codebook set are indicated by the DCI, the PUSCH uses full power transmission; otherwise, the PUSCH uses non-full power transmission. That is, transmit power of the PUSCH is channel transmit power multiplied by a power scaling factor. A specific manner of determining the codeword set is as follows:

In a case of two antennas, when the terminal reports that the terminal supports $$\frac{1}{a}\begin{bmatrix}1\\0\end{bmatrix} \text{ and } \frac{1}{a}\begin{bmatrix}0\\1\end{bmatrix}$$

for full power transmission, the codeword set includes:

$$\left\{\frac{1}{\sqrt{2}}\begin{bmatrix}1\\0\end{bmatrix}, \frac{1}{\sqrt{2}}\begin{bmatrix}0\\1\end{bmatrix}\right\}, \text{ or } \left\{\begin{bmatrix}1\\0\end{bmatrix}, \begin{bmatrix}0\\1\end{bmatrix}\right\},$$

and when codewords in the set are indicated by the DCI, the PUSCH uses full power transmission. Alternatively, the codeword set includes:

$$\left\{\frac{1}{\sqrt{2}}\begin{bmatrix}1\\0\end{bmatrix}, \frac{1}{\sqrt{2}}\begin{bmatrix}0\\1\end{bmatrix}, \begin{bmatrix}1\\0\end{bmatrix}, \begin{bmatrix}0\\1\end{bmatrix}\right\},$$

and when $$\begin{bmatrix}1\\0\end{bmatrix} \text{ and } \begin{bmatrix}0\\1\end{bmatrix}$$

in the set are indicated by the DCI, the PUSCH uses full power transmission; otherwise, the PUSCH uses non-full power transmission.

When the terminal reports that the terminal supports $$\frac{1}{a}\begin{bmatrix}1\\0\end{bmatrix} \text{ or } \frac{1}{a}\begin{bmatrix}0\\1\end{bmatrix}$$

for full power transmission, using $$\frac{1}{a}\begin{bmatrix}1\\0\end{bmatrix}$$

as an example, the codeword set includes:

$$\left\{\frac{1}{\sqrt{2}}\begin{bmatrix}1\\0\end{bmatrix}, \frac{1}{\sqrt{2}}\begin{bmatrix}0\\1\end{bmatrix}\right\},$$

and when $$\frac{1}{\sqrt{2}}\begin{bmatrix}1\\0\end{bmatrix}$$

is indicated by the DCI, the PUSCH uses full power transmission; otherwise, the PUSCH uses non-full power transmission. Alternatively, the codeword set includes:

$$\left\{\begin{bmatrix}1\\0\end{bmatrix}, \frac{1}{\sqrt{2}}\begin{bmatrix}0\\1\end{bmatrix}\right\} \text{ or } \left\{\begin{bmatrix}1\\0\end{bmatrix}, \frac{1}{\sqrt{2}}\begin{bmatrix}1\\0\end{bmatrix}, \frac{1}{\sqrt{2}}\begin{bmatrix}0\\1\end{bmatrix}\right\},$$

and when $$\begin{bmatrix}1\\0\end{bmatrix}$$

is indicated by the DCI, the PUSCH uses full power transmission; otherwise, the PUSCH uses non-full power transmission.

When the terminal reports that the terminal does not support $$\frac{1}{a}\begin{bmatrix}1\\0\end{bmatrix} \text{ or } \frac{1}{a}\begin{bmatrix}0\\1\end{bmatrix}$$

for full power transmission, the codeword set includes:

$$\left\{\frac{1}{\sqrt{2}}\begin{bmatrix}1\\0\end{bmatrix}, \frac{1}{\sqrt{2}}\begin{bmatrix}0\\1\end{bmatrix}, \frac{1}{\sqrt{2}}\begin{bmatrix}1\\1\end{bmatrix}\right\},$$

and when $$\frac{1}{\sqrt{2}}\begin{bmatrix}1\\1\end{bmatrix}$$

is indicated by the DCI, the PUSCH uses full power transmission; otherwise, the PUSCH uses non-full power transmission.

In a case of four antennas, when the terminal reports that the terminal supports all codewords in a first codeword group for full power transmission, the codeword set includes:

$$\left\{\begin{bmatrix}1\\0\\0\\0\end{bmatrix}, \begin{bmatrix}0\\1\\0\\0\end{bmatrix}, \begin{bmatrix}0\\0\\1\\0\end{bmatrix}, \begin{bmatrix}0\\0\\0\\1\end{bmatrix}, \frac{1}{2}\begin{bmatrix}1\\0\\1\\0\end{bmatrix}, \frac{1}{2}\begin{bmatrix}0\\1\\0\\1\end{bmatrix}, \frac{1}{2}\begin{bmatrix}0\\1\\1\\0\end{bmatrix}, \frac{1}{2}\begin{bmatrix}0\\1\\0\\1\end{bmatrix}\right\}, \text{ or}$$

$$\left\{\begin{bmatrix}1\\0\\0\\0\end{bmatrix}, \begin{bmatrix}0\\1\\0\\0\end{bmatrix}, \begin{bmatrix}0\\0\\1\\0\end{bmatrix}, \begin{bmatrix}0\\0\\0\\1\end{bmatrix}\right\}, \text{ when } \begin{bmatrix}1\\0\\0\\0\end{bmatrix}, \begin{bmatrix}0\\1\\0\\0\end{bmatrix}, \begin{bmatrix}0\\0\\1\\0\end{bmatrix}, \text{ and } \begin{bmatrix}0\\0\\0\\1\end{bmatrix}$$

are indicated by the DCI, a corresponding PUSCH uses full power transmission; otherwise, the corresponding PUSCH uses non-full power transmission. When the terminal reports that some codewords in the first codeword group are used for full power transmission, that the terminal reports that $$\frac{1}{a}\begin{bmatrix}1\\0\\0\\0\end{bmatrix}$$

is used for full power transmission is used as an example, the codeword set includes:

$$\left\{\begin{bmatrix}1\\0\\0\\0\end{bmatrix}, \frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix}, \frac{1}{2}\begin{bmatrix}0\\0\\0\\1\end{bmatrix}\right\},$$

and when $$\begin{bmatrix}1\\0\\0\\0\end{bmatrix}$$

is indicated by the DCI, the PUSCH uses full power transmission; otherwise, the PUSCH uses non-full power transmission. Alternatively, the codeword set includes:

$$\left\{\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix}, \frac{1}{2}\begin{bmatrix}0\\0\\0\\1\end{bmatrix}\right\},$$

and when $$\frac{1}{2}\begin{bmatrix}1\\0\\0\\0\end{bmatrix}$$

is indicated by the DCI, the corresponding PUSCH uses full power transmission; otherwise, the corresponding PUSCH uses non-full power transmission. Remaining codeword groups are similar. To be specific, when the terminal reports that some codewords in the remaining codeword groups in this application are used for full power transmission, and these codewords are indicated by the DCI, the PUSCH uses full power transmission; otherwise, the PUSCH uses non-full power transmission. Optionally, the base station configures one or more SRS resources, and a quantity of antenna ports of the SRS resource is less than a maximum quantity of antenna ports supported by the terminal. For example, when a terminal device supporting two antenna ports reports, by using capability indication information that the terminal device needs to additionally configure an SRS resource with one antenna port, the base station may configure an SRS resource with one antenna port based on the capability indication information. When the SRS resource with one port is indicated in the DCI, it indicates that a corresponding PUSCH uses full power transmission, that is, the PUSCH uses channel transmit power.

When a terminal device supporting four antenna ports reports, by using capability indication information, that the terminal device needs to additionally configure an SRS resource with a quantity of antenna ports less than a maximum quantity of antenna ports, for example, a quantity of 2, the base station may configure an SRS resource with two antenna ports based on the capability indication information. The terminal sends a virtualized SRS port on the SRS resource with two antenna ports. When the DCI indicates the SRS resource with two antenna ports and a TPMI indication is $$\frac{1}{a}\begin{bmatrix}1\\0\end{bmatrix} \text{ or } \frac{1}{a}\begin{bmatrix}0\\1\end{bmatrix},$$

it indicates that the PUSCH uses full power transmission, that is, the PUSCH uses the channel transmit power, and a layer quantity of the PUSCH is 1. If the indicated TPMI is $$\frac{1}{\sqrt{2}}\begin{bmatrix}1 & 0\\0 & 1\end{bmatrix},$$

the PUSCH uses full power transmission, and the layer quantity of the PUSCH is 2. Alternatively, the base station may configure one or more SRS resources with one antenna port based on the capability indication information. The terminal sends a virtualized SRS port on the one or more SRS resources with one antenna port. When the DCI indicates the one or more SRS resources with one antenna port, it indicates that a corresponding PUSCH uses full power transmission. If the DCI indicates one SRS resource with one antenna port, it indicates that the PUSCH is single-layer transmission. If the DCI indicates two SRS resources with one antenna port, it indicates that the PUSCH is two-layer transmission. With reference to the capability indication information, the base station may determine whether the SRS resource needs to be configured, a quantity of SRS resources, and a quantity of ports. Specifically, for a terminal device with a maximum of four antenna ports, when the terminal device reports that the terminal device supports full power transmission capability but does not support using any first codeword group to support full power transmission, it indicates that the base station needs to additionally configure an SRS resource with one port or two ports. Alternatively, when the terminal reports, by using the capability indication information, that the terminal supports a specific codeword in the first codeword group, it indicates that the base station needs to additionally configure an SRS resource with one port or two ports, and the specific codeword may be $$\frac{1}{2}\begin{bmatrix}0\\0\\0\\1\end{bmatrix} \text{ or } \begin{bmatrix}0\\0\\0\\1\end{bmatrix}.$$

The foregoing reporting manner may correspond to that the terminal device does not have a PA that supports maximum transmit power. For another example, the terminal may report $$\frac{1}{2}\begin{bmatrix}1\\0\\0\\0\end{bmatrix} \text{ or } \begin{bmatrix}1\\0\\0\\0\end{bmatrix}, \text{ and/or } \frac{1}{2}\begin{bmatrix}0\\1\\0\\0\end{bmatrix} \text{ or } \begin{bmatrix}0\\1\\0\\0\end{bmatrix}, \text{ and/or } \frac{1}{2}\begin{bmatrix}0\\0\\1\\0\end{bmatrix} \text{ or } \begin{bmatrix}0\\0\\1\\0\end{bmatrix}$$

by using the capability indication information. In addition, the information further indicates that the terminal does not need to configure a plurality of SRS resources with different ports. The foregoing reporting manner may correspond to that the terminal device has at least one PA that supports maximum transmit power.

Optionally, the capability indication information further includes an independent bit to indicate whether the terminal supports full power transmission. When the terminal reports, by using the bit, that the terminal supports full power transmission, it indicates that any codeword that belongs to a coherent capability of the terminal can be used to support full power transmission, and SRS resources with different SRS ports do not need to be configured.

Optionally, when the terminal reports, by using the capability indication information, that the terminal does not support using any fifth codeword group to support a full power transmission mechanism, or when the terminal reports, by using the capability indication information, that the terminal supports a specific codeword in the fifth codeword group, and the specific codeword may be, $$\frac{1}{2}\begin{bmatrix}1 & 0\\0 & 0\\0 & 0\\0 & 1\end{bmatrix} \text{ or } \frac{1}{\sqrt{2}}\begin{bmatrix}1 & 0\\0 & 0\\0 & 0\\0 & 1\end{bmatrix},$$

it indicates that an SRS resource with one port or two ports needs to be additionally configured, that is, at least two SRS resources with different ports need to be configured. Otherwise, when the terminal reports, by using the capability indication information, that the terminal supports one or more codewords in the fifth codeword group, it indicates that no additional SRS resource needs to be configured, or the at least two SRS resources with different ports do not need to be configured. Alternatively, when the terminal reports that the terminal supports one or more codewords other than $$\frac{1}{2}\begin{bmatrix}1 & 0\\0 & 0\\0 & 0\\0 & 1\end{bmatrix} \text{ or } \frac{1}{\sqrt{2}}\begin{bmatrix}1 & 0\\0 & 0\\0 & 0\\0 & 1\end{bmatrix}$$

in the fifth codeword group, it indicates that no additional SRS resource needs to be configured, or the at least two SRS resources with different ports do not need to be configured. The foregoing specific codeword is an example, or may be $$\frac{1}{\sqrt{2}}\begin{bmatrix}1 & 0\\0 & 0\\0 & 1\\0 & 0\end{bmatrix} \text{ or } \frac{1}{\sqrt{2}}\begin{bmatrix}1 & 0\\0 & 1\\0 & 0\\0 & 0\end{bmatrix}.$$

Optionally, for a terminal having a partially-coherent capability, in the capability indication information, when any codeword in the fifth codeword group cannot support full power transmission, or a specific codeword, for example, $$\frac{1}{2}\begin{bmatrix}1 & 0\\0 & 0\\0 & 0\\0 & 1\end{bmatrix} \text{ or } \frac{1}{\sqrt{2}}\begin{bmatrix}1 & 0\\0 & 0\\0 & 0\\0 & 1\end{bmatrix},$$

in the fifth codeword group, supports full power transmission, it indicates that the terminal cannot support full power transmission by using $$\frac{1}{2}\begin{bmatrix}1\\0\\1\\0\end{bmatrix} \text{ or } \frac{1}{\sqrt{2}}\begin{bmatrix}1\\0\\1\\0\end{bmatrix}, \text{ and } \frac{1}{2}\begin{bmatrix}0\\1\\0\\1\end{bmatrix} \text{ or } \frac{1}{\sqrt{2}}\begin{bmatrix}0\\1\\0\\1\end{bmatrix}.$$

If in the capability indication information reported by the terminal, a quantity of non-zero ports corresponding to all codewords in the fifth codeword group that supports full power transmission is less than 4, it indicates that the terminal can support full power transmission by using $$\frac{1}{2}\begin{bmatrix}1\\0\\1\\0\end{bmatrix} \text{ or } \frac{1}{\sqrt{2}}\begin{bmatrix}1\\0\\1\\0\end{bmatrix}, \text{ or } \frac{1}{2}\begin{bmatrix}0\\1\\0\\1\end{bmatrix} \text{ or } \frac{1}{\sqrt{2}}\begin{bmatrix}0\\1\\0\\1\end{bmatrix}.$$

If in the capability indication information reported by the terminal, a quantity of non-zero ports corresponding to all codewords in the fifth codeword group that supports full power transmission is 4, it indicates that the terminal can support full power transmission by using $$\frac{1}{2}\begin{bmatrix}1\\0\\1\\0\end{bmatrix} \text{ or } \frac{1}{\sqrt{2}}\begin{bmatrix}1\\0\\1\\0\end{bmatrix}, \text{ and } \frac{1}{2}\begin{bmatrix}0\\1\\0\\1\end{bmatrix} \text{ or } \frac{1}{\sqrt{2}}\begin{bmatrix}0\\1\\0\\1\end{bmatrix}.$$

Optionally, a quantity of bits of capability indication information of a terminal having a partially-coherent capability is the same as a quantity of bits of capability indication information of a terminal having a non-coherent capability. Alternatively, a codeword set corresponding to all bits in the capability indication information of the terminal having the partially-coherent capability is the same as a codeword set corresponding to all bits in the capability indication information of the terminal having the non-coherent capability.

Optionally, the base station configures a plurality of SRS resources with different quantities of ports in one SRS resource set. The plurality of SRS resources may include one SRS resource whose port quantity is equal to a maximum quantity of antenna ports indicated by the terminal, and may further include one SRS resource whose port quantity is less than the maximum quantity of antenna ports indicated by the terminal, or include a plurality of SRS resources whose port quantities are less than the maximum quantity of antenna ports indicated by the terminal.

Optionally, when the codeword reported in the capability indication information is indicated, it indicates that current PUSCH transmission uses full power transmission, and in this case, the power scaling factor is 1; and/or when the SRS resource whose port quantity is less than the maximum quantity of antenna ports is indicated, it indicates that the current PUSCH transmission uses full power transmission; and/or when an SRS resource with a smaller port quantity in a plurality of SRS resources in one SRS resource set is indicated, it indicates that the current PUSCH transmission uses full power transmission, and in this case, the power scaling factor is 1 or n/M.

Optionally, the capability indication information is used to indicate a quantity of reference signal SRS ports that needs to be additionally configured when a specific rank value of a maximum transmission rank is used. A maximum rank is a maximum transmission rank indicator or a maximum quantity of streams used for current data transmission, that is, a maximum value of a rank indicated in the DCI, a maximum value of a quantity of DMRS ports indicated in the DCI, or a maximum value of a quantity of columns in a precoding matrix indicated in the DCI. The maximum rank may be a value indicated by the terminal by using capability reporting information, or may be a value configured by the base station by using higher layer signaling. The quantity of SRS ports (marked as a second SRS resource) that needs to be additionally configured is a quantity of SRS ports that needs to be configured in addition to the maximum quantity of antenna ports that can be supported by the terminal (marked as a first SRS resource). A quantity of ports of the first SRS resource may be configured as a maximum quantity of ports in one SRS resource reported by the terminal, or a quantity of antennas configured by the terminal, or a maximum transmission rank indicator supported by the terminal. The second SRS resource may include one or more SRS resources. Specifically, for a 2Tx terminal, a quantity of ports supporting the second SRS resource may be reported as 0 or 1, or whether the second SRS resource can be configured may be reported, or whether SRS resources with different ports can be configured in one SRS resource group may be reported, for example, one SRS resource with one port and one SRS resource with two ports, or two SRS resources with one port are configured. For a 4Tx terminal, a quantity of ports supporting the second SRS resource may be reported as 1 and/or 2 and/or 3. In other words, a value of a reported quantity of SRS resource ports is less than a maximum quantity of antenna ports that can be supported by the terminal. For example, reporting that the quantity of ports supporting the second SRS resource is 1 indicates that for PUSCH transmission with a (maximum) rank of 1, SRS resources with different quantities of SRS ports need to be configured. For another example, reporting that the quantity of ports supporting the second SRS resource is 1 and 2 indicates that for PUSCH transmission with a (maximum) rank of 1 or 2, SRS resources with different quantities of SRS ports need to be configured. For another example, reporting that the quantity of ports supporting the second SRS resource is 2 indicates that for PUSCH transmission with a (maximum) rank of 1, SRS resources with different quantities of SRS ports do not need to be configured, and for PUSCH transmission with a (maximum) rank of 2, SRS resources with different quantities of SRS ports need to be configured.

Optionally, the capability indication information is used to indicate whether a plurality of SRS resources with different quantities of ports can be configured when the rank value of the maximum transmission rank is x, where a value of x is one or more of 1, 2, and 3.

Optionally, a value of x may be one or more of 1, 2, and 3. To be specific, the terminal device may report a quantity of SRS ports when a maximum rank=1, or separately report quantities of SRS ports when a maximum rank=1 and a maximum rank=2.

Optionally, a value of x is {1} and/or {2} and/or {3}. To be specific, the terminal device may report a quantity of SRS ports when a maximum rank=1, a quantity of SRS ports when a maximum rank=2, or a quantity of SRS ports when a maximum rank=3.

Optionally, the terminal device may report a quantity of SRS ports in a maximum rank combination. Specifically, a value of x may be {1, 2}, indicating quantities of SRS ports when a maximum rank=1 and a maximum rank=2. To be specific, the terminal device may report the quantities of SRS ports when the maximum rank=1 and the maximum rank=2, or report the quantities of SRS ports when the maximum rank=1 and the maximum rank=2 while reporting a quantity of SRS ports when a maximum rank=3. Alternatively, a value of x may be {2, 3}, indicating quantities of SRS ports when a maximum rank=2 and a maximum rank=3. To be specific, the terminal device may report the quantities of SRS ports when the maximum rank=2 and the maximum rank=3, or report the quantities of SRS ports when the maximum rank=2 and the maximum rank=3 while reporting a quantity of SRS ports when the maximum rank=1.

Optionally, the quantity of SRS ports is a quantity of ports in one SRS resource or a quantity of ports in one SRS resource set, where the SRS resource set is used for uplink codebook transmission.

Optionally, the SRS resource or the SRS resource set is specially used for a full power transmission mechanism. To be specific, the base station may configure a quantity of SRS resource ports as a maximum quantity of ports that can be supported by the terminal, and simultaneously configure another quantity of SRS resource ports as a quantity of SRS ports indicated by the capability indication information. The SRS resource or the SRS resource set may carry function information configured by using higher layer signaling, to indicate that the SRS resource or the SRS resource set is used for the full power transmission mechanism, or a value of a power scaling factor corresponding to the SRS resource or the SRS resource set is not the foregoing value 3, or a calculation method is not the foregoing calculation method 3.

A power control mechanism with reference to Solution 2 is as follows:

A base station configures one or more SRS resources, and a quantity of antenna ports of the SRS resource is less than a maximum quantity of antenna ports supported by a terminal. For example, when a terminal device supporting two antenna ports reports, by using capability indication information that the terminal device needs to additionally configure an SRS resource with one antenna port, the base station may configure an SRS resource with one antenna port based on the capability indication information. When the SRS resource with one port is indicated in DCI, it indicates that a corresponding PUSCH uses full power transmission, that is, the PUSCH uses channel transmit power.

When a terminal device supporting four antenna ports reports, by using capability indication information, that the terminal device needs to additionally configure an SRS resource with a quantity of antenna ports less than a maximum quantity of antenna ports, for example, a quantity of 2, the base station may configure an SRS resource with two antenna ports based on the capability indication information. The terminal sends a virtualized SRS port on the SRS resource with two antenna ports. When the DCI indicates the SRS resource with two antenna ports and a TPMI indication is $$\frac{1}{a}\begin{bmatrix}1\\0\end{bmatrix} \text{ or } \frac{1}{a}\begin{bmatrix}0\\1\end{bmatrix},$$

it indicates that the PUSCH uses full power transmission and a transmission rank indicator is one, that is, the PUSCH uses the channel transmit power. When the DCI indicates the SRS resource with two antenna ports and the TPMI indication is $$\frac{1}{\sqrt{2}}\begin{bmatrix}1 & 0\\0 & 1\end{bmatrix},$$

the PUSCH uses full power transmission and the transmission rank indicator is two, that is, the PUSCH uses the channel transmit power, and the channel transmit power is evenly allocated to each port. Alternatively, the base station may configure one or more SRS resources with one antenna port based on the capability indication information. The terminal sends a virtualized SRS port on the one or more SRS resources with one antenna port. When the DCI indicates the one or more SRS resources with one antenna port, it indicates that a corresponding PUSCH uses full power transmission. If the DCI indicates one SRS resource with one antenna port, it indicates that the PUSCH is single-layer transmission. If the DCI indicates two SRS resources with one antenna port, it indicates that the PUSCH is two-layer transmission. With reference to the capability indication information, the base station may determine whether the SRS resource, a quantity of SRS resources, and a quantity of ports need to be configured.

Optionally, when the terminal device supporting four antenna ports reports, by using the capability indication information, that the terminal device needs to additionally configure the SRS resource with the quantity of antenna ports less than the maximum quantity of antenna ports, for example, the quantity of 2, the base station may configure two SRS resources with one antenna port based on the capability indication information. The terminal sends the virtualized SRS port on the two SRS resources. When the DCI indicates one of the two SRS resources with one antenna port, it indicates that the corresponding PUSCH uses full power transmission and the transmission rank indicator is one, that is, the PUSCH uses the channel transmit power. When the DCI indicates both of the two SRS resources, it indicates that the corresponding PUSCH uses full power transmission and the transmission rank indicator is two, that is, the PUSCH uses the channel transmit power, and the channel transmit power is evenly allocated to each port.

Optionally, the capability indication information is used to indicate a value of a power scaling factor or a calculation method of a power scaling factor under a specific rank value of a transmission rank, as described in the foregoing values 1 to 3 or calculation methods 1 to 3. A transmission rank indicator or a quantity of streams used for current data transmission is indicated by the transmission rank. The terminal may determine a rank of current data based on a rank indicated in the DCI, or a quantity of DMRS ports indicated in the DCI, or a quantity of columns in the precoding matrix indicated in the DCI.

Optionally, a value of x may be one or more of 1, 2, and 3. To be specific, the terminal device may report a value of a power scaling factor or a calculation method of a power scaling factor when rank=1, or separately report values of power scaling factors or a calculation method of a power scaling factor when rank=1 and rank=2.

Optionally, a value of x is {1} and/or {2} and/or {3}. To be specific, the terminal device may report a value of a power scaling factor or a calculation method of a power scaling factor when rank=1, or a value of a power scaling factor or a calculation method of a power scaling factor when rank=2, or a value of a power scaling factor or a calculation method of a power scaling factor when rank=3.

Optionally, the terminal device may report a value of a power scaling factor or a calculation method of a power scaling factor in a rank combination. Specifically, a value of x may be {1, 2}, indicating values of power scaling factors or calculation methods of power scaling factors when rank=1 and rank=2. To be specific, the terminal device may report the values of the power scaling factors or the calculation methods of the power scaling factors when the rank=1 and the rank=2, or report the values of the power scaling factors or the calculation methods of the power scaling factors when the rank=1 and the rank=2 while reporting a value of a power scaling factor or a calculation method of a power scaling factor when the rank=3. Alternatively, a value of x may be {2, 3}, indicating values of power scaling factors or calculation methods of power scaling factors when rank=2 and rank=3. To be specific, the terminal device may report the values of the power scaling factors or the calculation methods of the power scaling factors when the rank=2 and the rank=3, or report the values of the power scaling factors or the calculation methods of the power scaling factors when the rank=2 and the rank=3 while reporting a value of a power scaling factor or a calculation method of a power scaling factor when the rank=1.

Optionally, the value of the power scaling factor or the calculation method of the power scaling factor may be used after the base station indicates, by using higher layer signaling or the DCI, that the value of the power scaling factor or the calculation method of the power scaling factor is enabled.

Optionally, the capability indication information is used to indicate whether a first codeword can support the power scaling factor=1 or whether the first codeword can support the full power transmission mechanism under the specific rank value of the transmission rank. Specifically, the first codeword is all codewords corresponding to the specific rank value of the transmission rank. Further, the first codeword may be all codewords corresponding to a coherent capability that can be supported by the terminal. A transmission rank indicator or a quantity of streams used for current data transmission is indicated by the transmission rank. The terminal may determine a rank of current data based on a rank indicated in the DCI, or a quantity of DMRS ports indicated in the DCI, or a quantity of columns in the precoding matrix indicated in the DCI.

Optionally, the first codeword may be all codewords corresponding to one coherent capability of coherence capabilities that can be supported by the terminal.

Optionally, a value of x may be one or more of 1, 2, and 3. To be specific, the terminal device may report whether a power scaling factor is equal to 1 when rank=1, or separately report whether a power scaling factor is equal to 1 when rank=1 and whether a power scaling factor is equal to 1 when rank=2.

Optionally, a value of x is {1} and/or {2} and/or {3}. To be specific, the terminal device may report whether a power scaling factor is equal to 1 when rank=1, or whether a power scaling factor is equal to 1 when rank=2, or whether a power scaling factor is equal to 1 when rank=3.

Optionally, the terminal device may report whether a power scaling factor is equal to 1 in a rank combination. Specifically, a value of x may be {1, 2}, indicating whether a power scaling factor is equal to 1 when rank=1 and whether a power scaling factor is equal to 1 when rank=2. To be specific, the terminal device may report whether the power scaling factor is equal to 1 when the rank=1 and whether the power scaling factor is equal to 1 when the rank=2, or report whether the power scaling factor is equal to 1 when the rank=1 and whether the power scaling factor is equal to 1 when the rank=2 while reporting whether the power scaling factor is equal to 1 when the rank=3. Alternatively, a value of x may be {2, 3}, indicating whether a power scaling factor is equal to 1 when rank=2 and whether a power scaling factor is equal to 1 when rank=3. To be specific, the terminal device may report whether the power scaling factor is equal to 1 when the rank=2 and whether the power scaling factor is equal to 1 when the rank=3, or report whether the power scaling factor is equal to 1 when the rank=2 and whether the power scaling factor is equal to 1 when the rank=3 while reporting whether the power scaling factor is equal to 1 when the rank=1.

Optionally, whether the power scaling factor is equal to 1 may be used after the base station indicates, by using higher layer signaling or the DCI, that the power scaling factor is enabled.

Figure 9:
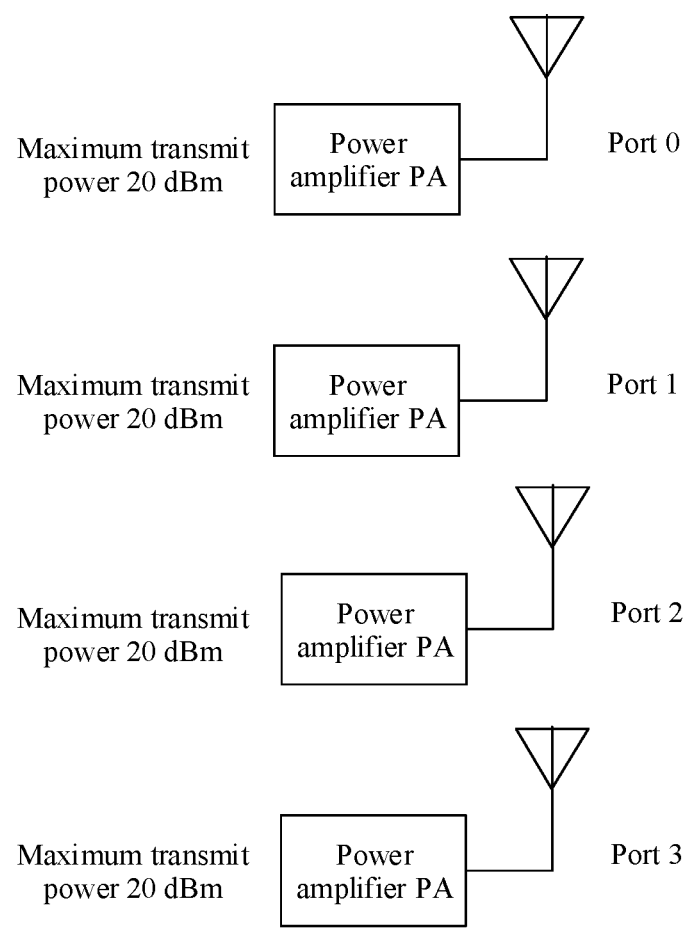
FIG. 9 is a schematic diagram 4 of an antenna form that can be supported by a terminal with four antenna ports according to an embodiment of this application.

For example, in the antenna form of the terminal shown in FIG. 9, when the rank=1, the value or the calculation method of the power scaling factor is 2 or 3. That is, when the DCI indicates a codeword $$\frac{1}{a}\begin{bmatrix}1\\0\\0\\0\end{bmatrix}, \text{ or } \frac{1}{a}\begin{bmatrix}0\\1\\0\\0\end{bmatrix}, \text{ or } \frac{1}{a}\begin{bmatrix}0\\0\\1\\0\end{bmatrix}, \text{ or } \frac{1}{a}\begin{bmatrix}0\\0\\0\\1\end{bmatrix},$$

because each PA of the terminal cannot reach transmit power of 23 dBm, when the rank=1, that the value of the power scaling factor is 2 or 3 is to be reported. However, for any codeword whose rank=2, the terminal may use any two or four PAs to reach transmit power of 23 dBm, and when the rank=2, that the value of the power scaling factor is 1 is to be reported.

Optionally, the terminal separately reports values of the power scaling factors for different codeword types by using the capability indication information.

Optionally, the terminal separately reports, by using the capability indication information, a power scaling factor corresponding to a partially-coherent codeword and a power scaling factor corresponding to a non-coherent codeword. For example, the terminal reports that the power scaling factor of the partially-coherent codeword is 1, and reports that the power scaling factor of the non-coherent codeword is 1/N, or reports that both the power scaling factor of the partially-coherent codeword and the power scaling factor of the non-coherent codeword are 1.

Optionally, for different ranks, the value of the power scaling factor and one or more codewords are separately reported. For example, when the rank is equal to 1, that the power scaling factor is 1 is reported, and a codeword that supports full power transmission is simultaneously reported; or when the rank is equal to 2, that the power scaling factor is 1 or 1/N is directly reported. In addition, it is specified in the protocol that, when the power scaling factor is 1, it is predefined that a specific codeword at the rank is used for full power transmission. For example, for the 2Tx terminal, $$\frac{1}{\sqrt{2}}\begin{bmatrix}1\\0\end{bmatrix} \text{ or } \begin{bmatrix}1\\0\end{bmatrix}$$

is used to support full power transmission of a PUSCH whose rank is 1, and for the 4Tx terminal, $$\frac{1}{2}\begin{bmatrix}1\\0\\0\\0\end{bmatrix} \text{ or } \begin{bmatrix}1\\0\\0\\0\end{bmatrix}$$

is used to support full power transmission of a PUSCH whose rank is 1, $$\frac{1}{2}\begin{bmatrix}1 & 0\\0 & 1\\0 & 0\\0 & 0\end{bmatrix} \text{ or } \frac{1}{\sqrt{2}}\begin{bmatrix}1 & 0\\0 & 1\\0 & 0\\0 & 0\end{bmatrix}$$

is used to support full power transmission of a PUSCH whose rank is 2, and $$\frac{1}{\sqrt{3}}\begin{bmatrix}1 & 0 & 0\\0 & 1 & 0\\0 & 0 & 1\\0 & 0 & 0\end{bmatrix} \text{ or } \frac{1}{2}\begin{bmatrix}1 & 0 & 0\\0 & 1 & 0\\0 & 0 & 1\\0 & 0 & 0\end{bmatrix}$$

is used to support full power transmission of a PUSCH whose rank is 3.

Optionally, the quantity of SRS ports is separately reported for different codeword types, and the codeword types include the non-coherent codeword or the partially-coherent codeword.

Optionally, for different ranks, the quantity of SRS ports and one or more codewords are separately reported. For example, when the rank is equal to 1, that SRS resource configurations of different ports are not supported is reported (or that an additional SRS resource with a small quantity of ports can be configured is reported), and a codeword that supports full power transmission is simultaneously reported; or that SRS resource configurations of different ports are supported is reported. When the rank is equal to 2 or 3, that SRS resource configurations of different ports are not supported is reported, or that SRS resource configurations of different ports are supported is reported. When the terminal reports that SRS resource configurations of different ports are not supported, a specific codeword at a corresponding rank is predefined for full power transmission. For example, for the 2Tx terminal, $$\frac{1}{\sqrt{2}}\begin{bmatrix}1\\0\end{bmatrix} \text{ or } \begin{bmatrix}1\\0\end{bmatrix}$$

is used to support full power transmission of a PUSCH whose rank is 1, and for the 4Tx terminal, $$\frac{1}{2}\begin{bmatrix}1\\0\\0\\0\end{bmatrix} \text{ or } \begin{bmatrix}1\\0\\0\\0\end{bmatrix}$$

is used to support full power transmission of a PUSCH whose rank is 1, $$\frac{1}{2}\begin{bmatrix}1&0\\0&1\\0&0\\0&0\end{bmatrix} \text{ or } \frac{1}{\sqrt{2}}\begin{bmatrix}1&0\\0&1\\0&0\\0&0\end{bmatrix}$$

is used to support full power transmission of a PUSCH whose rank is 2, and $$\frac{1}{\sqrt{3}}\begin{bmatrix}1&0&0\\0&1&0\\0&0&1\\0&0&0\end{bmatrix} \text{ or } \frac{1}{2}\begin{bmatrix}1&0&0\\0&1&0\\0&0&1\\0&0&0\end{bmatrix}$$

is used to support full power transmission of a PUSCH whose rank is 3.

Optionally, the following process may be further performed after S202.

For the terminal side, the terminal may determine the channel transmit power.

The channel transmit power is transmit power of the n non-zero antenna ports, in other words, the channel transmit power is actually a sum of transmit power of the n non-zero antenna ports. The channel transmit power is less than or equal to P, where a value of P is the maximum transmit power, that is, a maximum transmit power that is of the uplink channel and that is allocated by the terminal. A specific explanation of the channel transmit power is described above, and details are not described herein again.

The n non-zero antenna ports are in a one-to-one correspondence with n rows in the matrix, and each row of the n rows includes one or more non-zero elements.

The terminal may further determine transmit power of each non-zero antenna port based on the first codeword.

The terminal may evenly allocate the channel transmit power to the n non-zero antenna ports, and transmit power on the zero antenna port is correspondingly zero. In an optional embodiment, when complete averaging cannot be implemented, for example, when a value calculated in a manner of evenly allocating is not an integer or does not need to be very precise, power may be allocated in a manner of rounding off or rounding up/down after averaging.

It should be understood that the power allocation process herein may be a determining process, to determine transmit power of each non-zero antenna port. The determining may be determining some antenna ports, or may be determining all non-zero antenna ports. In an embodiment, allocated power may be final transmit power of a port, or may be a power class or a power value to be sent. During sending, a signal is sent based on the power class or the power value to be sent.

For the network device side, the network device determines that a power scaling factor of first data is 1. The network device sends downlink control information DCI to the terminal; the DCI is used to schedule the first data, and a codeword used by the first data is a codeword in one codeword or a group of codewords corresponding to a first bit when a value of the first bit in the capability indication information is 1.

Alternatively, the network device may send the downlink control information based on the first codeword.

The downlink control information may be used to indicate an uplink transmission codeword, for example, indicate a TPMI index.

In this application, it is assumed that a total quantity of antenna ports configured for the terminal is represented by M. M is an integral power of 2, and a relationship between a quantity A of rows in the matrix and the configured antenna port M may be: A≤M. Certainly, a relationship between the quantity n of non-zero antenna ports and M is: n≤M.

In actual application, the terminal may use some or all of the M antenna ports to send the uplink data. In practice, the antenna port used to send the uplink data is the foregoing non-zero antenna port.

After determining the transmit power of each non-zero antenna port, the terminal sends an uplink signal to the network device based on the determined transmit power of each antenna port. The uplink signal in this application may also be referred to as the uplink data, or the uplink signal includes the uplink data. For example, the uplink signal is carried on the PUSCH. The network device receives the uplink signal from the terminal.

The following describes how the terminal obtains or determines the first codeword. The terminal may select a codeword from different codebooks based on different quantities of rows and columns of the first codeword. In a possible implementation, the terminal selects the first codeword from an existing TPMI codebook. For example, selecting from the codebooks shown in the foregoing Table 1 to Table 7. In this way, flexibility of an existing TPMI indication can be maintained. The following describes in detail the following several implementations based on quantities of rows and columns of a matrix.

1. A=2, N=1, and M=2 or M=4.

The matrix has two rows and one column, and is applicable to a terminal with two or four antenna ports.

The first codeword may be determined from a first codebook. Specifically, an existing codeword is selected from the first codebook as the first codeword. A codeword included in the first codebook needs to meet the following features. The first codebook includes a second codeword and/or a third codeword. A quantity of non-zero antenna ports represented by the second codeword is 1, and a quantity of non-zero antenna ports represented by the third codeword is 2. For example, the first codebook is a codebook shown in Table 1. The second codeword is a codeword whose TPMI index value is 0 or 1 in the codebook shown in Table 1. The third codeword is a codeword with a TPMI index value ranging from 2 to 5 in the codebook shown in Table 1. In this application, features that the second codeword and the third codeword included in the first codebook meet are described, and a quantity of second codewords and a quantity of third codewords are not limited. For example, the first codebook may include a plurality of second codewords and a plurality of third codewords.

2. A=4, N=1, and M=4.

The matrix has four rows and one column, and is applicable to a terminal with four antenna ports.

The first codeword may be determined from a second codebook. Specifically, an existing codeword is selected from the second codebook as the first codeword. A codeword included in the second codebook needs to meet the following features. The second codebook includes a fourth codeword, a fifth codeword, and/or a sixth codeword. A quantity of non-zero antenna ports represented by the fourth codeword is 1, a quantity of non-zero antenna ports represented by the fifth codeword is 2, and a quantity of non-zero antenna ports represented by the sixth codeword is 4. For example, the second codebook is a codebook shown in Table 3. The fourth codeword is any codeword with a TPMI index value ranging from 0 to 3 in the codebook shown in Table 3. The fifth codeword is any codeword with a TPMI index value ranging from 4 to 11 in the codebook shown in Table 3. The sixth codeword is any codeword with a TPMI index value ranging from 12 to 27 in the codebook shown in Table 3. In this application, features that the fourth codeword, the fifth codeword, and the sixth codeword included in the second codebook meet are described, and a quantity of codewords is not limited. For example, the second codebook may include a plurality of fourth codewords, a plurality of fifth codewords, and a plurality of sixth codewords.

3. A=4, N=2, and M=4.

The matrix has four rows and two columns, and is applicable to a terminal with four antenna ports.

The first codeword may be determined from a third codebook. Specifically, an existing codeword is selected from the third codebook as the first codeword. A codeword included in the third codebook needs to meet the following features. The third codebook includes a seventh codeword, an eighth codeword, and/or a ninth codeword. A quantity of non-zero antenna ports represented by the seventh codeword is 2, a quantity of non-zero antenna ports represented by the eighth codeword is 4, and a quantity of non-zero elements in the eighth codeword is 4. A quantity of non-zero antenna ports represented by the ninth codeword is 4, and a quantity of non-zero elements in the ninth codeword is greater than 4 (such as 8). For example, the third codebook is a codebook shown in Table 5. The seventh codeword is any codeword with a TPMI index value ranging from 0 to 5 in the codebook shown in Table 5. The eighth codeword is any codeword with a TPMI index value ranging from 6 to 13 in the codebook shown in Table 5. The ninth codeword is any codeword with a TPMI index value ranging from 14 to 21 in the codebook shown in Table 5. In this application, features that the seventh codeword, the eighth codeword, and the ninth codeword included in the third codebook meet are described, and a quantity of codewords is not limited. For example, the third codebook may include a plurality of seventh codewords, a plurality of eighth codewords, and a plurality of ninth codewords.

4. A=4, N=3, and M=4.

The matrix has four rows and three columns, and is applicable to a terminal with four antenna ports.

The first codeword may be determined from a fourth codebook. Specifically, an existing codeword is selected from the fourth codebook as the first codeword. A codeword included in the fourth codebook needs to meet the following features. The fourth codebook includes a tenth codeword and/or an eleventh codeword. A quantity of non-zero antenna ports represented by the tenth codeword is 3, a quantity of non-zero antenna ports represented by the eleventh codeword is 4, and a quantity of non-zero elements in the eleventh codeword is 4. Alternatively, a quantity of non-zero antenna ports represented by the eleventh codeword is 4, and a quantity of non-zero elements in the eleventh codeword is greater than 4 (such as 8). For example, the fourth codebook is a codebook shown in Table 6. The tenth codeword is a codeword whose TPMI index value is 0 in the codebook shown in Table 6. The eleventh codeword is any codeword with a TPMI index value ranging from 1 to 6 in the codebook shown in Table 6. In this application, features that the tenth codeword, and the eleventh codeword included in the fourth codebook meet are described, and a quantity of codewords is not limited. For example, the fourth codebook may include a plurality of tenth codewords and a plurality of eleventh codewords.

5. A=2, N=2, and M=4.

The matrix has two rows and two columns, and is applicable to a terminal with four antenna ports.

The first codeword may be determined from a fifth codebook. Specifically, an existing codeword is selected from the fifth codebook as the first codeword. A codeword included in the fifth codebook needs to meet the following features. The fifth codebook includes a twelfth codeword and/or a thirteenth codeword. A quantity of non-zero antenna ports represented by the twelfth codeword is 2, and a quantity of non-zero elements in the twelfth codeword is 2. A quantity of non-zero antenna ports represented by the thirteenth codeword is 2, and a quantity of non-zero elements in the thirteenth codeword is greater than 2 (such as 4). For example, the fifth codebook is a codebook shown in Table 2. The twelfth codeword is a codeword whose TPMI index value is 0 in the codebook shown in Table 2. The thirteenth codeword is any codeword whose TPMI index value is 1 or 2 in the codebook shown in Table 2. In this application, features that the twelfth codeword, and the thirteenth codeword included in the fifth codebook meet are described, and a quantity of codewords is not limited. For example, the fifth codebook may include a plurality of twelfth codewords and a plurality of thirteenth codewords.

In the fifth implementation, or when A=2, N=1, and M=4 in the first implementation, the terminal further needs to send reference signals of (M/2) antenna ports to the network device, where (M/2) is 2. The network device determines the downlink control information based on the reference signals of (M/2) antenna ports. Optionally, in the protocol, a resource of the reference signals of (M/2) antenna ports is defined as channel measurement used to implement a set power control mode. The set power control mode is a full power transmission mechanism. In the set power control mode, a value of channel transmit power is less than or equal to P. The network device may determine a downlink control manner based on the reference signals of (M/2) antenna ports, that is, determine a TPMI indication and MCS measurement.

In a possible design, the first codeword may be added to the foregoing corresponding codebook, for example, the first codebook to the fifth codebook. Optionally, a codeword entry may be added on the basis of an original codebook, that is, the first codeword is added, and correspondingly, a status value of the first codeword is added to the DCI. Optionally, a codeword of a specified index in the original codebook may be set as the first codeword, and an original codeword of the specified index is removed. Correspondingly, the status value indicating the codeword of the specified index in the DCI is used to indicate the first codeword.

When the downlink control information sent by the network device to the terminal is used to indicate the first codeword, it means that the network device enables the full power transmission mechanism, and the terminal may not scale the channel transmit power, and allocate the channel transmit power to each non-zero antenna port based on the first codeword. Certainly, when the full power transmission mechanism is implemented, the network device may also indicate a codeword other than the first codeword in the codebook. The terminal may not scale the channel transmit power, and allocate the channel transmit power to each non-zero antenna port based on the indicated codeword.

The following further describes in detail an optional implementation of the foregoing method. It is assumed that a quantity of antenna ports of the terminal is represented by M, and a quantity of data layers for uplink transmission is represented by N or P, where P=N.

First, the codeword indicated by the capability indication information may be a matrix, and quantities of rows and columns of the matrix are related to the quantity of antenna ports and the quantity of data layers of the terminal. For example, a size of the matrix may be M*N, and is denoted as a first matrix. A size of the matrix may also be (M/2)*P, and is denoted as a second matrix.

M rows in the first matrix are in a one-to-one correspondence with the M antenna ports, and N columns in the first matrix are in a one-to-one correspondence with the N data layers of the uplink data transmission. One row in (M/2) rows of the second matrix corresponds to one antenna port or two antenna ports, and P columns in the second matrix are in a one-to-one correspondence with P data layers of the uplink data transmission.

In a possible implementation, the first matrix and the second matrix may be determined from the codebook described above. Referring to the foregoing description, the codebook includes a plurality of codewords, and the codewords are used to indicate a precoding manner of each transmit port. In this application, a codeword is selected from a codebook as a function parameter of the terminal. Optionally, the capability indication information sent by the terminal may be a TPMI index value, or the codeword may be directly used as the capability indication information. Before performing uplink transmission, the terminal sends capability information of the terminal to the network device. One piece of capability information is the capability indication information sent by the terminal.

Because a meaning of a codeword indicated by the capability indication information is different from a meaning (or a function) of a codeword in a conventional codebook, the codebook needs to be updated or modified. Optional manner 1: A codeword entry is added to an existing codebook. For example, a TPMI index value 6 is added to Table 1, and the TPMI index value 6 corresponds to the newly added codeword entry. The network device adds a status value to the DCI to correspondingly indicate the newly added codeword entry. When the status value is indicated in the DCI delivered by the network device to the terminal, it indicates that the network device enables the full power transmission mechanism. After receiving the DCI, the terminal determines, based on the status value indicated by the DCI, to use the full power transmission mechanism. The terminal does not perform power scaling, but directly allocates the determined channel transmit power to an antenna port indicated by a non-zero element in the first matrix or the second matrix. A method for adding a codeword to an existing codebook does not change flexibility of an existing TPMI indication.

Optional manner 2: A codeword in an existing codebook is replaced with the codeword indicated by the capability indication information. For example, a codeword with a lowest TPMI index value is fixedly replaced with the codeword indicated by the capability indication information. For example, a codeword corresponding to the TPMI 0 in Table 1 is replaced with the codeword indicated by the capability indication information. The network device still uses a status value of the TPMI 0 in an original codebook to indicate the codeword indicated by the capability indication information. When the status value is indicated in the DCI delivered by the network device to the terminal, it indicates that the network device enables the full power transmission mechanism. After receiving the DCI, the terminal determines, based on the status value indicated by the DCI, to use the full power transmission mechanism. The terminal does not perform power scaling, but directly allocates the determined channel transmit power to an antenna port indicated by a non-zero element in the first matrix or the second matrix. In the manner 2, DCI signaling overheads do not increased.

Optional manner 3: An existing codebook structure is not changed, and the power control mechanism is directly defined as: When the DCI indicates a status value corresponding to a specified codeword (for example, the codeword with the lowest TPMI index value), it indicates that the network device enables the full power transmission mechanism. After receiving the DCI, the terminal determines, based on the status value indicated by the DCI, to use the full power transmission mechanism. The terminal does not perform power scaling, but directly allocates the determined channel transmit power to an antenna port indicated by a non-zero element in the first matrix or the second matrix. When the DCI indicates a status value other than the status value corresponding to the specified codeword, it indicates that the network device does not enable the full power transmission mechanism. To be specific, after determining the channel transmit power, the terminal scales (multiplied by the power scaling factor) the channel transmit power, and then allocates the channel transmit power to the antenna port indicated by the non-zero element. In this manner, the codeword or the TPMI index value reported by the terminal represents that the terminal supports a full power implementation behavior.

The following describes in detail an optional manner in which the terminal allocates the channel transmit power based on the codeword.

The terminal allocates the channel transmit power to the antenna ports indicated by the non-zero element in the first matrix, and determines that transmit power on the antenna port indicated by a zero element in the first matrix is zero. If the first matrix includes a plurality of non-zero elements, the terminal may evenly allocate the channel transmit power to the antenna ports indicated by the non-zero elements in the first matrix.

An uplink transmission rank indicator of the terminal may be one or more, and the column quantity N in the first matrix may be 1 or an integer greater than 1. In the first matrix, if N=1, if a column includes one non-zero element (that is, a non-zero row element), the terminal allocates the channel transmit power to an antenna port corresponding to the non-zero element, and sends uplink data on the antenna port corresponding to the non-zero element. If a column includes a plurality of non-zero elements (that is, non-zero row elements), the terminal evenly allocates the channel transmit power to antenna ports corresponding to the plurality of non-zero elements, and sends uplink data in a manner of virtualizing the plurality of antenna ports corresponding to the plurality of non-zero elements. If N is greater than 1, and any one of the N columns includes one non-zero element, the terminal evenly allocates the channel transmit power to N antenna ports corresponding to the N non-zero elements, and sends uplink data on one data layer by using 1/N times channel transmit power. If any column in the N columns includes a plurality of non-zero elements, the 1/N times of channel transmit power is equally allocated to the plurality of non-zero elements on each data layer, and uplink data is sent in a manner of virtualizing a plurality of antenna ports corresponding to the plurality of non-zero elements.

The following further describes in detail an optional manner in which the terminal allocates the channel transmit power based on the codeword with reference to a specific application scenario.

An antenna port of the terminal has maximum transmit power based on a capability of the PA, and not all maximum transmit power of antenna ports of the terminal can support the channel transmit power. When the maximum transmit power of the antenna port of the terminal is not greater than the channel transmit power, the terminal may achieve the channel transmit power in a manner of virtualizing a plurality of antenna ports.

That the power class of the terminal in Table 8 is the class 3 is used as an example. If the tolerance is not considered, the power class of the terminal is 23 dBm. For example, when the tolerance (+3) is considered, the power class of the terminal is adjusted to 26 dBm. It is assumed that the channel transmit power of the terminal is determined as P. Optionally, P is 23 dBm or 26 dBm after adjustment. In the following examples, a case in which the tolerance is not considered is used as an example. The following is an example of an antenna form when a quantity of antenna ports of the terminal is 2 and 4. When the terminal supports two antenna ports, the two antenna ports are represented by a port 0 and a port 1. When the terminal supports four antenna ports, the four antenna ports are represented by a port 0, a port 1, a port 2, and a port 3. Maximum transmit power of a port may be 17 dBm, 20 dBm, or 23 dBm. Transmit power of a port with the maximum transmit power of 17 dBm is P/4. Transmit power of a port with the maximum transmit power of 20 dBm is P/2. Transmit power of a port with the maximum transmit power of 23 dBm is P.

Figure 3:
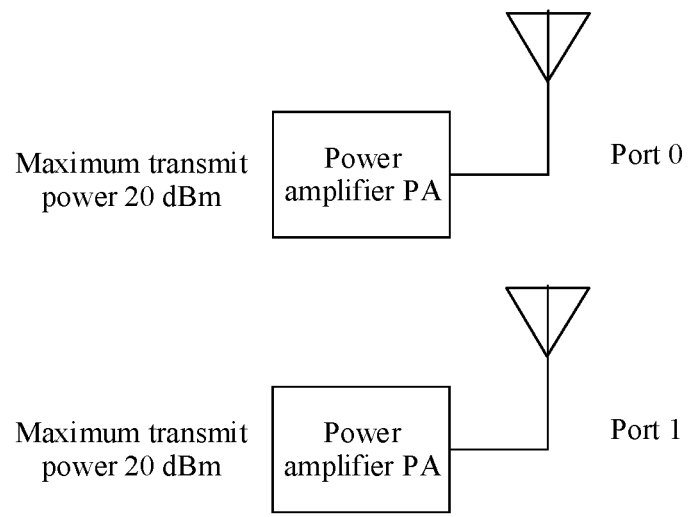
FIG. 3 is a schematic diagram 1 of an antenna form that can be supported by a terminal with two antenna ports according to an embodiment of this application.
Figure 4:
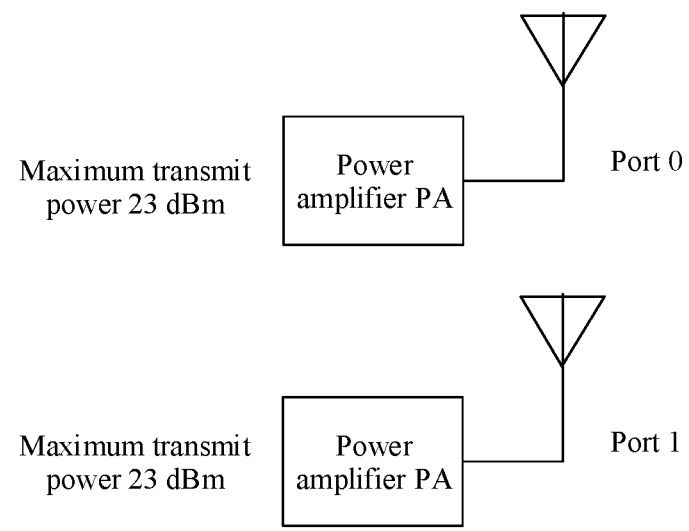
FIG. 4 is a schematic diagram 2 of an antenna form that can be supported by a terminal with two antenna ports according to an embodiment of this application.
Figure 5:
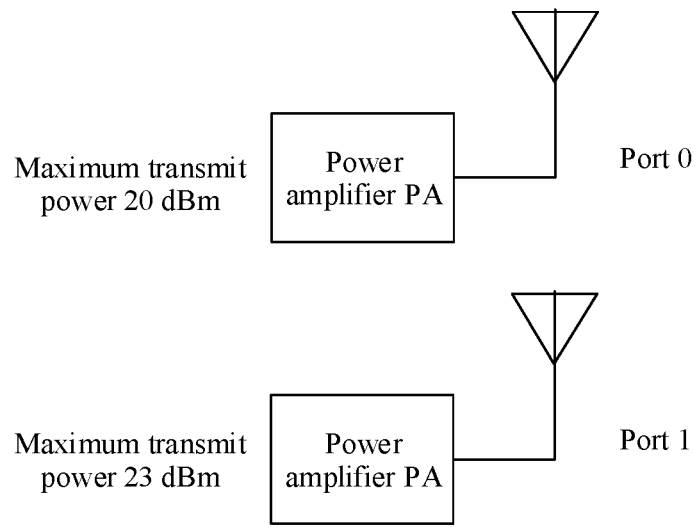
FIG. 5 is a schematic diagram 3 of an antenna form that can be supported by a terminal with two antenna ports according to an embodiment of this application.

FIG. 3 to FIG. 5 show antenna forms that can be supported by a terminal with two antenna ports.

As shown in FIG. 3, maximum transmit power supported by a port 0 and a port 1 is 20 dBm. If the terminal wants to indicate a full power transmission mechanism, the terminal may achieve channel transmit power (23 dBm) transmission by virtualizing two antenna ports into one antenna port, that is, performing power combination by using two PAs for simultaneous transmission, to achieve 23 dBm transmission.

As shown in FIG. 4, the maximum transmit power supported by the port 0 and the port 1 is 23 dBm. If the terminal wants to indicate the full power transmission mechanism, the terminal may achieve the channel transmit power (23 dBm) transmission by using any antenna port.

As shown in FIG. 5, the maximum transmit power supported by the port 0 is 20 dBm, and the maximum transmit power supported by the port 1 is 23 dBm. If the terminal wants to indicate the full power transmission mechanism, the terminal may use the port 1 to achieve the channel transmit power (23 dBm) transmission, or the terminal may achieve the channel transmit power (23 dBm) transmission by virtualizing two antenna ports into one antenna port, that is, performing the power combination by using two PAs for simultaneous transmission, to achieve the 23 dBm transmission. For example, the port 0 uses transmit power of P/2, and the port 1 uses transmit power of P/2.

FIG. 6 to FIG. 11 show antenna forms that can be supported by a terminal with four antenna ports.

Figure 6:
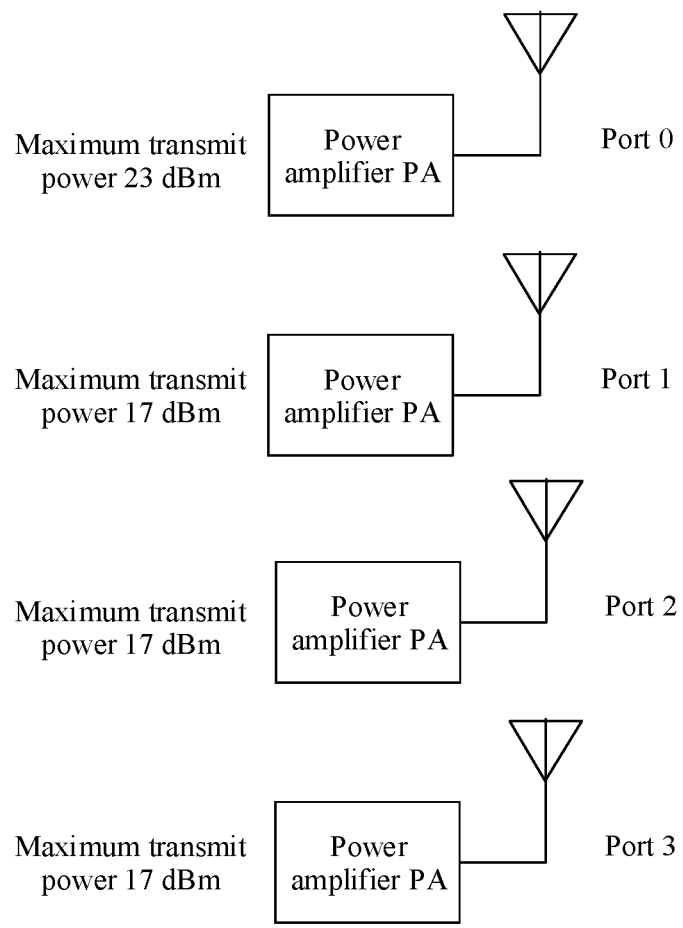
FIG. 6 is a schematic diagram 1 of an antenna form that can be supported by a terminal with four antenna ports according to an embodiment of this application.

As shown in FIG. 6, maximum transmit power supported by a port 0 is 23 dBm, and maximum transmit power supported by a port 1, a port 2, and a port 3 is 17 dBm. The terminal may use the port 0 to achieve channel transmit power (23 dBm) transmission.

Figure 7:
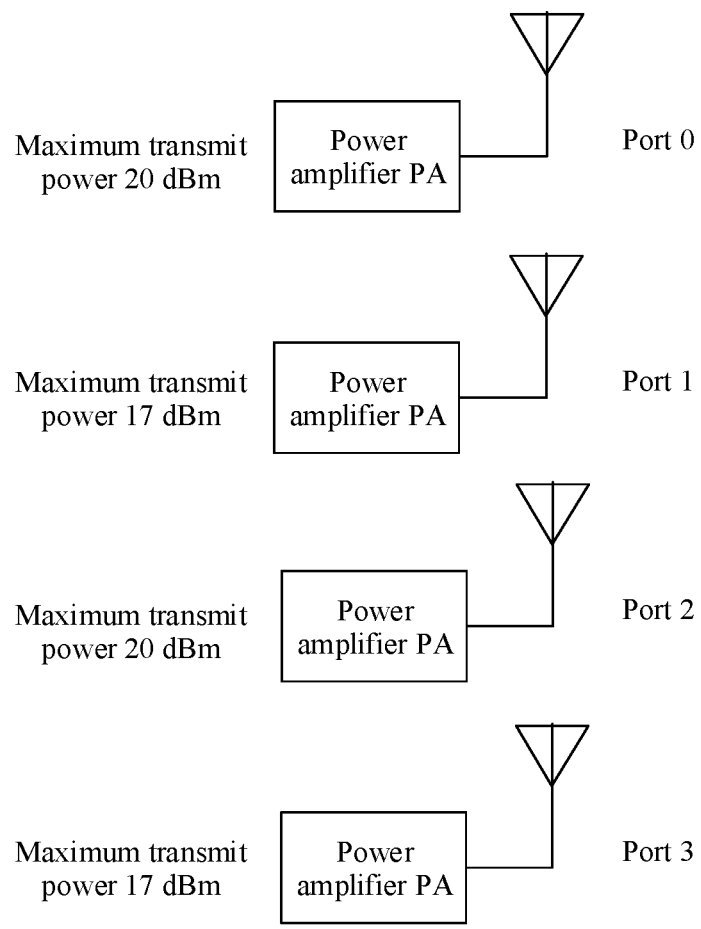
FIG. 7 is a schematic diagram 2 of an antenna form that can be supported by a terminal with four antenna ports according to an embodiment of this application.

As shown in FIG. 7, the maximum transmit power supported by the port 0 and the port 2 is 20 dBm. The maximum transmit power supported by the port 1 and the port 3 is 17 dBm.

Figure 8:
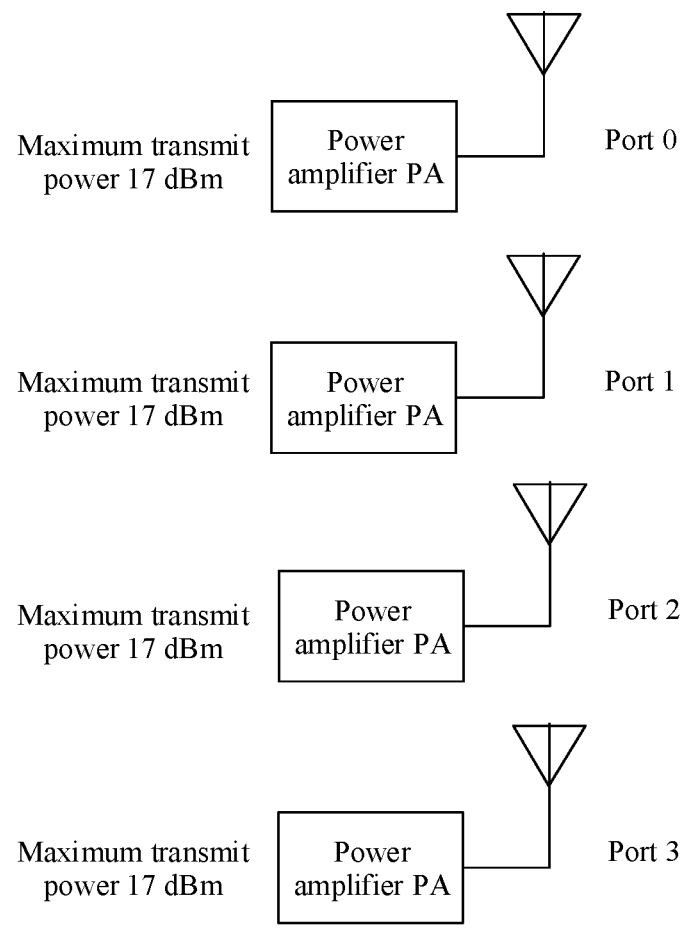
FIG. 8 is a schematic diagram 3 of an antenna form that can be supported by a terminal with four antenna ports according to an embodiment of this application.

As shown in FIG. 8, the maximum transmit power supported by the port 0, the port 1, the port 2, and the port 3 is 17 dBm.

As shown in FIG. 9, the maximum transmit power supported by the port 0, the port 1, the port 2, and the port 3 is 20 dBm.

Figure 10:
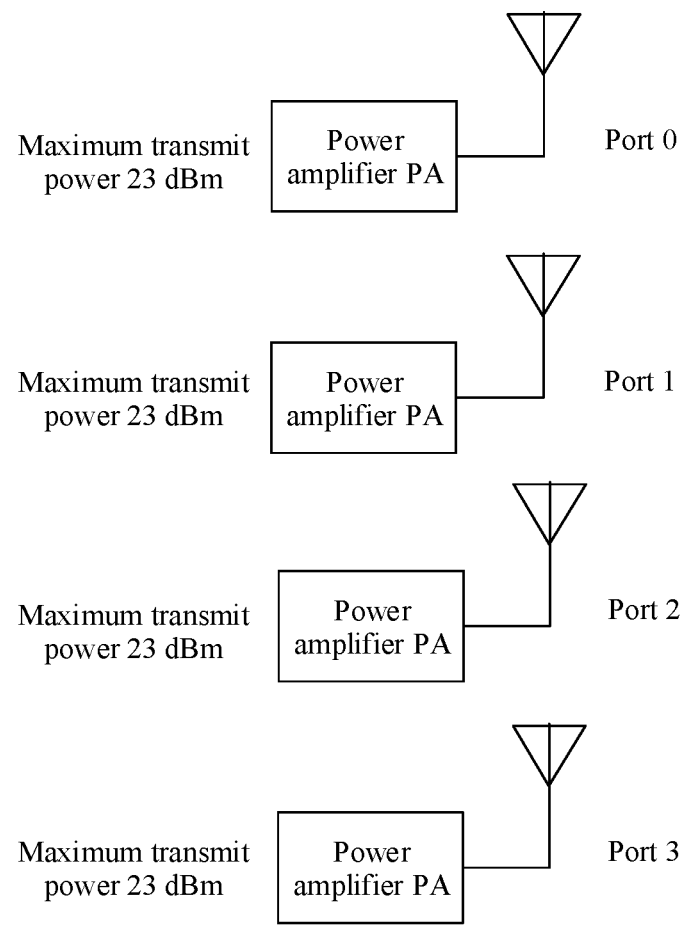
FIG. 10 is a schematic diagram 5 of an antenna form that can be supported by a terminal with four antenna ports according to an embodiment of this application.

As shown in FIG. 10, the maximum transmit power supported by the port 0, the port 1, the port 2, and the port 3 is 23 dBm.

Figure 11:
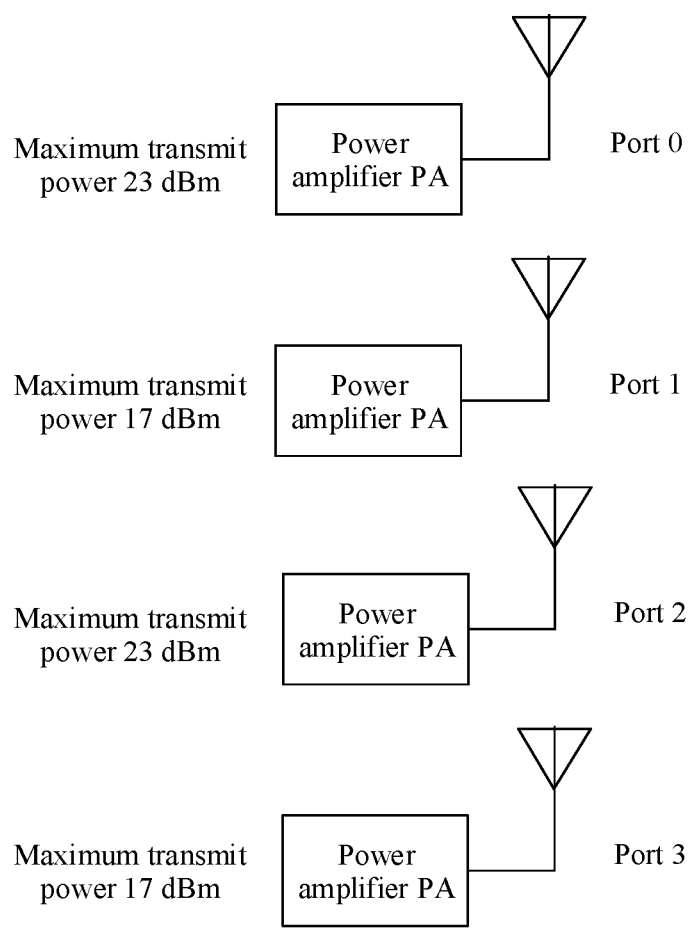
FIG. 11 is a schematic diagram 6 of an antenna form that can be supported by a terminal with four antenna ports according to an embodiment of this application.

As shown in FIG. 11, the maximum transmit power supported by the port 0 and the port 2 is 23 dBm. The maximum transmit power supported by the port 1 and the port 3 is 17 dBm.

To support full power transmission, for the foregoing terminals with different antenna forms, capability indication information that may be selected to be reported is described as follows.

A codebook of a terminal that has two antenna ports and whose transmission rank indicator is one is shown in Table 1. The terminal may select any one whose TPMI index value is 0 or 1 and any one with a TPMI index value ranging from 2 to 5 in Table 1 as the capability indication information.

For example, the terminal may select the TPMI 0:

$$\frac{1}{\sqrt{2}}\begin{bmatrix}1\\0\end{bmatrix}$$

or the TPMI 2:

$$\frac{1}{\sqrt{2}}\begin{bmatrix}1\\1\end{bmatrix}$$

in Table 1 as the capability indication information, or may directly report a codeword $$\begin{bmatrix}1\\0\end{bmatrix} \text{ or } \begin{bmatrix}0\\1\end{bmatrix}$$

as the capability indication information.

The terminal in the antenna form shown in FIG. 4 may select the TPMI 0 or the TPMI 2 in Table 1 as the capability indication information, or report a codeword $$\begin{bmatrix} 1 \\ 0 \end{bmatrix} \text{ or } \begin{bmatrix} 0 \\ 1 \end{bmatrix}$$

as the capability indication information, to indicate that the terminal in the antenna form shown in FIG. 4 may send channel transmit power by using one antenna port. The terminal in the antenna form shown in FIG. 5 may select the TPMI 1 in Table 1 as the capability indication information, or report $$\begin{bmatrix} 1 \\ 0 \end{bmatrix}$$

as the capability indication information, to indicate that the terminal in the antenna form shown in FIG. 5 may send channel transmit power by using one antenna port. In the two cases, the terminal allocates the channel transmit power P to one antenna port indicated by an element 1, to send data to the network device. After receiving the codeword, the network device may estimate an MCS by using a channel on one SRS port, and may select a TPMI in downlink capability indication information based on one antenna port.

Terminals in antenna forms shown in FIG. 3, FIG. 4, and FIG. 5 may select any one with a TPMI index value ranging from 2 to 5 in Table 1 as the capability indication information. For example, the TPMI 2 is selected as the capability indication information. It indicates that the terminal achieves the channel transmit power by virtualizing two antenna ports into one antenna port. In this case, the terminal evenly allocates the channel power P to the two antenna ports, and one antenna port carries transmit power of P/2. After receiving the codeword, the network device determines an MCS through channel estimation on the two SRS ports.

A codebook of a terminal that has four antenna ports and whose transmission rank indicator is one is shown in Table 3 or Table 4. Using Table 3 as an example, the terminal may select any one with a TPMI index value ranging from 0 to 3, any one with a TPMI index value ranging from 4 to 11, and any one with a TPMI index value ranging from 12 to 27 in Table 3, which respectively correspond to a quantity 1, 2, and 4 of non-zero antenna ports.

For example, the terminal may select the TPMI 0:

$$\frac{1}{2}\begin{bmatrix} 1 \\ 0 \\ 0 \\ 0 \end{bmatrix},$$

the TPMI 4:

$$\frac{1}{2}\begin{bmatrix} 1 \\ 0 \\ 1 \\ 0 \end{bmatrix},$$

and the TPMI 13:

$$\frac{1}{2}\begin{bmatrix} 1 \\ 1 \\ j \\ j \end{bmatrix}$$

in Table 3 as the capability indication information. Equivalently, a codeword $$\begin{bmatrix} 1 \\ 0 \\ 0 \\ 0 \end{bmatrix}, \text{ or } \frac{1}{\sqrt{2}}\begin{bmatrix} 1 \\ 0 \\ 1 \\ 0 \end{bmatrix}, \text{ or } \frac{1}{2}\begin{bmatrix} 1 \\ 1 \\ 1 \\ 1 \end{bmatrix}$$

may also be reported as the capability indication information. Normalization factors or amplitudes of the two reporting manners are different.

Terminals in antenna forms shown in FIG. 6, FIG. 10, and FIG. 11 may select any one with a TPMI index value ranging from 0 to 3 in Table 3 as the capability indication information. For example, the TPMI 0 is selected as the capability indication information. It indicates that the terminal may send channel transmit power by using one antenna port. In this case, the terminal allocates the channel transmit power P to one antenna port indicated by an element 1, to send data to the network device. After receiving the codeword, the network device may estimate an MCS by using a channel on one SRS port, and may select a TPMI in downlink capability indication information based on one antenna port.

Terminals in antenna forms shown in FIG. 7, FIG. 9, FIG. 10, and FIG. 11 may select any one with a TPMI index value ranging from 4 to 11 in Table 3 as the capability indication information. For example, the TPMI 4 is selected as the capability indication information. It indicates that the terminal achieves the channel transmit power by virtualizing two antenna ports into one antenna port. In this case, the terminal evenly allocates the channel power P to two antenna ports indicated by two non-zero elements, and one antenna port carries transmit power of P/2. After receiving the codeword, the network device determines an MCS through channel estimation on the two SRS ports.

Terminals in antenna forms shown in FIG. 6 to FIG. 11 may select any one with a TPMI index value ranging from 12 to 27 in Table 3 as the capability indication information. For example, the TPMI 13 is selected as the capability indication information. It indicates that the terminal achieves the channel transmit power by virtualizing four antenna ports into one antenna port. In this case, the terminal evenly allocates the channel power P to the four antenna ports, and one antenna port carries transmit power of P/4. After receiving the codeword, the network device determines an MCS through channel estimation on the four SRS ports.

A codebook of a terminal that has four antenna ports and whose transmission rank indicator is two is shown in Table 5. The terminal may select any one with a TPMI index value ranging from 0 to 5, and any one with a TPMI index value ranging from 6 to 21 in Table 5, which respectively correspond to a quantity 2, and 4 of non-zero antenna ports.

For example, the terminal may select the TPMI 1:

$$\frac{1}{2}\begin{bmatrix} 1 & 0 \\ 0 & 0 \\ 0 & 1 \\ 0 & 0 \end{bmatrix},$$

and the TPMI 6:

$$\frac{1}{2}\begin{bmatrix} 1 & 0 \\ 0 & 1 \\ 1 & 0 \\ 0 & -j \end{bmatrix}$$

in Table 5 as the capability indication information. Equivalent to reporting the TPMI 1, a codeword $$\frac{1}{\sqrt{2}}\begin{bmatrix} 1 & 0 \\ 0 & 0 \\ 0 & 1 \\ 0 & 0 \end{bmatrix}$$

may also be reported as the capability indication information. Normalization factors or amplitudes of the two reporting manners are different.

Terminals in antenna forms shown in FIG. 7, FIG. 9, FIG. 10, and FIG. 11 may select any one with a TPMI index value ranging from 0 to 5 in Table 5 as the capability indication information. For example, the TPMI 1 is selected as the capability indication information. It indicates that the terminal may use one antenna port to send channel transmit power at each data layer of the two layers. In this case, the terminal evenly allocates the channel transmit power P to two antenna ports indicated by the element 1, and one antenna port carries transmit power of P/2, to send data to the network device. After receiving the codeword, the network device determines an MCS through channel estimation on two SRS ports.

Terminals in antenna forms shown in FIG. 6 to FIG. 11 may select any one with a TPMI index value ranging from 6 to 21 in Table 3 as the capability indication information. For example, the TPMI 6 is selected as the capability indication information. It indicates that the terminal achieves the channel transmit power by virtualizing four antenna ports into one antenna port. In this case, the terminal evenly allocates the channel power P to two data layers, and one data layer carries power of P/2. At each data layer, the power of P/2 is evenly allocated to two antenna ports, and one antenna port carries transmit power of P/4. After receiving the codeword, the network device determines an MCS through channel estimation on four SRS ports.

The terminal in the antenna form shown in FIG. 6 to FIG. 11 may also report that the terminal does not support a full power transmission mechanism when there are two data layers. When there are two data layers, inter-layer interference is avoided by using a precoding method during transmission. However, phase weighting between non-coherent antennas is not accurate. Therefore, an exemplary method is that the terminal is expected to report any one with a TPMI index value ranging from 0 to 5 (for example, TPMI 1). In other cases, the terminal reports that a full power transmission mechanism is not supported when there are two data layers.

A codebook of a terminal that has four antenna ports and whose transmission rank indicator is three is shown in Table 6. The terminal may select one whose TPMI index value is 0, and any one with a TPMI index value ranging from 1 to 6 in Table 6, which respectively correspond to a quantity 3, and 4 of non-zero antenna ports.

For example, the terminal may select the TPMI 0:

$$\frac{1}{2}\begin{bmatrix} 1 & 0 & 0 \\ 0 & 1 & 0 \\ 0 & 0 & 1 \\ 0 & 0 & 0 \end{bmatrix},$$

and the TPMI 1:

$$\frac{1}{2}\begin{bmatrix} 1 & 0 & 0 \\ 0 & 1 & 0 \\ 1 & 0 & 0 \\ 0 & 0 & 1 \end{bmatrix}$$

in Table 6 as the capability indication information. Equivalent to reporting the TPMI 0, a codeword $$\frac{1}{\sqrt{3}}\begin{bmatrix} 1 & 0 & 0 \\ 0 & 1 & 0 \\ 0 & 0 & 1 \\ 0 & 0 & 0 \end{bmatrix}$$

may also be reported as the capability indication information. Normalization factors or amplitudes of the two reporting manners are different.

Terminals in antenna forms shown in FIG. 9 and FIG. 10 may select a codeword whose TPMI index value is 0 in Table 6 as the capability indication information. It indicates that the terminal may use one antenna port to send channel transmit power at each data layer of the three data layers. In this case, the terminal evenly allocates the channel transmit power P to three antenna ports indicated by the element 1, and one antenna port carries transmit power of P/3, to send data to the network device. After receiving the codeword, the network device determines an MCS through channel estimation on three SRS ports.

Terminals in antenna forms shown in FIG. 6, FIG. 7, FIG. 8, and FIG. 11 may select any one with a TPMI index value ranging from 1 to 6 in Table 6 as the capability indication information. For example, the TPMI 1 is selected as the capability indication information. The terminal evenly allocates the channel power P to the three data layers, and one data layer carries power of P/3. At each data layer, the power of P/3 is evenly allocated to a port indicated by a non-zero element. If there are a plurality of non-zero elements in a column, ports of the plurality of non-zero elements are virtualized into one port to send the power of P/3. After receiving the codeword, the network device determines an MCS through channel estimation on four SRS ports.

The terminal in the antenna form shown in FIG. 6, FIG. 7, FIG. 8, and FIG. 11 may also report that the terminal does not support a full power transmission mechanism when there are three data layers. When there are three data layers, inter-layer interference is avoided by using a precoding method during transmission. However, phase weighting between non-coherent antennas is not accurate. Therefore, an exemplary method is that the terminal is expected to report a codeword whose TPMI index value is 0. In other cases, the terminal reports that a full power transmission mechanism is not supported when there are three data layers Optionally, the terminal with four antenna ports may further use the capability information reported by using the foregoing two antenna ports. Specifically, the terminal may select any one whose TPMI index value is 0 or 1, and any one with a TPMI index value ranging from 2 to 5 in Table 1 as the capability indication information. For example, the terminal may select the TPMI 0:

$$\frac{1}{\sqrt{2}}\begin{bmatrix}1\\0\end{bmatrix}$$

or the TPMI 2:

$$\frac{1}{\sqrt{2}}\begin{bmatrix}1\\1\end{bmatrix}$$

in Table 1 as the capability indication information, or may directly report a codeword $$\begin{bmatrix}1\\0\end{bmatrix} \text{ or } \begin{bmatrix}0\\1\end{bmatrix}$$

as the capability indication information.

Terminals in antenna forms shown in FIG. 6, FIG. 7, FIG. 9, FIG. 10, and FIG. 11 may select any one with a TPMI index value ranging from 0 to 1 in Table 1 as the capability indication information. The network device receives the capability indication information, and determines that the terminal sends channel transmit power by using one antenna port or in a manner of virtualizing two antenna ports into one antenna port. To further determine whether the terminal uses one antenna port or the manner of virtualizing two antenna ports, the network device indicates the terminal to send an SRS with two ports. A sending manner of the SRS with two ports needs to be determined based on a codeword indicated by capability indication information reported by the terminal. The protocol describes that the SRS resource with two ports are used for channel measurement in a full power transmission mechanism. Specifically, an example in which the terminal sends the SRS with two ports is as follows: For example, if the terminal in the antenna form shown in FIG. 6 reports a TPMI 0 in Table 1, a port 0 in the SRS with two ports performs sending by using a PA of 23 dBm, and a port 1 performs sending by using any PA of 17 dBm. The network device determines, based on measurement of the SRS with two ports, whether to transmit uplink data by using the port 0. For another example, if the terminal in the antenna form shown in FIG. 7 reports a TPMI 0, in the SRS with two ports, the port 0 uses two PAs of 20 dBm to perform port virtualization and then performs sending, and the port 1 uses any PA of 17 dBm to perform sending. The network device determines, based on measurement of the SRS with two ports, whether to use the port 0 to transmit uplink data. For another example, if the terminal in the antenna form shown in FIG. 7 reports a TPMI 2, in the SRS with two ports, the port 0 and the port 1 respectively performs sending by using two PAs of 20 dBm, and the port 1 performs sending by using any PA of 17 dBm. The network device determines, based on measurement of the SRS with two ports, whether to transmit uplink data by using the port 0. Certainly, for terminals in antenna forms shown in FIG. 6, FIG. 7, FIG. 8, FIG. 9, FIG. 10, and FIG. 11 may select any one with a TPMI index value ranging from 2 to 5 in Table 1 as the capability indication information. Based on the foregoing manner in which a matrix whose quantity of rows is 2 is selected for the four antenna ports, the terminal can further hide an implementation of the antenna form of the terminal. The network device further measures the SRS with two ports, and finally can more accurately determine a TPMI and an MCS that are used for uplink transmission.

Figure 12:
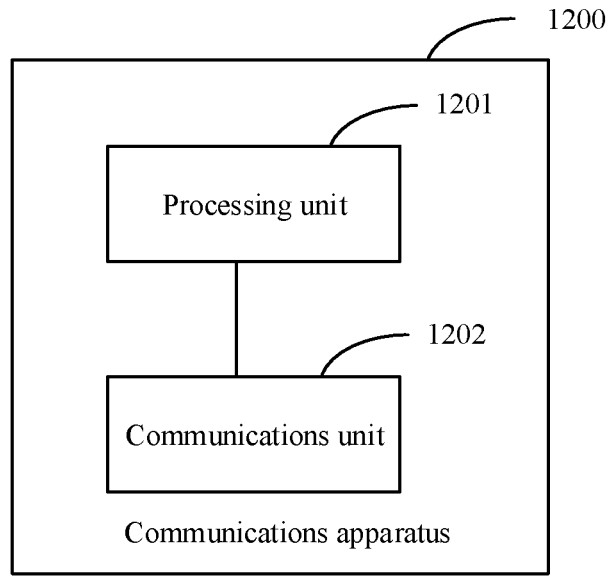
FIG. 12 is a schematic structural diagram 1 of a communications apparatus according to an embodiment of this application.

Based on a same concept as the foregoing method embodiment, as shown in FIG. 12, an embodiment of this application further provides a communications apparatus 1200. The communications apparatus 1200 is configured to perform an operation performed by the terminal in the foregoing communications method, or is configured to perform an operation performed by the network device in the foregoing communications method. The communications apparatus 1200 includes a processing unit 1201 and a communications unit 1202. When the communications apparatus 1200 is configured to perform the operation performed by the terminal in the foregoing communications method, the communications unit 1202 is configured to send capability indication information, where the capability indication information is used to indicate that a first codeword is represented as an A*N matrix, and A and N are positive integers; and the processing unit 1201 is configured to determine channel transmit power, where the channel transmit power is transmit power of n non-zero antenna ports; and the processing unit 1201 is further configured to determine transmit power of each non-zero antenna port based on the first codeword, where the n non-zero antenna ports are in a one-to-one correspondence with n rows in the matrix, each of the n rows includes one or more non-zero elements, the channel transmit power is less than or equal to P, and a value of P is maximum transmit power.

Optionally, A≤M, n≤M, where M is a quantity of configured antenna ports, M is an integral power of 2, and A=2, and M=2, or M=4, and N=1.

The processing unit 1201 is further configured to determine the first codeword from a first codebook.

The first codebook includes a second codeword and/or a third codeword. A quantity of non-zero antenna ports represented by the second codeword is 1, and a quantity of non-zero antenna ports represented by the third codeword is 2.

Optional, A=4, M=4, and N=1.

The processing unit 1201 is further configured to determine the first codeword from a second codebook.

The second codebook includes a fourth codeword, a fifth codeword, and/or a sixth codeword. A quantity of non-zero antenna ports represented by the fourth codeword is 1, a quantity of non-zero antenna ports represented by the fifth codeword is 2, and a quantity of non-zero antenna ports represented by the sixth codeword is 4.

Optional, A=4, M=4, and N=2.

The processing unit 1201 is further configured to determine the first codeword from a third codebook.

The third codebook includes a seventh codeword, an eighth codeword, and/or a ninth codeword. A quantity of non-zero antenna ports represented by the seventh codeword is 2, a quantity of non-zero antenna ports represented by the eighth codeword is 4, and a quantity of non-zero elements in the eighth codeword is 4. Alternatively, a quantity of non-zero antenna ports represented by the ninth codeword is 4, and a quantity of non-zero elements in the ninth codeword is greater than 4.

Optional, A=4, M=4, and N=3.

The processing unit 1201 is further configured to determine the first codeword from a fourth codebook.

The fourth codebook includes a tenth codeword, and/or an eleventh codeword. A quantity of non-zero antenna ports represented by the tenth codeword is 3, a quantity of non-zero antenna ports represented by the eleventh codeword is 4, and a quantity of non-zero elements in the eleventh codeword is 4. Alternatively, a quantity of non-zero antenna ports represented by the eleventh codeword is 4, and a quantity of non-zero elements in the eleventh codeword is greater than 4.

Optional, A=2, M=4, and N=2.

The processing unit 1201 is further configured to determine the first codeword from a fifth codebook.

The fifth codebook includes a twelfth codeword, and/or a thirteenth codeword. A quantity of non-zero antenna ports represented by the twelfth codeword is 2, and a quantity of non-zero elements in the twelfth codeword is 2. A quantity of non-zero antenna ports represented by the thirteenth codeword is 2, and a quantity of non-zero elements in the thirteenth codeword is greater than 2.

Optionally, the communications unit 1202 is further configured to:

send a reference signal of (M/2) antenna ports.

Optionally, the reference signal is used in a set power control mode, and a value of the channel transmit power in the set power control mode is less than or equal to P.

Optionally, the communications unit 1202 is further configured to receive control information, where the control information is used to indicate the first codeword.

Optionally, the uplink signal is carried on a physical uplink shared channel PUSCH.

When the communications apparatus 1200 is configured to perform the operation performed by the network device in the foregoing communications method, the processing unit 1201 controls the communications unit 1202 to perform the following steps:

receive capability indication information, where the capability indication information is used to indicate that a first codeword is represented as an A*N matrix, and A and N are positive integers; and send downlink control information based on the first codeword.

Optional, A=2, M=4, and N=1; or A=2, M=4, and N=2.

The communications unit 1202 is further configured to receive a reference signal of (M/2) antenna ports, and the processing unit 1201 is further configured to determine the downlink control information based on the reference signal of (M/2) antenna ports.

Optionally, the reference signal is used in a set power control mode, and a value of uplink channel transmit power in the set power control mode is less than or equal to P, where P is maximum uplink transmit power.

Optionally, the communications unit 1202 is further configured to send control information, where the control information is used to indicate the first codeword.

Figure 13:
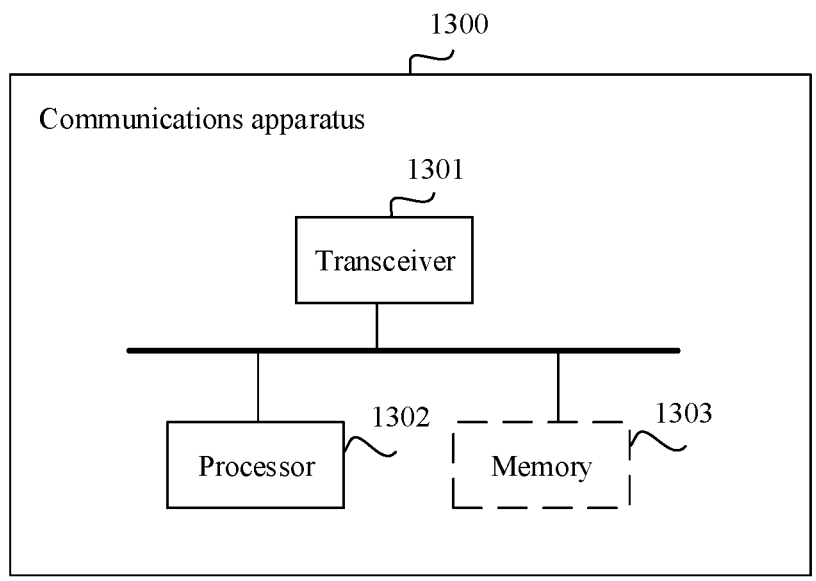
FIG. 13 is a schematic structural diagram 2 of a communications apparatus according to an embodiment of this application.

Based on a same concept as the foregoing communications method, as shown in FIG. 13, an embodiment of this application further provides a communications apparatus 1300. The communications apparatus 1300 is configured to perform an operation performed by the network device in the foregoing method embodiments, or is configured to perform an operation performed by the terminal in the foregoing method embodiments. The communications apparatus 1300 includes a transceiver 1301, a processor 1302, and a memory 1303. The memory 1303 is optional. The memory 1303 is configured to store programs executed by the processor 1302. When the communications apparatus 1300 is configured to implement an operation performed by the terminal in the foregoing method embodiments, the processor 1302 is configured to invoke a group of programs. When the programs are executed, the processor 1302 is enabled to perform the operations performed by the terminal in the foregoing method embodiments.

The processor 1302 is configured to send capability indication information, where the capability indication information is used to indicate that a first codeword is represented as an A*N matrix, and A and N are positive integers;

the processor 1302 is further configured to determine channel transmit power, where the channel transmit power is transmit power of n non-zero antenna ports; and the processor 1302 is further configured to determine transmit power of each non-zero antenna port based on the first codeword, where the n non-zero antenna ports are in a one-to-one correspondence with n rows in the matrix, each of the n rows includes one or more non-zero elements, the channel transmit power is less than or equal to P, and a value of P is maximum transmit power.

Optionally, A≤M, n≤M, where M is a quantity of configured antenna ports, and M is an integral power of 2.

A=2, and M=2, or M=4, and N=1.

The processor 1302 is further configured to determine the first codeword from a first codebook.

The first codebook includes a second codeword and/or a third codeword. A quantity of non-zero antenna ports represented by the second codeword is 1, and a quantity of non-zero antenna ports represented by the third codeword is 2.

Optional, A=4, M=4, and N=1.

The processor 1302 is further configured to determine the first codeword from a second codebook.

The second codebook includes a fourth codeword, a fifth codeword, and/or a sixth codeword. A quantity of non-zero antenna ports represented by the fourth codeword is 1, a quantity of non-zero antenna ports represented by the fifth codeword is 2, and a quantity of non-zero antenna ports represented by the sixth codeword is 4.

Optional, A=4, M=4, and N=2.

The processor 1302 is further configured to determine the first codeword from a third codebook.

The third codebook includes a seventh codeword, an eighth codeword, and/or a ninth codeword. A quantity of non-zero antenna ports represented by the seventh codeword is 2, a quantity of non-zero antenna ports represented by the eighth codeword is 4, and a quantity of non-zero elements in the eighth codeword is 4. Alternatively, a quantity of non-zero antenna ports represented by the ninth codeword is 4, and a quantity of non-zero elements in the ninth codeword is 4.

Optional, A=4, M=4, and N=3.

The processor 1302 is further configured to determine the first codeword from a fourth codebook.

The fourth codebook includes a tenth codeword, and/or an eleventh codeword. A quantity of non-zero antenna ports represented by the tenth codeword is 3, a quantity of non-zero antenna ports represented by the eleventh codeword is 4, and a quantity of non-zero elements in the eleventh codeword is 4. Alternatively, a quantity of non-zero antenna ports represented by the eleventh codeword is 4, and a quantity of non-zero elements in the eleventh codeword is greater than 4.

Optional, A=2, M=4, and N=2.

The processor 1302 is further configured to determine the first codeword from a fifth codebook.

The fifth codebook includes a twelfth codeword, and/or a thirteenth codeword. A quantity of non-zero antenna ports represented by the twelfth codeword is 2, and a quantity of non-zero elements in the twelfth codeword is 2. A quantity of non-zero antenna ports represented by the thirteenth codeword is 2, and a quantity of non-zero elements in the thirteenth codeword is greater than 2.

Optionally, the transceiver 1301 is further configured to: send a reference signal of (M/2) antenna ports.

Optionally, the reference signal is used in a set power control mode, and a value of the channel transmit power in the set power control mode is less than or equal to P.

Optionally, the transceiver 1301 is further configured to receive control information, where the control information is used to indicate the first codeword.

Optionally, the uplink signal is carried on a physical uplink shared channel PUSCH.

When the communications apparatus 1300 is configured to implement an operation performed by the network device in the foregoing method embodiments, the processor 1302 is configured to invoke a group of programs. When the programs are executed, the processor 1302 is enabled to perform the operations performed by the network device in the foregoing method embodiments. Specifically, the processor 1302 controls the transceiver 1301 to perform the following steps:

receive capability indication information, where the capability indication information is used to indicate that a first codeword is represented as an A*N matrix, and A and N are positive integers; and send downlink control information based on the first codeword.

Optional, A=2, M=4, and N=1; or A=2, M=4, and N=2.

The transceiver 1301 is further configured to receive a reference signal of (M/2) antenna ports, and the processing unit 1201 is further configured to determine the downlink control information based on the reference signal of (M/2) antenna ports.

Optionally, the reference signal is used in a set power control mode, and a value of uplink channel transmit power in the set power control mode is less than or equal to P, where P is maximum uplink transmit power.

Optionally, the transceiver 1301 is further configured to send control information, where the control information is used to indicate the first codeword.

A function module, the communications unit 1202, in FIG. 12 may be implemented by using the transceiver 1301, and the processing unit 1201 may be implemented by using the processor 1302.

The processor 1302 may be a central processing unit (CPU), a network processor (NP), or a combination of a CPU and an NP.

The processor 1302 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof.

The memory 1303 may include a volatile memory, for example, a random access memory (RAM). The memory 1303 may alternatively include a non-volatile memory, for example, a flash memory, a hard disk drive (HDD), or a solid-state drive (SSD). The memory 1303 may alternatively include a combination of the foregoing types of memories.

In the communications methods provided in the foregoing embodiments of this application, some or all of the described operations and functions performed by the network device and the terminal may be implemented by using a chip or an integrated circuit.

To implement the functions of the apparatus in FIG. 12 or FIG. 13, an embodiment of this application further provides a chip, including a processor, configured to support the communications apparatus 1200 and the communications apparatus 1300 in implementing the functions of the terminal and the network device in the method provided in the foregoing embodiments. In a possible design, the chip is connected to a memory or the chip includes a memory. The memory is configured to store program instructions and data for the apparatus.

An embodiment of this application provides a computer storage medium. The computer storage medium stores a computer program, and the computer program includes instructions used to perform the communications methods provided in the foregoing embodiments.

An embodiment of this application further provides a computer program product including instructions. When the computer program product is run on a computer, the computer is enabled to perform the communications methods provided in the foregoing embodiments.

It should be understood that the embodiments of this application may be provided as a method, a system, or a computer program product. Therefore, this application may use a form of hardware embodiments, software embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can indicate the computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto the computer or the other programmable data processing device, so that a series of operations and steps are performed on the computer or the another programmable device, thereby generating computer-implemented processing. Therefore, the instructions executed on the computer or the other programmable device provides a step for implementing the specific function in one or more processes in the flowcharts and/or in one or more blocks in the block diagrams.

Although some exemplary embodiments of this application have been described, changes and modifications to these embodiments can be made. Therefore, the following claims are intended to be construed as to cover the exemplary embodiments and all changes and modifications falling within the scope of this application.

Various modifications and variations to the embodiments of this application can be made without departing from the spirit and scope of the embodiments of this application. This application is intended to cover these modifications and variations of the embodiments of this application provided that they fall within the scope of protection defined by the following claims and their equivalent technologies.

What is claimed is:

1. A communications method, comprising:
   determining, by a terminal device, capability indication information, wherein the capability indication information is used to determine a power scaling factor, the power scaling factor is a ratio of a sum of actual transmit power of n non-zero antenna ports to channel transmit power, a maximum value of the channel transmit power is a rated maximum transmit power of a system, and n is a positive integer, wherein
   the capability indication information is used to indicate one or more codewords; and
   sending, by the terminal device, the capability indication information to a network device.

2. The method according to claim 1, wherein the power scaling factor is 1.

3. The method according to claim 1, wherein the one or more codewords indicated by the capability indication information are represented as an N*A matrix, wherein A is a current transmission rank indicator, and wherein a value of A is 1 based on N=2 or a value of A is 1, 2, or 3 based on N=4; and
   wherein a bit of the capability indication information corresponds to the one or more codewords.

4. The method according to claim 1, wherein the one or more codewords indicated by the capability indication information comprise a codeword group 1, and the codeword group 1 comprises at least one of the following codewords:

$$\frac{1}{a}\begin{bmatrix}1\\0\end{bmatrix}, \text{ or } \frac{1}{a}\begin{bmatrix}0\\1\end{bmatrix},$$

wherein a value of a is 1 or $\sqrt{2}$.

5. The method according to claim 1, wherein:
   the one or more codewords indicated by the capability indication information comprise one or more codewords of a first codeword group, and the first codeword group comprises at least one of the following codewords:

$$\frac{1}{a}\begin{bmatrix}1\\0\\0\\0\end{bmatrix}, \frac{1}{a}\begin{bmatrix}0\\1\\0\\0\end{bmatrix}, \frac{1}{a}\begin{bmatrix}0\\0\\1\\0\end{bmatrix}, \text{ or } \frac{1}{a}\begin{bmatrix}0\\0\\0\\1\end{bmatrix},$$

wherein a value of a is 1 or 0.5;

the one or more codewords indicated by the capability indication information comprise one or more codewords of a second codeword group, and the second codeword group comprises at least one of the following codewords:

$$\frac{1}{b}\begin{bmatrix}1\\0\\1\\0\end{bmatrix}, \frac{1}{b}\begin{bmatrix}1\\0\\-1\\0\end{bmatrix}, \frac{1}{b}\begin{bmatrix}1\\0\\j\\0\end{bmatrix}, \text{ or } \frac{1}{b}\begin{bmatrix}1\\0\\-j\\0\end{bmatrix},$$

wherein a value of b is $\sqrt{2}$ or 0.5;

the one or more codewords indicated by the capability indication information comprise one or more codewords of a third codeword group, and the third codeword group comprises at least one of the following codewords:

$$\frac{1}{b}\begin{bmatrix}0\\1\\0\\1\end{bmatrix}, \frac{1}{b}\begin{bmatrix}0\\1\\0\\-1\end{bmatrix}, \frac{1}{b}\begin{bmatrix}0\\1\\0\\j\end{bmatrix}, \text{ or } \frac{1}{b}\begin{bmatrix}0\\1\\0\\-j\end{bmatrix},$$

wherein a value of b is $\sqrt{2}$ or 0.5;

the one or more codewords indicated by the capability indication information comprise one or more codewords of a fourth codeword group, and the fourth codeword group comprises $$\frac{1}{2}\begin{bmatrix}1\\e\\f\\g\end{bmatrix},$$

wherein values of e, f, and g include one or more of 1, −1, j, or −j;

the one or more codewords indicated by the capability indication information comprise one or more codewords of a fifth codeword group, and the fifth codeword group comprises at least one of the following codewords:

$$\frac{1}{b}\begin{bmatrix}1&0\\0&1\\0&0\\0&0\end{bmatrix}, \frac{1}{b}\begin{bmatrix}1&0\\0&0\\0&1\\0&0\end{bmatrix}, \frac{1}{b}\begin{bmatrix}1&0\\0&0\\0&0\\0&1\end{bmatrix}, \frac{1}{b}\begin{bmatrix}0&0\\1&0\\0&1\\0&0\end{bmatrix}, \frac{1}{b}\begin{bmatrix}0&0\\1&0\\0&0\\0&1\end{bmatrix}, \text{ or } \frac{1}{b}\begin{bmatrix}0&0\\0&0\\1&0\\0&1\end{bmatrix},$$

wherein a value of b is $\sqrt{2}$ or 2;

the one or more codewords indicated by the capability indication information comprise one or more codewords of a sixth codeword group, and the sixth codeword group comprises $$\frac{1}{2}\begin{bmatrix}1&0\\0&1\\c1&0\\0&d1\end{bmatrix},$$

wherein values of c1 and d1 include one or more of 1, −1, j, or −j;

the one or more codewords indicated by the capability indication information comprise one or more codewords of a seventh codeword group, and the seventh codeword group comprises $$\frac{1}{2}\begin{bmatrix} 1 & 0 \\ e1 & e2 \\ f1 & f2 \\ g1 & g2 \end{bmatrix},$$

wherein values of e1, f1, g1, e2, f2 and g2 include one or more of 1, −1, j, or −j;

the one or more codewords indicated by the capability indication information comprise one or more codewords of an eighth codeword group, and the eighth codeword group comprises $$\frac{1}{2}\begin{bmatrix} 1 & 0 & 0 \\ 0 & 1 & 0 \\ 0 & 0 & 1 \\ 0 & 0 & 0 \end{bmatrix};$$

the one or more codewords indicated by the capability indication information comprise one or more codewords of a ninth codeword group, and the ninth codeword group comprises at least one of the following codewords:

$$\frac{1}{2}\begin{bmatrix} 1 & 0 & 0 \\ 0 & 1 & 0 \\ 1 & 0 & 1 \\ 0 & 0 & 0 \end{bmatrix}, \text{ or } \frac{1}{2}\begin{bmatrix} 1 & 0 & 0 \\ 0 & 1 & 0 \\ -1 & 0 & 1 \\ 0 & 0 & 0 \end{bmatrix};$$

or
the one or more codewords indicated by the capability indication information comprise one or more codewords of a tenth codeword group, and the tenth codeword group comprises at least one of the following codewords:

$$\frac{1}{2}\begin{bmatrix} 1 & 1 & 1 \\ 1 & -1 & 1 \\ 1 & 1 & -1 \\ 1 & -1 & -1 \end{bmatrix}, \frac{1}{2}\begin{bmatrix} 1 & 1 & 1 \\ 1 & -1 & 1 \\ j & j & -j \\ j & -j & -j \end{bmatrix},$$

$$\frac{1}{2}\begin{bmatrix} 1 & 1 & 1 \\ -1 & 1 & -1 \\ 1 & 1 & -1 \\ -1 & 1 & 1 \end{bmatrix}, \text{ or } \frac{1}{2}\begin{bmatrix} 1 & 1 & 1 \\ -1 & 1 & -1 \\ j & j & -j \\ -j & j & j \end{bmatrix}.$$

6. The method according to claim 5, wherein the capability indication information comprises at least one of:
one bit that corresponds to some or all codewords of the second codeword group;
one bit that corresponds to some or all codewords of the third codeword group; or
two bits that respectively correspond to two codewords of a codeword group 1.

7. The method according to claim 5, wherein:
three codewords in the fifth codeword group respectively correspond to three bits in the capability indication information, and there are codewords in which non-zero elements are located in a first row, a second row, a third row, and a fourth row in the three codewords in the fifth codeword group; or
the fifth codeword group comprises at least one of the following codeword sets:

$$\left\{ \frac{1}{b}\begin{bmatrix} 1 & 0 \\ 0 & 1 \\ 0 & 0 \\ 0 & 0 \end{bmatrix} \right\}, \left\{ \frac{1}{b}\begin{bmatrix} 0 & 0 \\ 0 & 0 \\ 1 & 0 \\ 0 & 1 \end{bmatrix} \right\}, \left\{ \frac{1}{b}\begin{bmatrix} 1 & 0 \\ 0 & 0 \\ 0 & 1 \\ 0 & 0 \end{bmatrix} \right\}, \left\{ \frac{1}{b}\begin{bmatrix} 0 & 0 \\ 1 & 0 \\ 0 & 0 \\ 0 & 1 \end{bmatrix} \right\},$$

$$\left\{ \frac{1}{b}\begin{bmatrix} 1 & 0 \\ 0 & 0 \\ 0 & 0 \\ 0 & 1 \end{bmatrix} \right\}, \left\{ \frac{1}{b}\begin{bmatrix} 0 & 0 \\ 1 & 0 \\ 0 & 1 \\ 0 & 0 \end{bmatrix} \right\}, \left\{ \frac{1}{b}\begin{bmatrix} 1 & 0 \\ 0 & 1 \\ 0 & 0 \\ 0 & 0 \end{bmatrix}, \frac{1}{b}\begin{bmatrix} 1 & 0 \\ 0 & 0 \\ 0 & 1 \\ 0 & 0 \end{bmatrix}, \frac{1}{b}\begin{bmatrix} 0 & 0 \\ 1 & 0 \\ 0 & 1 \\ 0 & 0 \end{bmatrix} \right\},$$

$$\left\{ \frac{1}{b}\begin{bmatrix} 1 & 0 \\ 0 & 1 \\ 0 & 0 \\ 0 & 0 \end{bmatrix}, \frac{1}{b}\begin{bmatrix} 0 & 0 \\ 1 & 0 \\ 0 & 0 \\ 0 & 1 \end{bmatrix}, \frac{1}{b}\begin{bmatrix} 1 & 0 \\ 0 & 0 \\ 0 & 0 \\ 0 & 1 \end{bmatrix} \right\},$$

$$\left\{ \frac{1}{b}\begin{bmatrix} 1 & 0 \\ 0 & 0 \\ 0 & 1 \\ 0 & 0 \end{bmatrix}, \frac{1}{b}\begin{bmatrix} 1 & 0 \\ 0 & 0 \\ 0 & 0 \\ 0 & 1 \end{bmatrix}, \frac{1}{b}\begin{bmatrix} 0 & 0 \\ 0 & 0 \\ 1 & 0 \\ 0 & 1 \end{bmatrix} \right\}, \text{ or }$$

$$\left\{ \frac{1}{b}\begin{bmatrix} 0 & 0 \\ 1 & 0 \\ 0 & 0 \\ 0 & 1 \end{bmatrix}, \frac{1}{b}\begin{bmatrix} 0 & 0 \\ 1 & 0 \\ 0 & 1 \\ 0 & 0 \end{bmatrix}, \frac{1}{b}\begin{bmatrix} 0 & 0 \\ 0 & 0 \\ 1 & 0 \\ 0 & 1 \end{bmatrix} \right\},$$

wherein the codeword sets separately correspond to one status bit of the capability indication information.

8. The method according to claim 1, wherein based on a value of a first bit in the capability indication information being 1 and a codeword of one or more codewords corresponding to the first bit being indicated by downlink control information (DCI), the power scaling factor of first data is 1, wherein the first data is scheduled by the DCI.

9. A communications apparatus, comprising a processor, wherein the processor is coupled to a memory, and the memory stores instructions; and
when the processor executes the instructions, the apparatus is configured to perform the method according to claim 1.

10. A computer-readable storage medium, wherein the computer storage medium stores computer-readable instructions; and when a computer reads and executes the computer-readable instructions, the computer is configured to perform the method according to claim 1.

11. An apparatus, wherein the apparatus is configured to perform the method according to claim 1.

12. A communications method, comprising:
receiving, by a network device, capability indication information, wherein
the capability indication information is used to determine a power scaling factor, the power scaling factor is a ratio of a sum of actual transmit power of n non-zero antenna ports to channel transmit power, a maximum value of the channel transmit power is a rated maximum transmit power of a system, n is a positive integer, and
the capability indication information is used to indicate one or more codewords.

13. The method according to claim 12, wherein the method further comprises:
determining that a power scaling factor of first data is 1.

14. The method according to claim 12, wherein the one or more codewords indicated by the capability indication information are represented as an N*A matrix, wherein A is a current transmission rank indicator, and wherein a value of A is 1 based on N=2 or a value of A is one or more of 1, 2, or 3 based on N=4; and wherein a bit of the capability indication information corresponds to the one or more codewords.

15. The method according to claim 12, wherein the one or more codewords indicated by the capability indication information comprise a codeword group 1, and the codeword group 1 comprises at least one of the following codewords:

$$\frac{1}{a}\begin{bmatrix}1\\0\end{bmatrix} \text{ or } \frac{1}{a}\begin{bmatrix}0\\1\end{bmatrix},$$

wherein a value of a is 1 or $\sqrt{2}$.

16. The method according to claim 12, wherein:

the one or more codewords indicated by the capability indication information comprise one or more codewords of a first codeword group, and the first codeword group comprises at least one of the following codewords:

$$\frac{1}{a}\begin{bmatrix}1\\0\\0\\0\end{bmatrix}, \frac{1}{a}\begin{bmatrix}0\\1\\0\\0\end{bmatrix}, \frac{1}{a}\begin{bmatrix}0\\0\\1\\0\end{bmatrix}, \text{ or } \frac{1}{a}\begin{bmatrix}0\\0\\0\\1\end{bmatrix},$$

wherein a value of a is 1 or 0.5;

the one or more codewords indicated by the capability indication information comprise one or more codewords of a second codeword group, and the second codeword group comprises at least one of the following codewords:

$$\frac{1}{b}\begin{bmatrix}1\\0\\1\\0\end{bmatrix}, \frac{1}{b}\begin{bmatrix}1\\0\\-1\\0\end{bmatrix}, \frac{1}{b}\begin{bmatrix}1\\0\\j\\0\end{bmatrix}, \text{ or } \frac{1}{b}\begin{bmatrix}1\\0\\-j\\0\end{bmatrix},$$

wherein a value of b is $\sqrt{2}$ or 0.5;

the one or more codewords indicated by the capability indication information comprise one or more codewords of a third codeword group, and the third codeword group comprises at least one of the following codewords:

$$\frac{1}{b}\begin{bmatrix}0\\1\\0\\1\end{bmatrix}, \frac{1}{b}\begin{bmatrix}0\\1\\0\\-1\end{bmatrix}, \frac{1}{b}\begin{bmatrix}0\\1\\0\\j\end{bmatrix}, \text{ or } \frac{1}{b}\begin{bmatrix}0\\1\\0\\-j\end{bmatrix},$$

wherein a value of b is $\sqrt{2}$ or 0.5;

the one or more codewords indicated by the capability indication information comprise one or more codewords of a fourth codeword group, and the fourth codeword group comprises $$\frac{1}{2}\begin{bmatrix}1\\e\\f\\g\end{bmatrix},$$

wherein values of e, f, and g include one or more of 1, −1, j, or −j;

the one or more codewords indicated by the capability indication information comprise one or more codewords of a fifth codeword group, and the fifth codeword group comprises at least one of the following codewords:

$$\frac{1}{b}\begin{bmatrix}1&0\\0&1\\0&0\\0&0\end{bmatrix}, \frac{1}{b}\begin{bmatrix}1&0\\0&0\\0&1\\0&0\end{bmatrix}, \frac{1}{b}\begin{bmatrix}1&0\\0&0\\0&0\\0&1\end{bmatrix}, \frac{1}{b}\begin{bmatrix}0&0\\1&0\\0&1\\0&0\end{bmatrix}, \frac{1}{b}\begin{bmatrix}0&0\\1&0\\0&0\\0&1\end{bmatrix}, \text{ or } \frac{1}{b}\begin{bmatrix}0&0\\0&0\\1&0\\0&1\end{bmatrix},$$

wherein a value of b is $\sqrt{2}$ or 2;

the one or more codewords indicated by the capability indication information comprise one or more codewords of a sixth codeword group, and the sixth codeword group comprises $$\frac{1}{2}\begin{bmatrix}1&0\\0&1\\c1&0\\0&d1\end{bmatrix},$$

wherein values of c1 and d1 include one or more of 1, −1, j, or j;

the one or more codewords indicated by the capability indication information comprise one or more codewords of a seventh codeword group, and the seventh codeword group comprises $$\frac{1}{2}\begin{bmatrix}1&0\\e1&e2\\f1&f2\\g1&g2\end{bmatrix},$$

wherein values of e1, f1, g1, e2, f2 and g2 include one or more of 1, −1, j, or −j;

the one or more codewords indicated by the capability indication information comprise one or more codewords of an eighth codeword group, and the eighth codeword group comprises $$\frac{1}{2}\begin{bmatrix}1&0&0\\0&1&0\\0&0&1\\0&0&0\end{bmatrix};$$

the one or more codewords indicated by the capability indication information comprise one or more codewords of a ninth codeword group, and the ninth codeword group comprises at least one of the following codewords:

$$\frac{1}{2}\begin{bmatrix} 1 & 0 & 0 \\ 0 & 1 & 0 \\ 1 & 0 & 1 \\ 0 & 0 & 0 \end{bmatrix}, \text{ or } \frac{1}{2}\begin{bmatrix} 1 & 0 & 0 \\ 0 & 1 & 0 \\ -1 & 0 & 1 \\ 0 & 0 & 0 \end{bmatrix}; \text{ or}$$

or the one or more codewords indicated by the capability indication information comprise one or more codewords of a tenth codeword group, and the tenth codeword group comprises at least one of the following codewords:

$$\frac{1}{2}\begin{bmatrix} 1 & 1 & 1 \\ 1 & -1 & 1 \\ 1 & 1 & -1 \\ 1 & -1 & -1 \end{bmatrix}, \frac{1}{2}\begin{bmatrix} 1 & 1 & 1 \\ 1 & -1 & 1 \\ j & j & -j \\ j & -j & -j \end{bmatrix}, \frac{1}{2}\begin{bmatrix} 1 & 1 & 1 \\ -1 & 1 & -1 \\ 1 & 1 & -1 \\ -1 & 1 & 1 \end{bmatrix}, \text{ or}$$

$$\frac{1}{2}\begin{bmatrix} 1 & 1 & 1 \\ -1 & 1 & -1 \\ j & j & -j \\ -j & j & j \end{bmatrix}.$$

17. The method according to claim 16, wherein the capability indication information comprises at least one of:
one bit that corresponds to some or all codewords of the second codeword group;
one bit that corresponds to some or all codewords of the third codeword group; or
two bits that respectively correspond to two codewords of a codeword group 1.

18. The method according to claim 16, wherein:
three codewords in the fifth codeword group respectively correspond to three bits in the capability indication information, and there are codewords in which non-zero elements are located in a first row, a second row, a third row, and a fourth row in the three codewords in the fifth codeword group; or
the fifth codeword group comprises at least one of the following codeword sets:

$$\left\{\frac{1}{b}\begin{bmatrix} 1 & 0 \\ 0 & 1 \\ 0 & 0 \\ 0 & 0 \end{bmatrix}\right\}, \left\{\frac{1}{b}\begin{bmatrix} 0 & 0 \\ 0 & 0 \\ 1 & 0 \\ 0 & 1 \end{bmatrix}\right\}, \left\{\frac{1}{b}\begin{bmatrix} 1 & 0 \\ 0 & 0 \\ 0 & 1 \\ 0 & 0 \end{bmatrix}\right\},$$

$$\left\{\frac{1}{b}\begin{bmatrix} 0 & 0 \\ 1 & 0 \\ 0 & 0 \\ 0 & 1 \end{bmatrix}\right\}, \left\{\frac{1}{b}\begin{bmatrix} 1 & 0 \\ 0 & 0 \\ 0 & 0 \\ 0 & 1 \end{bmatrix}\right\}, \left\{\frac{1}{b}\begin{bmatrix} 0 & 0 \\ 1 & 0 \\ 0 & 1 \\ 0 & 0 \end{bmatrix}\right\},$$

$$\left\{\frac{1}{b}\begin{bmatrix} 1 & 0 \\ 0 & 1 \\ 0 & 0 \\ 0 & 0 \end{bmatrix}, \frac{1}{b}\begin{bmatrix} 1 & 0 \\ 0 & 0 \\ 0 & 1 \\ 0 & 0 \end{bmatrix}, \frac{1}{b}\begin{bmatrix} 0 & 0 \\ 1 & 0 \\ 0 & 1 \\ 0 & 0 \end{bmatrix}\right\},$$

$$\left\{\frac{1}{b}\begin{bmatrix} 1 & 0 \\ 0 & 1 \\ 0 & 0 \\ 0 & 0 \end{bmatrix}, \frac{1}{b}\begin{bmatrix} 0 & 0 \\ 1 & 0 \\ 0 & 0 \\ 0 & 1 \end{bmatrix}, \frac{1}{b}\begin{bmatrix} 1 & 0 \\ 0 & 0 \\ 0 & 0 \\ 0 & 1 \end{bmatrix}\right\},$$

$$\left\{\frac{1}{b}\begin{bmatrix} 1 & 0 \\ 0 & 0 \\ 0 & 1 \\ 0 & 0 \end{bmatrix}, \frac{1}{b}\begin{bmatrix} 1 & 0 \\ 0 & 0 \\ 0 & 0 \\ 0 & 1 \end{bmatrix}, \frac{1}{b}\begin{bmatrix} 0 & 0 \\ 0 & 0 \\ 1 & 0 \\ 0 & 1 \end{bmatrix}\right\}, \text{ or}$$

$$\left\{\frac{1}{b}\begin{bmatrix} 0 & 0 \\ 1 & 0 \\ 0 & 0 \\ 0 & 1 \end{bmatrix}, \frac{1}{b}\begin{bmatrix} 0 & 0 \\ 1 & 0 \\ 0 & 1 \\ 0 & 0 \end{bmatrix}, \frac{1}{b}\begin{bmatrix} 0 & 0 \\ 0 & 0 \\ 1 & 0 \\ 0 & 1 \end{bmatrix}\right\}; \text{ wherein}$$

wherein
the codeword sets separately correspond to one status bit of the capability indication information.

19. The method according to claim 12, wherein based on a value of a first bit in the capability indication information being 1 and downlink control information (DCI) indicating the codeword of one or more codewords corresponding to the first bit, the power scaling factor of first data is 1, wherein the first data is scheduled by the DCI.

20. A communications apparatus, comprising a processor, wherein the processor is coupled to a memory, and the memory stores instructions; and
when the processor executes the instructions, the apparatus is configured to perform the method according to claim 12.

21. A computer-readable storage medium, wherein the computer storage medium stores computer-readable instructions; and when a computer reads and executes the computer-readable instructions, the computer is configured to perform the method according to claim 12.

22. An apparatus, wherein the apparatus is configured to perform the method according to claim 12.

* * * * *

UNITED STATES PATENT AND TRADEMARK OFFICE
CERTIFICATE OF CORRECTION

PATENT NO. : 11,937,191 B2
APPLICATION NO. : 17/372172
DATED : March 19, 2024
INVENTOR(S) : Liu et al.

It is certified that error appears in the above-identified patent and that said Letters Patent is hereby corrected as shown below:

In the Claims

Claim 16: Column 76, Line 37: "j, or j;" should read -- j, or –j; --.

Claim 16: Column 77, Line 7: "or" should be deleted.

Claim 18: Column 78, Line 22: "; wherein" should read -- , wherein --.

Claim 18: Column 78, Line 25: "wherein" should be deleted.

Signed and Sealed this
Twenty-sixth Day of November, 2024

Katherine Kelly Vidal
*Director of the United States Patent and Trademark Office*